(12) United States Patent
Jin et al.

(10) Patent No.: US 6,672,175 B2
(45) Date of Patent: Jan. 6, 2004

(54) APPARATUS AND METHOD FOR SENSING AN ANGLE OF RELATIVE ROTATION OF ROTORS

(75) Inventors: Dongzhi Jin, Chiba (JP); Fumihiko Abe, Chiba (JP); Kengo Tanaka, Chiba (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/225,400

(22) Filed: Aug. 20, 2002

(65) Prior Publication Data

US 2003/0051562 A1 Mar. 20, 2003

Related U.S. Application Data

(60) Division of application No. 09/790,304, filed on Feb. 21, 2001, now Pat. No. 6,481,296, which is a continuation-in-part of application No. PCT/JP00/04061, filed on Jun. 21, 2000.

(30) Foreign Application Priority Data

| Jun. 21, 1999 | (JP) | ............................................. 11-173792 |
| Oct. 1, 1999 | (JP) | ............................................. 11-281706 |
| Oct. 12, 1999 | (JP) | ............................................. 11-289633 |
| Jun. 8, 2000 | (JP) | ........................................ 2000-172066 |
| Jun. 16, 2000 | (JP) | ........................................ 2000-182166 |

(51) Int. Cl.⁷ .............................. G01L 3/10; G01B 7/30; G01D 5/20; G01D 5/245
(52) U.S. Cl. .............................. 73/862.326; 324/207.16; 324/207.25; 324/233; 73/862.331
(58) Field of Search ....................... 324/207.15–207.19, 324/207.22, 207.25, 233; 73/862.326, 862.328, 862.329, 862.331–862.336; 180/443–446; 74/388 PS

(56) References Cited

U.S. PATENT DOCUMENTS

| 4,356,732 A | | 11/1982 | Hachtel et al. |
| 4,881,414 A | | 11/1989 | Setaka et al. |
| 4,906,924 A | * | 3/1990 | Zannis .................... 324/207.18 |
| 5,083,468 A | * | 1/1992 | Dobler et al. .......... 73/862.331 |
| 5,200,698 A | | 4/1993 | Thibaud |
| 5,390,549 A | | 2/1995 | Dobler et al. |
| 5,426,986 A | | 6/1995 | Brassert et al. |
| 5,578,767 A | | 11/1996 | Chikaraishi et al. |
| 5,717,263 A | * | 2/1998 | Cox ............................. 310/74 |
| 6,342,108 B1 | * | 1/2002 | Lashmore et al. ........... 148/306 |

FOREIGN PATENT DOCUMENTS

JP    07-139905    6/1995

OTHER PUBLICATIONS

Copy of International Search Report PCT/JP00/04061, Dec. 28, 2000.

* cited by examiner

Primary Examiner—Gerard R. Strecker
(74) Attorney, Agent, or Firm—Knobbe, Martens, Olson & Bear, LLP

(57) ABSTRACT

A rotation sensor provided with a first rotor fixed to a shaft, a second rotor fixed to the same or other shaft and adjoining the first rotor, and a core having a resonance coil, arranged around the first rotor, and which coil forms a magnetic circuit working with the first rotor. The first rotor is formed of a magnetic material comprising an insulator; an irregular magnetic field is formed with the core; and the second rotor is provided with a conductor cutting across areas of different intensities of the irregular magnetic field in accordance with the difference of the angle of rotation when a difference in the angle of relative rotation occurs at a shaft position where the first rotor is fixed and at a shaft position where the second rotor is fixed.

19 Claims, 39 Drawing Sheets

FIG. 10
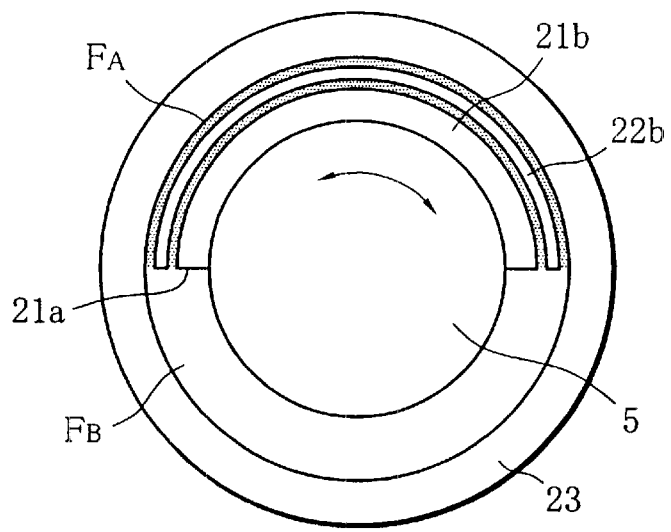
FIG. 11A      FIG. 11B
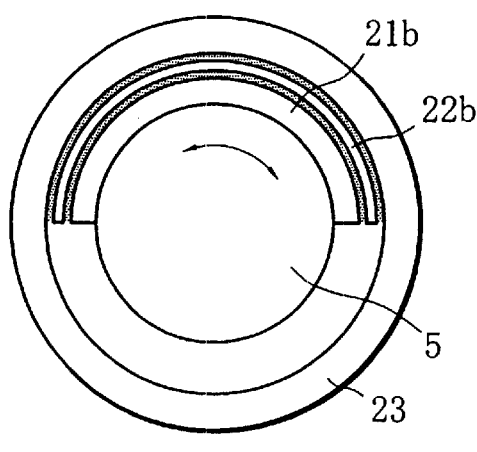 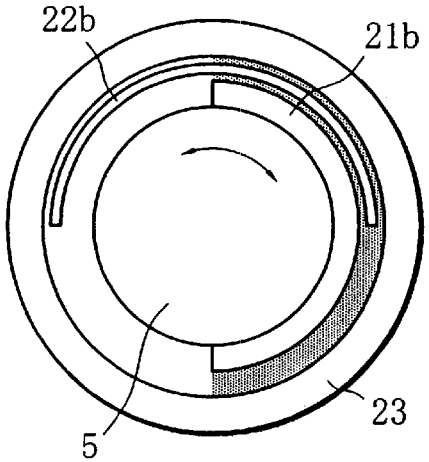

FIG. 35A OUTPUT OF ROTATION ANGLE SENSOR

FIG. 35B OUTPUT OF PITCH SENSOR

FIG. 35C OUTPUT OF DISPLACEMENT SENSOR

FIG. 35D ROTATION ANGLE MEASUREMENT PORTION

APPARATUS AND METHOD FOR SENSING AN ANGLE OF RELATIVE ROTATION OF ROTORS

RELATED APPLICATIONS

This application is a divisional of previously filed U.S. patent application Ser. No. 09/790,304, entitled ROTATION SENSOR AND MEASUREMENT CIRCUIT, filed on Feb. 21, 2001, now is U.S. Pat. No. 6,481,296, issued Nov. 19, 2002, and is a continuation of PCT Application No. PCT/JP00/04061, filed on Jun. 21, 2000, both of which are hereby incorporated herein by reference.

This application is related to U.S. Patent Application entitled RELATIVE ROTATION SENSOR AND RELATED METHODS having attorney docket number NAGAT14.1C1DV2, which is filed on even date herewith as application Ser. No. 10/225,401 and which is hereby incorporated herein by reference.

BACKGROUND OF THE INVENTION

The present invention relates to a rotation sensor attached to a shaft or other object for assembly experiencing an offset of the angle of relative rotation at different positions in the axial direction and detecting by a non-contact method the difference in angle of relative rotation of the object for assembly and a measurement circuit using the rotation sensor and relates to a rotation sensor for detecting by a non-contact method the angle of rotation (position) of the object for assembly in addition to the angle of relative rotation.

BACKGROUND ART

To detect the rotational torque acting on the steering wheel shaft of an automobile comprising a drive shaft and a driven shaft coupled via a torsion joint, sometimes a rotation sensor is used as a relative rotation angle detector for detecting the angle of relative rotation of the steering wheel shaft. As an example of such a rotation sensor, Japanese Examined Patent Publication (Kokoku) No. 63-45528 discloses a configuration forming notches at predetermined positions in the longitudinal direction of two conductive members comprised of cylindrical shapes, rotating a shaft attached with a conductive member relatively so as to change the area of the conductive member cutting across the magnetic field and generate an eddy current in the conductive member and thereby change the inductance of a coil, and detecting the amount of offset of the angle of relative rotation at the shaft by a non-contact method.

According to this configuration, since the area of the conductive member cutting across the magnetic field is changed by the change in relative position of two conductive members, in order to accurately detect the amount of offset of the angle of rotation of the shaft, it is necessary to make the amount of offset of the angle of the rotation of the two shafts and the magnitude of the eddy current occurring in the conductive members proportional. Structurally, the area of a conductive member cutting across the magnetic field is proportional to the amount of offset, but what is necessary is to make the intensity of the magnetic field cut across by the two conductive members constant.

The magnetic field generated from the coil is however distributed substantially uniformly in the circumferential direction, while the distribution of the magnetic field on the rotation axis direction or radial direction of the coil is not uniform. Therefore, to ensure sensing with good linear characteristics, the two conductive members have to be assembled to overlap without a clearance. To improve the detection precision of the angle of rotation of the shaft, there is the problem that assembly precision continues to be strictly required.

Further, in a conventional measurement circuit of a rotation sensor, an AC current flows to an excitation coil provided at a stationary core and electrically connected to an oscillation circuit. The impedance of the coil changes depending on the angle of relative rotation of the first and second rotors. Further, the oscillation frequency of the oscillation circuit fluctuates in accordance with the change in the impedance of the excitation coil. Therefore, in this measurement circuit, the practice has been to count the pulse signals generated from the oscillation circuit by a pulse counter so as to detect the oscillation frequency and to measure the angle of relative rotation of the first rotor and the second rotor.

In this measurement circuit, however, the oscillation frequency of the oscillation circuit fluctuates in the range of 98 kHz to 108 kHz with respect to a change in the impedance of the coil. The circuit normally measured the number of pulses by a resolution for counting the pulse signals in a time of 5 ms. Therefore, if this measurement circuit is used to detect the torque acting on for example the steering wheel shaft of a vehicle, there was the problem that time was taken for counting the pulses by a pulse counter and the response became poor. For example, when the oscillation frequency of the oscillation circuit fluctuates from 100 kHz to 105 kHz due to this resolution, the number of pulses becomes measured by a fluctuation from 500 pulses to 525 pulses, that is, by an amount of fluctuation of 25 pulses. Further, in this measurement circuit, if the time for counting pulses of the pulse counter is shortened to improve the response, the amount of fluctuation of the number of pulses becomes smaller and the resolution falls, so there is the problem that detection of fluctuation of the oscillation frequency becomes difficult.

On the other hand, the rotation sensor shown in FIG. 53 is comprised of a stationary magnetic member 1 having a coil and a magnetic material rotor 2 having irregularities on its outer circumference between which is arranged, in a predetermined gap, a metal rotor 3 having a plurality of metal teeth 3a. This rotation sensor has the plurality of metal teeth 3a arranged at equal intervals in the circumferential direction and generates an eddy current in the metal teeth 3a when the metal teeth 3a cut across the AC magnetic field with the irregular distribution due to the relative rotation of the two rotors 2 and 3. This eddy current fluctuates due to the angle of relative rotation between the two rotors 2 and 3. Therefore, the rotation sensor detects the angle of relative rotation of the two rotors 2 and 3, that is, the angle of relative rotation between two relatively rotating members, by measuring the change in the impedance of the coil caused due to the fluctuation in the eddy current induced inside the members.

A rotation sensor using such an irregular distribution AC magnetic field, however, is governed in characteristics by two parameters, that is, the fluctuation $\Delta B$ of the magnetic 10 flux density and the boundary area $\Delta\theta$ of the intensity of the magnetic field in the distribution produced as shown in FIG. 54 showing the fluctuation in magnetic flux density in the circumferential direction in the gap. That is, the rotation sensor has a higher sensitivity of detection of the angle of rotation the larger than fluctuation $\Delta B$ of the magnetic flux density and has a good linearity of detection output the smaller the boundary area $\Delta\theta$ of the distribution of the magnetic field.

The rotation sensor, however, suffers from the following problem if making the degree of irregular distribution of the AC magnetic field due to the size of the gap larger.

As is well known, in a magnetic circuit, fluctuations of the effective specific magnetic permeability due to the size of the gap deviate from a linear characteristic. That is, in a magnetic circuit, the smaller the gap, the larger the fluctuation of the effective specific magnetic permeability. Since the metal rotor 3 is arranged in the gap in this way, if considering the manufacturing precision and rotational precision of the rotor, normally in the rotation sensor, the gap G1 is desirably set to at least 1 rom as shown in FIG. 53. An amount of change of the gap of several millimeters is required in order for the rotation sensor to obtain a suitable detection sensitivity. That is, the rotation sensor has to be of a size giving an amount ΔG of change of the gap (=G2−G1) accompanying irregularity of the magnetic material rotor 2 of several millimeters.

On the other hand, in the rotation sensor shown in FIG. 53, the thickness of the magnetic material rotor 2 is changed cyclically corresponding to the plurality of metal teeth 3a along the circumferential direction. Therefore, since the gap formed in the circumferential direction between the fixed magnetic member 1 and magnetic material rotor 2 is step-like in shape, when magnetic flux flows from the core material with the high magnetic permeability into the air with the low magnetic permeability, it characteristically concentrates at the corner portions of the core material. Therefore, due to the magnetic flux concentrating at the corner portions, in this rotation sensor, there was the problem that the boundary area Δθ of the distribution of the magnetic field became large and had a detrimental effect on the linearity of the detection output.

Further, the rotation sensor, for example, the rotation sensor disclosed in Japanese Unexamined Patent Publication (Kokai) No. 7-139905, could measure a rotational angle of within 180 degrees in the left and right directions (within one turn), but could not measure an angle of rotation exceeding 180 degrees. Further, it was not possible to measure which of the right or left positions the measured angle of rotation was and it was necessary to measure the rotational position separately.

In this case, depending on the application, the rotation sensor is sometimes required to measure the rotational torque rather than the angle of rotation.

The present invention was made in consideration of the above point. A first object of the present invention is to provide a rotation sensor superior in detection precision relating to the angle of relative rotation of an object for assembly.

Further, a second object of the present invention is to provide a rotation sensor able to measure the angle of rotation (position) at a high precision in addition to the angle of relative rotation of the object for assembly.

Further, a third object of the present invention is to provide a measurement circuit of a rotation sensor having a high resolution with respect to measurement of the angle of relative rotation of the object for assembly and able to improve the response.

A fourth object of the present invention is to provide a rotation sensor enabling easy assembly without requiring precision of assembly to the object for assembly and superior in detection precision relating to the angle of relative rotation.

A fifth object of the present invention is to provide a rotation sensor small in size, having a linear detection output, and high in sensitivity of detection.

A sixth object of the present invention is to provide a rotation sensor able to differentiate whether a rotation position is left or right, able to measure even an angle of rotation of over 180 degrees, and able to measure the angle of rotation and/or rotational torque.

DISCLOSURE OF THE INVENTION

To achieve the first and fourth objects, a rotation sensor of a first aspect of the present invention is provided with a first rotor fixed at a predetermined position in an axial direction of a shaft, a second rotor fixed to said shaft adjoining said first rotor, and a magnetic core arranged around said first rotor and having a resonance coil forming a magnetic circuit together with said first rotor, wherein said first rotor is formed by a magnetic material comprised of an insulator, an irregular magnetic field is formed with said magnetic core, and said second rotor is provided with a conductor cutting across areas of different intensities of the irregular magnetic field in accordance with a difference in angle of rotation when a difference in angle of relative rotation arises between the shaft position where the first rotor is fixed and the shaft position where the second rotor is fixed.

To achieve the first and fifth objects, a second aspect of the present invention provides a rotation sensor provided with a first rotor formed from an insulating magnetic material and attached to a predetermined position in an axial direction of a rotating first shaft, a stationary core fixed to a fixing member and having a core body and an excitation coil carrying an AC current and forming a magnetic circuit working with said insulating magnetic member, and a second rotor attached to a second shaft rotating relative to said first shaft adjoining said first rotor and arranged between said first rotor and said stationary core and detecting an angle of relative rotation of said first and second shafts, said first rotor being provided with conductor layers at predetermined intervals along a circumferential direction and the second rotor being formed with conductor teeth at intervals corresponding to said conductor layers.

Preferably, said insulating magnetic material and said core body are formed by an insulating material comprised of a mixture of a thermoplastic resin and a soft magnetic material and the content of the soft magnetic material is at least 10 vol % to not more than 70 vol %.

To achieve the first and third objects, a measurement circuit of a rotation sensor of a third aspect of the present invention provides a rotation sensor provided with a first rotor formed from an insulating magnetic material, a stationary core having a core body and an excitation coil carrying an AC current and forming a magnetic circuit working with said insulating magnetic material, and a second rotor arranged between said first rotor and said stationary core and measuring an angle of relative rotation of said first and second rotors, further provided with an oscillating means for generating an oscillation signal of a specific frequency, a phase shifting means for shifting a phase of said oscillation signal in accordance with a magnitude of an eddy current generated at said second rotor, a shift detecting means for detecting an amount of phase shift of said shifted oscillation signal, and a measuring means for measuring an angle of relative rotation based on said detected amount of phase shift.

That is, the sensor detects the phase shift of the oscillation pulse signal applied to the excitation coil forming the magnetic circuit in accordance with the magnitude of the eddy current arising in the second rotor and measures the angle of relative rotation of the first rotor and the second rotor from the relationship of the detected amount of phase shift and the angle of relative rotation.

To achieve the second and sixth objects, a fourth aspect of the present invention provides a rotation sensor provided with a first rotor having a plurality of first conductor layers arranged at predetermined intervals along a circumferential direction, a second rotor having an insulating magnetic layer and a second conductor layer, 25 rotating together with said first rotor, and rotating relative to said first rotor within a predetermined angle, a fixing member having an excitation coil and a core formed from an insulating magnetic material and holding said excitation coil, and an oscillating means connected to said excitation coil and generating an oscillation signal of a specific frequency, further provided with a displacement sensor having a movable magnetic core moving in a rotation axis direction of said rotor along with rotation of said second rotor and a coil connected with said oscillating means and working with said moving magnetic core, and detecting a change of coil inductance based on movement in the rotation axis direction of said movable magnetic core.

Preferably, the sensor is provided with, as said excitation coil, at least one of a relative rotation angle coil for detecting an angle of relative rotation accompanying relative rotation of said first and second rotors and a rotation angle coil for detecting an angle of rotation of said first and second rotor with respect to said fixing member.

More preferably, the sensor is further provided with a first signal processing means for processing an output signal from said relative rotation angle coil, a second signal processing means for processing an output signal from a means for measuring said relative angle of rotation or an output signal from said rotation angle coil and a displacement sensor, and a means for measuring the angle of rotation.

Further, to achieve the second and sixth objects, a fourth aspect of the present invention provides a rotation sensor provided with a first rotor having a plurality of first conductor layers arranged at predetermined intervals along a circumferential direction, a second rotor having an insulating magnetic layer and a second conductor layer, rotating together with said first rotor, and rotating relative to said first rotor within a predetermined angle, a fixing member having a relative rotation angle coil for detecting an angle of relative rotation accompanying relative rotation of said first and second rotors, a rotation angle coil for detecting an angle of rotation of said first and second rotor, and a core formed from an insulating magnetic material and holding said relative rotation angle coil and rotation angle coil, and an oscillating means connected to said relative rotation angle coil and rotation angle coil and generating an oscillation signal of a specific frequency, further provided with a displacement sensor having a movable magnetic core moving in a rotation axis direction of said second rotor along with rotation of said second rotor and a coil connected with said oscillating means and working with said moving magnetic core, and detecting a change of coil inductance based on movement in the rotation axis direction of said movable magnetic core.

Preferably, the sensor is further provided with a first signal processing means for processing an output signal from said relative rotation angle coil, a second signal processing means for processing an output signal from a means for measuring said relative angle of rotation and an output signal from said rotation angle coil and a displacement sensor, and a means for measuring the angle of rotation.

More preferably, the sensor is further provided with a pitch sensor having a conductor piece and insulating layer and a coil connected to said oscillating means and working with said conductor piece, one being provided at said fixing member and the other at said second rotor, and detecting a change of coil inductance based on rotation of said second rotor.

More preferably, the second signal processing means processes a signal so as to output the same signal as an output signal at an upper limit point and a lower limit point of an output signal from said rotation angle coil near the upper limit point and lower limit point.

Further, to achieve the second and sixth objects, another aspect of the invention according to the fourth aspect provides a rotation sensor provided with a first rotor having a plurality of first conductor layers arranged at predetermined intervals along a circumferential direction, a second rotor having an insulating magnetic layer and a second conductor layer, rotating together with said first rotor, and rotating relative to said first rotor within a predetermined angle, a fixing member having an excitation coil and a core formed from an insulating magnetic material and holding said excitation coil, and an oscillating means connected to said excitation coil and generating an oscillation signal of a specific frequency, further provided with a displacement sensor having a first gear member fixed to said fixing member, a second gear member having first and second gear parts with different number of teeth, said first gear part engaging with a third gear part formed at said second rotor and the first gear member, a slider having a fourth gear part engaging with said second gear part and a third conductor layer, being transmitted the rotation of said second rotor reduced in speed, and comprised of a magnetic material moving in a rotational direction of said second rotor, and a coil member having a coil provided at said fixing member and connected to said oscillating means and detecting a change of coil inductance between said third conductor layer and coil based on rotation of said first and second rotors.

Preferably, the sensor is provided with, as said excitation coil, at least one of a relative rotation angle coil for detecting an angle of relative rotation accompanying relative rotation of said first and second rotors and a rotation angle coil for detecting an angle of rotation of said first and second rotor with respect to said fixing member.

More preferably, the sensor is further provided with a first signal processing means for processing an output signal from said relative rotation angle coil, a second signal processing means for processing an output signal from a means for measuring said relative angle of rotation or an output signal from said rotation angle coil and a displacement sensor, and a means for measuring the angle of rotation.

Further, to achieve the second and sixth objects, another aspect of the fourth aspect of the present invention provides a rotation sensor provided with a first rotor having a plurality of first conductor layers arranged at predetermined intervals along a circumferential direction, a second rotor having an insulating magnetic layer and a second conductor layer, rotating together with said first rotor, and rotating relative to said first rotor within a predetermined angle, a fixing member having a relative rotation angle coil for detecting an angle of relative rotation accompanying relative rotation of said first and second rotors, a rotation angle coil for detecting an angle of rotation of said first and second rotor, and a core formed from an insulating magnetic material and holding said relative rotation angle coil and rotation angle coil, and an oscillating means connected to said relative rotation angle coil and rotation angle coil and generating an oscillation signal of a specific frequency, further provided with a displacement sensor having a first gear member fixed to said fixing member, a second gear member having first and second gear parts with different number of teeth, said first gear part engaging with a third gear part formed at said second rotor and the first gear member, a slider having a fourth gear part engaging with said second gear part and a third conductor layer, being transmitted the rotation of said second rotor reduced in speed, and comprised of a magnetic material moving in a rotational direction of said second rotor, and a coil provided at said fixing member and connected to said oscillating means and detecting a change of coil inductance between said third conductor layer and coil based on rotation of said first and second rotors.

Preferably, the sensor is further provided with a first signal processing means for processing an output signal from said relative rotation angle coil, a second signal processing means for processing an output signal from a means for measuring said relative angle of rotation and an output signed from said rotation angle coil and a displacement sensor, and a means for measuring the angle of rotation.

More preferably, the sensor is further provided with a pitch sensor having a conductor piece and a coil connected to said oscillating means and working with said conductor piece, one being provided at said fixing member and the other at said second rotor, and detecting a change of coil inductance based on rotation of said second rotor.

More preferably, the second signal processing means processes a signal so as to output the same signal as an output signal at an upper limit point and a lower limit point of an output signal from said rotation angle coil near the upper limit point and lower limit point.

BRIEF DESCRIPTION OF THE DRAWINGS

FIG. 10 is a plane view of the rotation sensor of FIG. 9;

FIG. 11A and FIG. 11B are plan views of a relative magnitude of magnetic flux density in the state where the first rotor and second rotor of FIG. 10 are rotated relative to each other;

BEST MODE FOR WORKING THE INVENTION

Figure 1:
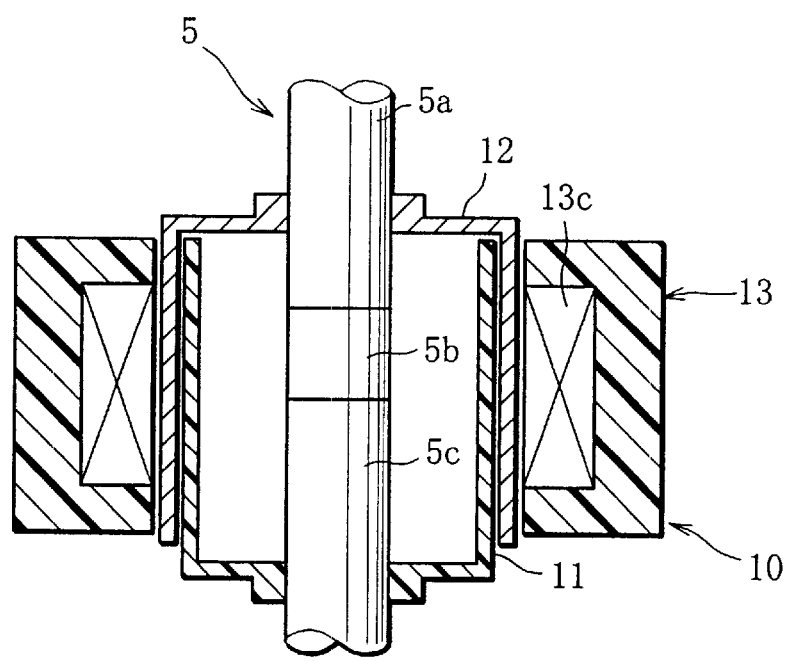
FIG. 1 is a sectional view schematically showing a first embodiment of a rotation sensor according to a first aspect of the present invention.
Figure 2:
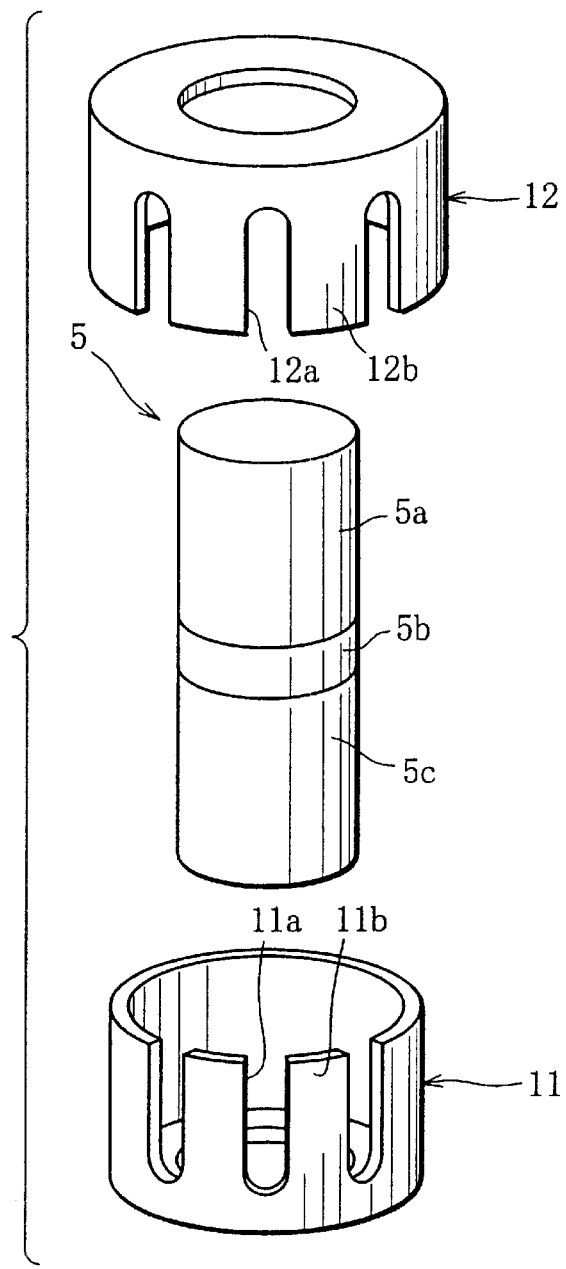
FIG. 2 is a disassembled perspective view schematically showing the rotation sensor of FIG. 1 except for a magnetic material core.

Next, an explanation will be given of a rotation sensor according to a first aspect of the present invention achieving the first and fourth objects while referring to the drawings. The rotation sensor 10, as shown in FIG. 1 and FIG. 2, has a first rotor 11, a second rotor 12, and a magnetic material core 13 (shown in only FIG. 1) and is attached to a shaft 5 comprised of a drive shaft 5a, a driven shaft 5c, and a torsion joint 5b coupling the two and increasing in torsion in accordance with the torque.

The first rotor 11 is shaped as a cylinder with a closed bottom and is fixed to the driven shaft 5c by an adhesive or screws or other fasteners. The second rotor 12 also is shaped as a cylinder with a closed bottom provided with an inside diameter larger than the outside diameter of the first rotor 11 and is fixed to the drive shaft 5a by an adhesive or screws or other fasteners. Further, around the second rotor 12, the magnetic material core 13 is fixed to a non-rotating structure through a nonmagnetic material bracket (not shown).

Therefore, the peripheral edge of the second rotor 12 is positioned in a ring-shaped gap formed between the first rotor 11 and magnetic material core 13.

Figure 3:
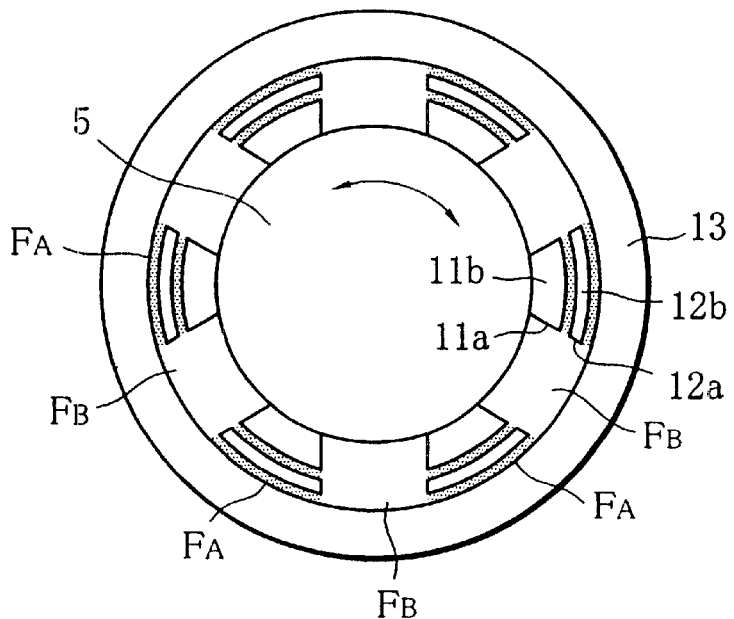
FIG. 3 is a plan view of a relative magnitude of magnetic flux density in the rotation sensor of FIG. 1.

The first rotor 11 is comprised of a soft magnetic member comprised of for example nylon, polypropylene (PP), polyphenylene sulfide (PPS), ABS resin, or another insulating molding material in which for example an Ni—Zn or Mn—Zn based soft magnetic powder is mixed at a certain ratio, has thermoplasticity, is inexpensive in cost, and is superior in vibration resistance. Further, at the outer circumference of the first rotor II, as clear from FIG. 2 and FIG. 5, are formed six notches 11a at equal intervals in the circumferential direction and are formed six teeth 11b at equal intervals between these notches. By adopting this configuration, as shown in FIG. 3, areas FA with a large magnetic flux density are formed between the magnetic material core 13 and the teeth 11b of the first rotor, while areas FB with a small magnetic flux density are formed between the magnetic material core 13 and the notches 11a of the first rotor. That is, an irregular magnetic field is formed between the first rotor 11 and the magnetic material core 13. Further, if the driven shaft 5c to which the first rotor 11 is fixed rotates, the irregular magnetic field rotates along with this.

The magnetic material core 13 is comprised of a cylindrical body comprised of a soft magnetic member similar to the above first rotor 11 at the inside circumference of which is wound a resonance coil 13c forming a magnetic circuit CMG (see FIG. 4) working together with the first rotor 11.

The second rotor 12 is comprised of aluminum or another conductive member and forms a conductor as a whole. Further, at the outer circumference, as shown in FIG. 2 and FIG. 5, six notches 12a similar to those of the first rotor 11 are formed at equal intervals and six teeth 12b are formed at equal intervals between the notches.

Figure 5A:
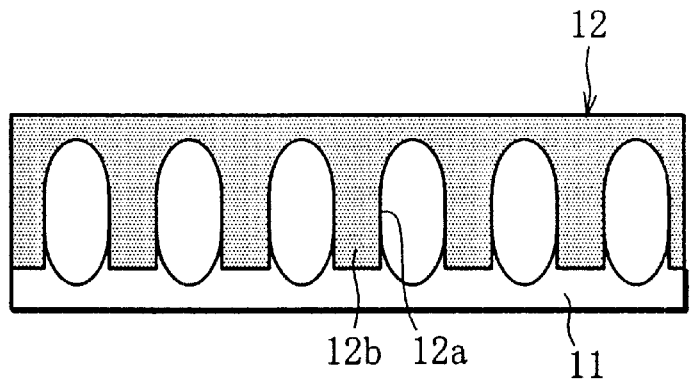
FIG. 5A to FIG. 5C are developed views of the outer circumference of the first rotor and the second rotor in the rotation sensor of FIG. 1.
Figure 6A:
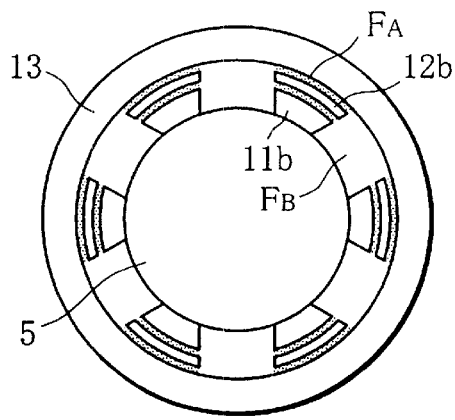
FIG. 6A to FIG. 6C are plan views of a relative magnitude of magnetic flux density in the state where the first rotor and second rotor of FIG. 3 are rotated relative to each other.

Therefore, as shown in FIG. 5A and FIG. 6A, in the state where the teeth 11b of the first rotor and the teeth 12b of the second rotor completely face each other, the magnetic flux density of the areas of the magnetic field where the second rotor 12 cuts across the magnetic circuit formed between the magnetic material core 13 and the teeth 11b of the first rotor becomes the strongest and therefore the eddy current generated at the second rotor 12 also becomes the largest.

Figure 5B:
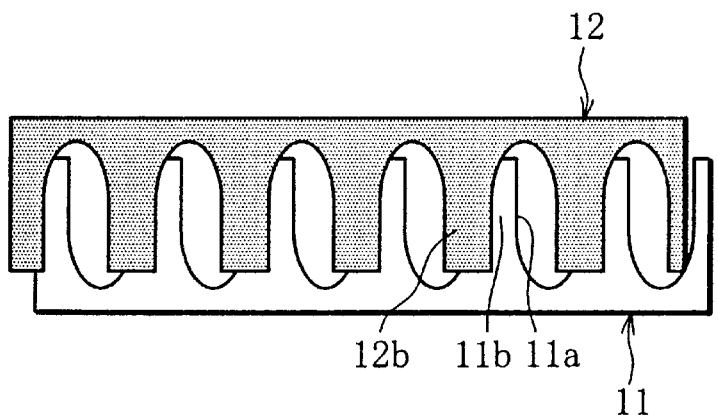
Figure 6B:
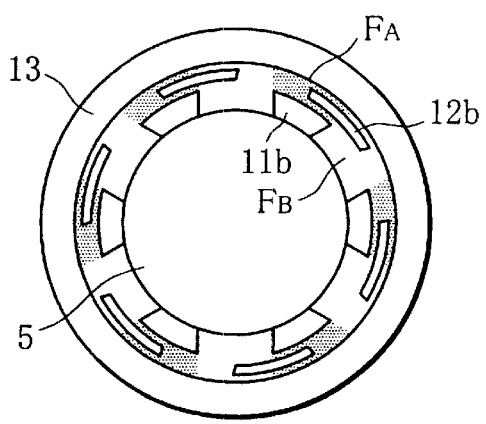

Further, as shown in FIG. 5B and FIG. 6B, in the state where the teeth 11b of the first rotor and the teeth 12b of the second rotor partially face each other, the magnetic flux density of the areas of the magnetic field where the second rotor 12 cuts across the magnetic circuit becomes intermediate and therefore the eddy current generated at the second rotor 12 also becomes intermediate.

Figure 5C:
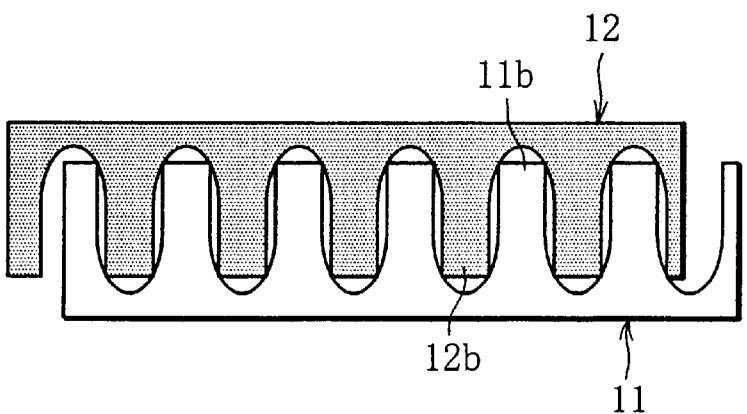
Figure 6C:
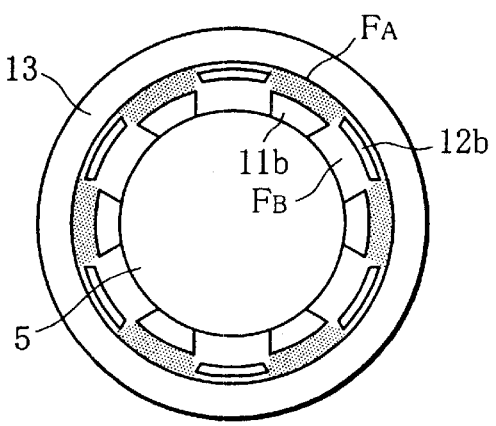

Further, as shown in FIG. 5C and FIG. 6C, in the state where the teeth 11b of the first rotor and the teeth 12b of the second rotor do not face each other at all, the magnetic flux density of the areas of the magnetic field where the second rotor 12 cuts across the magnetic circuit becomes weakest and therefore the eddy current generated at the second rotor 12 also becomes smallest.

Due to relative rotation of the drive shaft 5a and the driven shaft 5c, the teeth 11b of the first rotor and the teeth 12b of the second rotor become offset differently in the order from FIG. 5A (FIG. 6A) to FIG. 5C (FIG. 6C). In accordance with this, as explained above, the magnitude of the eddy current generated at the second rotor 12, that is, the conductor, cyclically changes. It is possible to utilize the change in the coil impedance accompanying a change of the eddy current to easily detect the difference in angle of relative rotation of the first rotor 11 and the second rotor 12 and in turn the difference in angle of relative rotation between the driven shaft 5c and the drive shaft 5a.

Figure 7:
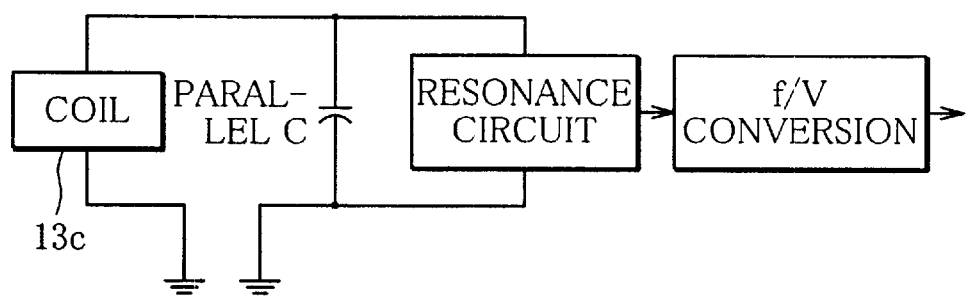
FIG. 7 is a block diagram of a circuit showing the connection of the coil and signal processing circuit of FIG. 1.

Specifically, the resonance coil 13c, as shown in FIG. 7, is electrically connected for f/V conversion through the resonance circuit and finds the resonance frequency $f_0=1/(2\Pi(LC)^{1/2})$ from the inductance L of the coil and the capacitance C of the capacitor (not shown in FIG. 1). The magnitude of the eddy current generated at the second rotor 12 as explained above changes due to the relative rotation between the first rotor 11 and the second rotor 12. Due to this, the coil impedance of the coil 13c changes and the resonance frequency $f_0$ of the resonance circuit changes. By detecting this $f_0$ by a signal processing circuit, it is possible to measure the difference in angle of relative rotation of the first rotor 11 (driven shaft 5c) and the second rotor 12 (drive shaft 5a).

As explained above, according to the structure of the rotation sensor 10 according to the present invention, in the same way as the conventional rotation sensor, the first rotor 11 is formed by a magnetic material comprised of an insulator. Therefore, in the rotation sensor 10, due to the fact that the magnetic flux in the gap concentrates at the magnetic material, the degree of irregularity of the distribution of the magnetic flux density in the gap is tremendously improved and even if precision of the relative positions of attachment of the first rotor 11 and second rotor 12 is not strictly required, the difference in angle of relative rotation between the first rotor 11 and the second rotor 12 and the amount of change of the area by which the conductor of the second rotor 12 cuts across the areas of different intensities of the irregular magnetic field become proportional at all times and the linearity of the detection output becomes superior.

More specifically, in the rotation sensor 10 according to the present invention, since the only soft magnetic members are the first rotor 11 and the magnetic material core 13, even if attaching the two without strictly maintaining the concentricity of the two and the gap between the outer circumference of the first rotor 11 and the inner circumference of the magnetic material core 13 becomes irregular, the difference in magnetic resistance is canceled out across the entire circumferential direction. As a result, the rotation sensor 10 has a magnetic resistance substantially matching the sum of the magnetic resistance when attaching the first rotor 11 and the magnetic material core 13 while strictly maintaining the concentricity. That is, the rotation sensor 10 has a gap formed in a ring shape, so the sum of the magnetic resistance becomes constant without being affected by fluctuation in the concentricity between the shaft and coil and wavering in the axis of the center of rotation, the detection error is also held small, and the precision of detection becomes superior.

Further, since the first rotor 11 is formed by a magnetic material comprised of an insulator, no eddy current will occur at the first rotor 11. Therefore, in the rotation sensor 10, the difference in angle of relative rotation of the shaft 5 and the magnitude of the eddy current generated due to the conductor of the second rotor 12 cutting across areas of different intensities of the irregular magnetic field become proportional and the linearity of the detection output becomes superior. That is, since the rotation sensor 10 generates an eddy current influencing impedance of the coil 13c only at the second rotor 12, it is possible to improve the sensitivity and the linearity of the detection output.

Therefore, when detecting the relative angle of rotation with superior linearity, the rotation sensor 10 can ease the range of allowance of the gap between rotors. Therefore, for example, when assembling the rotation sensor of the present invention into a steering wheel system of an automobile, for which mass production is required, allowing a gap between rotors of up to the order of several millimeters in this way contributes a great deal to the reduction of the assembly cost. Further, assembly of the rotation sensor becomes possible even on the automobile assembly line and there are no restrictions on the assembly process.

Further, since the first rotor 11 and the magnetic material core 13 are produced by a magnetic material having an insulation property, the rotation sensor 10 can be reduced in manufacturing cost.

Figure 4:
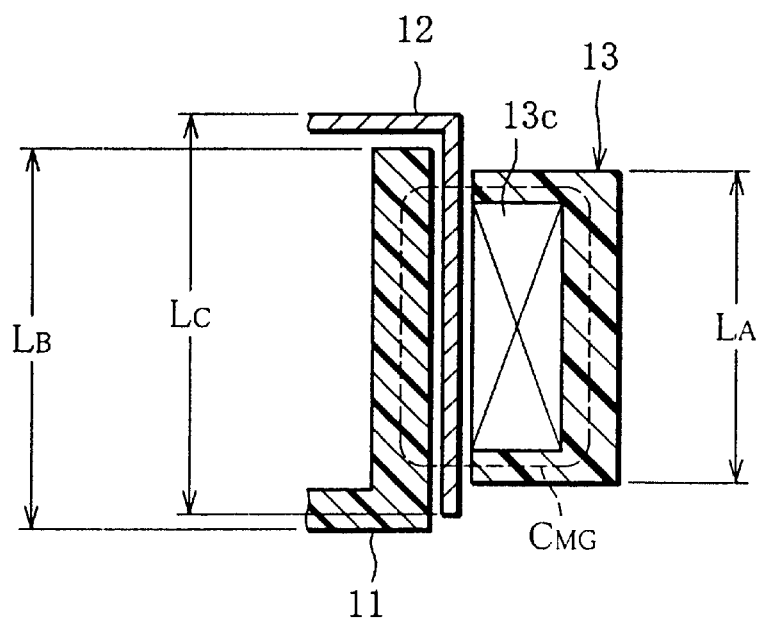
FIG. 4 is a partial sectional view of a magnetic circuit formed in the rotation sensor of FIG. 1.

Here, the rotation sensor 10, as shown in FIG. 4, preferably has relative dimensions of $L_B>L_A$ and $L_C>L_A$ among the total length $L_A$ in the axial direction of the magnetic material core 13, the total length $L_B$ in the axial direction of the first rotor 11, and the total length $L_C$ in the axial direction of the second rotor 12. Due to this, the rotation sensor 10 eases the required precision of the mounting positions in the axial direction of the first rotor 11, the second rotor 12, and the magnetic material core 13 and facilitates assembly of the rotation sensor 10.

Since the detection sensitivity of the rotation sensor 10 is substantially proportional to the number of teeth on the circumference, the larger the number of teeth on the circumference, the narrower the range of the relative angle which can be detected, but the higher the detection sensitivity. Specifically, in the case of the first embodiment, the six teeth and the six notches have uniform sizes and each occupy a range of angle of 1/12 of 360 degrees (30 degrees). Therefore, the maximum amount of offset of the angle of relative rotation which can be detected is ±15 degrees.

Therefore, when the amount of offset of the angle of relative rotation of the shaft 5 is for example a small ±8 degrees, but it is necessary to precisely detect an amount of offset of the angle of relative rotation, this rotation sensor 10 is suitably used for detection of torque of the shaft 5.

Figure 8:
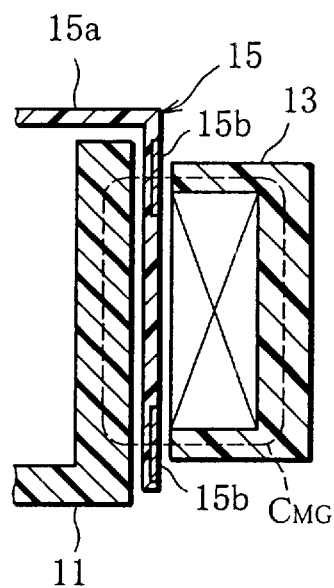
FIG. 8 is a partial sectional view of a modification of the rotation sensor of FIG. 1.

Further, unlike the above embodiment, instead of forming the second rotor 12 by just aluminum or another conductor, as shown in FIG. 8, it is possible to form the second rotor 15 by depositing aluminum or another conductor 15b on part of a moldable synthetic resin material 15a. By making the conductor 15b of the second rotor gradually cut across the magnetic field formed by the first rotor 11 and magnetic material core 13 in accordance with relative rotation of the shaft 5, it is possible to precisely detect the amount of offset of the angle of rotation of the shaft 5 in the same way as the above rotation sensor 10.

Next, an explanation will be made of a rotation sensor according to a second embodiment of the present invention. Here, in the rotation sensor explained below, use is made of corresponding reference numerals for portions the same in configuration as in the rotation sensor 10.

Figure 9:
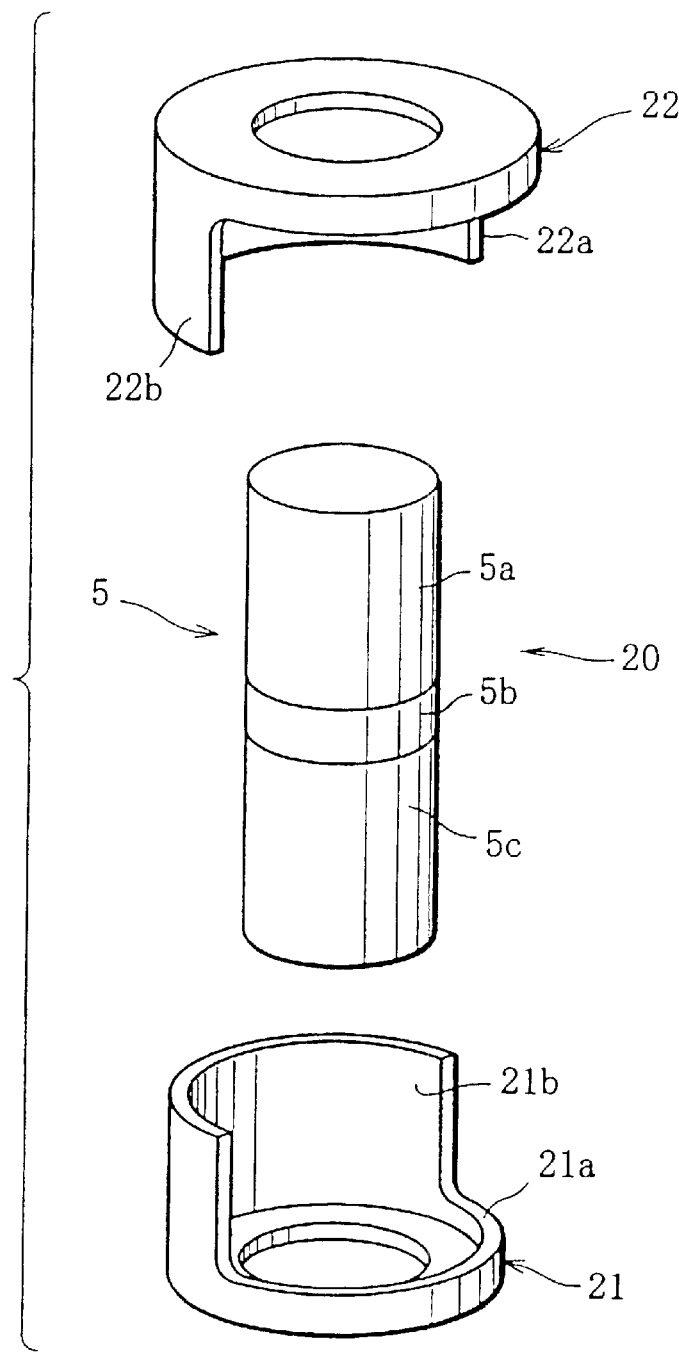
FIG. 9 is a disassembled perspective view schematically showing a rotation sensor according to a second embodiment of the present invention except for the magnetic material core.

The rotation sensor 20, as shown in FIG. 9, is attached to a shaft 5 comprised of a drive shaft 5a, a driven shaft 5c, 5 and a torsion joint 5b. A first rotor 21 comprised of the above insulating soft magnetic member is fixed to the driven shaft 5c, while a second rotor 22 comprised overall of aluminum or another conductor and having an inside diameter larger than the outside diameter of the first rotor 21 is fixed to the drive shaft 5a. Further, a magnetic material core 23 (not shown in FIG. 9) is arranged around the first rotor 21.

The magnetic material core 23 has a configuration similar to the magnetic material core 13 of the first embodiment, but there is a difference in configuration in the point that instead of the first rotor 21 and second rotor 22 each having six teeth and notches around them as in the shapes of the first embodiment, they have semicircular arcuate continuous notches 21a and 22a and teeth 21b and 22b.

By adopting this configuration, in the rotation sensor 20, as shown in FIG. 10, the area between the end-view semicircular arcuate teeth 21b of the first rotor 21 and the magnetic material core 23 becomes the area FA with the large magnetic flux density, while the area between the end-view semicircular arcuate notches 21a of the first rotor 21 and the magnetic material core 23 becomes the area FB with the small magnetic flux density. As a result, the rotation sensor 20 is formed with an irregular magnetic field across its circumferential direction.

Further, since the conductor of the second rotor 22 cutting across the areas of different intensities of the irregular magnetic field also has end-view semicircular arcuate teeth 22b shown in FIG. 9, there is a proportional relationship between the amount of offset of the angle of relative rotation of the shaft 5 and the magnitude of the eddy current generated at the conductor of the second rotor 22 across a wide range.

In the case of the second embodiment, it is possible to continuously measure the angle of relative rotation of the two rotors 21 and 22, so for example the sensor is suitable for use in detecting the steering angle of the steering wheel of an automobile.

Figure 12A:
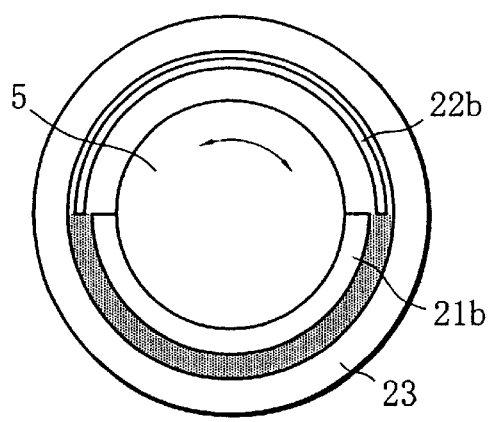
FIG. 12A and FIG. 12B are plan views of a relative magnitude of magnetic flux density in the state where the first rotor and second rotor of FIG. 10 are further rotated relative to each other.
Figure 12B:
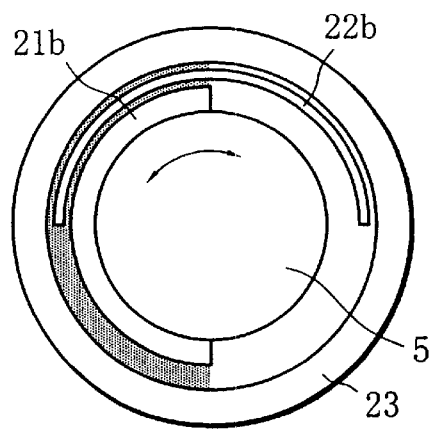

Specifically, to detect offset of the angle of relative rotation across a range of 360 degrees, teeth of the two rotors 21 and 22 are formed to end-view semicircular arcuate shapes as explained above. Then, as shown in FIG. 11 and FIG. 12, the teeth 22b of the second rotor gradually cut across the magnetic circuit formed by the first rotor 21 and 15 magnetic material core 23 in accordance with the amount of offset of the angle of relative rotation of the shaft 5 to generate an eddy current proportional to the amount of change of area of the second rotor 22 cutting across the magnetic circuit and to thereby change the coil impedance 20 proportionally. It is therefore possible to detect the amount of offset of the angle of rotation across a broad range superior in linearity and possible to precisely detect the steering angle of the shaft 5.

Further, when it is necessary to determine the direction of the angle of rotation of the relative rotation of the shaft, it is sufficient to additionally provide an absolute position sensor at the rotation sensor 20. For example, if attaching a commercially available photo sensor to a suitable position of the first rotor or second rotor and turning on the output of the photo sensor when the angle of relative rotation is 0 to 180 degrees, while turning off the output of the photo sensor when the angle of relative rotation is 180 to 360 degrees, it is also possible to simultaneously determine the direction of the angle of relative rotation of the shaft.

Next, an explanation will be given of a rotation sensor according to a second aspect of the present invention achieving the first and fifth objects based on FIG. 13 to FIG. 21.

Figure 13:
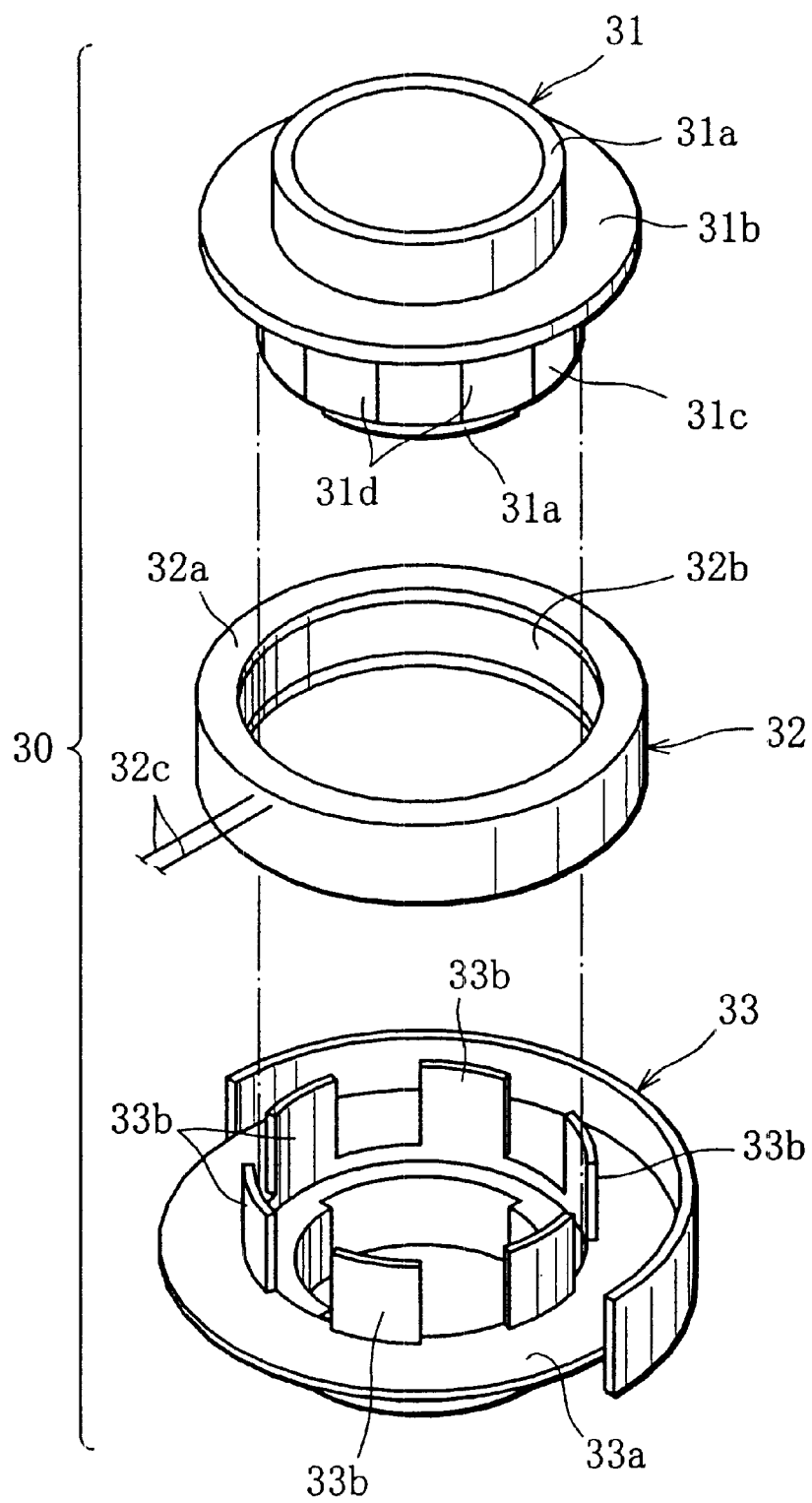
FIG. 13 is a perspective view of a first embodiment of a rotation sensor according to a second aspect of the present invention.
Figure 14:
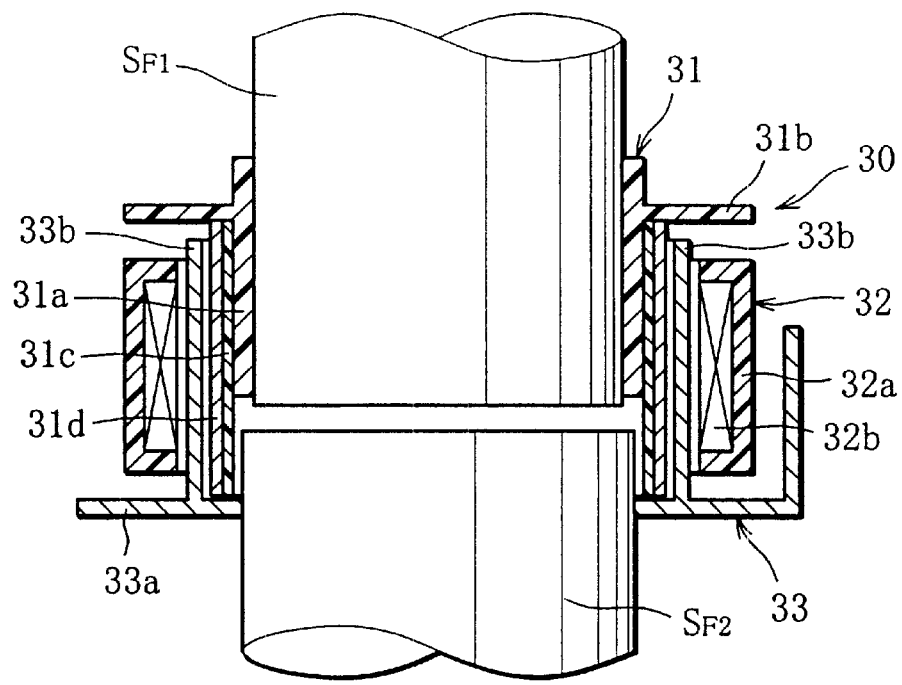
FIG. 14 is a sectional view of the state of attachment of the rotation sensor of FIG. 13 to first and second shafts.

The rotation sensor 30, as shown in FIG. 13, is provided with a first rotor 31, a stationary core 32, and a second rotor 33 and detects the angle of relative rotation of the relatively rotating first shaft SF1 and second shaft SF2 (see FIG. 14). The rotation sensor 30 for example is used when detecting the rotation torque of the steering wheel shaft of an automobile by the transmission of the rotation torque from the drive shaft to the driven shaft by a torsion joint. The angle of relative rotation of the two shafts SF1 and SF2 changes within a range of ±8 degrees.

The first rotor 31 is shaped as a cylinder and, as shown in FIG. 14, is attached to a predetermined position in the axial direction of the rotating first shaft SF1. The first rotor 31, as shown in FIG. 13, is comprised of a cylindrical shaft 31a at the top of which a flange 31b extending outside in the radial direction is integrally formed by a synthetic resin. An insulating magnetic member 31c is attached to the outer circumference of the cylindrical shaft 31a. A plurality of conductors, that is, copper foils 31d, is adhered at predetermined intervals, for example, intervals of a central angle of 60 degrees in the circumferential direction, on the surface of the insulating magnetic member 31c.

The copper foils 31d however may be provided inside as well rather than at the surface of the insulating magnetic member 31c. Further, the conductor layers may be made using a material such as aluminum, silver, or iron in addition to the copper foils 31d so long as they are conductors. Further, theoretically, the smaller the central angle and the smaller the arrangement intervals, the larger the number of conductor layers, the larger the amount of change of the eddy current induced in the members of the rotation sensor (proportional to the number of conductive layers), and the higher the detection sensitivity of the angle of relative rotation, but the smaller the range of angles that can be measured. The rotation sensor 30 of the present embodiment is provided with a plurality of copper foils 31d at intervals of central angles of 60 degrees as explained above, so the maximum range 10 of angle measurable is about 30 degrees.

Here, in magnetoelectric engineering, the following inequality is widely used as a measure of the thickness t (mm) required for the conductor layer:

$$t \geq 1/(\omega \kappa \mu)^{1/2}$$

where, $\omega$ is the angular frequency of the signal, $\kappa$ is the electroconductivity of the conductor layer, and $\mu$ is the magnetic permeability of vacuum.

Therefore, according to the above inequality, when fabricating the conductor layers by copper foils 31d, the thickness required for shielding against a magnetic field of 100 kHz is at least about 0.158 rom. In practice, when making the thickness t of the copper foils 31d 0.2 rom, in the case of an AC magnetic field of 100 kHz, the magnetic resistance generated by the copper foils 31d becomes sufficiently larger than the magnetic resistance due to the gap G in the radial direction between the first rotor 31 and the stationary core 32. That is, due to the shielding effect of the copper foils 31d, the rotation sensor 30 can form an AC magnetic field with a large extent of irregular distribution even if small in size.

Figure 16:
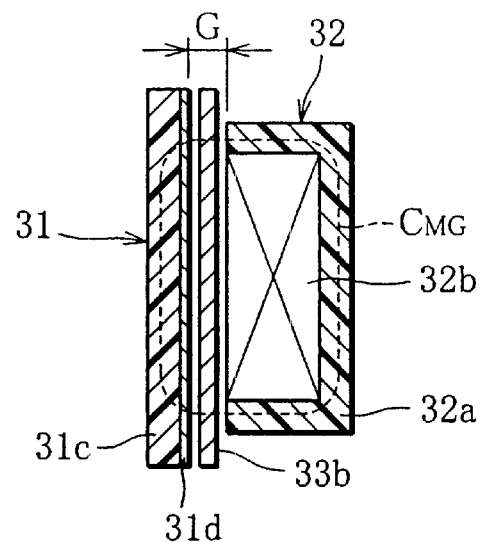
FIG. 16 is a sectional view of the schematic configuration of the rotation sensor of FIG. 14 enlarging the right half.

The stationary core 32, as shown in FIG. 16, is fixed to a fixing member (not shown) positioned near the steering wheel shaft at a gap G in the radial direction from the first rotor 31 and has a core body 32a comprised of an insulating magnetic material and an excitation coil 32b forming a magnetic circuit CMG working with the first rotor 31. The magnetic flux of the magnetic circuit CMG is formed concentrated as shown in FIG. 16. Therefore, as shown in FIG. 16, if the height in the axial direction of the first rotor 31 is made higher than the height in the axial direction of the second rotor 33, even if the first rotor 31 and second rotor 33 become offset in position in the axial direction, it is possible to suppress fluctuation of the output of the sensor. The excitation coil 32b is connected with a signal processing circuit (not shown) by a cable 32c extending outside (see FIG. 13) and an AC current flows from the signal processing circuit.

The second rotor 33, as shown in FIG. 13, has a plurality of metal teeth 33b equally arranged in a ring at the ring-shaped body 33a. The metal teeth 33b have intervals corresponding to the copper foils 31d. The second rotor 33 is comprised of for example copper, a copper alloy, aluminum, an aluminum alloy, iron, or an iron alloy. As shown in FIG. 13, the plurality of metal teeth 33b are arranged equally in a ring in the same way as the copper foils 31d and are provided corresponding to the copper foils 31d. The second rotor 33 can be configured as follows: That is, conductor layers of a certain thickness (for example, 0.2 rom copper foil or aluminum, silver, iron, or other materials) are arranged evenly in a ring in the same number as the copper foils 31d corresponding to the copper foils 31d at the cylindrical surface or inside fabricated by the insulating material. The second rotor 33 adjoins the first rotor 31 and is attached to the second shaft SF2 rotating relative to the first shaft SFI (see FIG. 14). The plurality of metal teeth 33b, as shown in FIG. 14, are arranged between the first rotor 31 and stationary core 32.

The rotation sensor 30 configured in this way has the first rotor 31 attached to the first shaft SFI and the second rotor 33 attached to the second shaft SF2. The stationary core 32 is assembled fixed to the fixing member.

Further, in the assembled rotation sensor 30, the magnetic flux due to the AC current flowing through the excitation coil 32b flows along the magnetic circuit CMG shown in FIG. 16. Due to this, since the plurality of copper foils 31d of the first rotor 31 are cut across by the AC magnetic field, an eddy current is induced in the copper foils 31d. At this time, the direction of the AC magnetic field induced due to the eddy current becomes opposite to the direction of the AC magnetic field due to the AC current flowing through the excitation coil 32b. As a result, since the directions of the magnetic flux due to the AC excitation current of the coil and the magnetic flux due to the above eddy current become opposite in the spaces of the gap portion where conductor layers are present, the total magnetic flux becomes small and conversely the direction of the magnetic flux due to the AC excitation current of the coil becomes the same in the space of the gap portion where conductor layers are not present, so the total magnetic flux density becomes larger.

Figure 15:
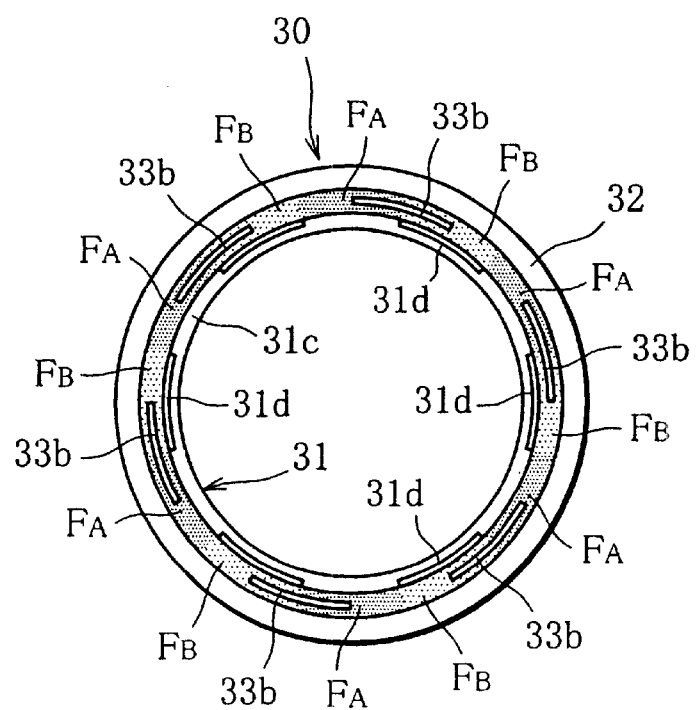
FIG. 15 is a plan view of an assembled rotation sensor.

Therefore, in the rotation sensor 30, in the gap G formed between the first rotor 31 and the stationary core 32, as shown in FIG. 15, areas FB where a copper foil 31d is present and the magnetic flux density is small and areas FA where no copper foil 31d is present and the magnetic flux density is large are alternately formed in the circumferential direction. As a result, the rotation sensor 30 is formed with an irregular magnetic field with intervals of a central angle of 60 degrees in the circumferential direction in the gap G between the first rotor and the stationary core 32. Here, FIG. 15 omits the cylindrical shaft 31a of the first rotor 31 without showing it.

Therefore, if the first rotor 31 rotates together with the first shaft SF1 relative to the second rotor 33, the irregular magnetic field also rotates along the circumferential direction along with the first rotor 31. Therefore, in the gap G, metal teeth 33b formed in the circumferential direction at intervals of central angles of 60 degrees cut across the irregular magnetic field. At that time, due to the relative rotation of the first rotor 31 and second rotor 33, the area of the metal teeth 33b positioned in an area FB with a small magnetic flux density and the area positioned in an area FA with a large magnetic flux density changes, the amount of the total magnetic flux cut across changes, and the magnitude of the eddy current occurring at the metal teeth 33b changes.

Therefore, in the rotation sensor 30, the magnitude of the eddy current occurring at the metal teeth 33b differs and the impedance of the excitation coil 32b fluctuates due to the angle of relative rotation between the first rotor 31 and second rotor 33. Therefore, the rotation sensor 30 can simply detect the angle of relative rotation between the first rotor 31 and the second rotor 33 if measuring the impedance by a known method in a signal processing circuit connected to the excitation coil 32b.

Here, the rotation sensor 30 of the present invention is structured so that the first rotor 31 rotates at a gap G with respect to the stationary core 32, so the size of the gap between the members has a direct effect on the manufacturing cost. That is, in the rotational sensor 30, it is extremely difficult to set the gap G to several $\mu$m. To obtain such a gap, precision of manufacture of the component parts and precision of assembly of the component parts are strictly required. In particular, when the rotation sensor 30 of the present invention is used for detection of a rotational torque in the steering wheel shaft of an automobile, considering the vibration etc. accompanying the driving of the automobile, it is ideal to make the gap G on the 5 millimeter order.

At this time, the effective magnetic permeability of the magnetic circuit CMG is determined by the specific magnetic permeability of the insulating magnetic member 31c or core body 32a and the size of the gap G. In particular, when the ratio of the length of the magnetic circuit CMG and the size of the gap G is of an order the same as the specific magnetic permeability of the magnetic material, the effective magnetic permeability of the magnetic circuit CMG is almost entirely governed by the size of the gap G, so the effect of the specific magnetic permeability of the magnetic material becomes extremely small. For example, in the same way as the case of a gap G of several millimeters for a length of the magnetic circuit CMG of 100 rom, when the ratio between the length of the magnetic circuit CMG and the gap G is much smaller than the specific magnetic permeability of the soft magnetic material, the effective magnetic permeability is determined almost entirely by the size of the gap G.

That is, in the rotation sensor 30, the effective magnetic permeability of the magnetic circuit CMG ends up determined substantially by the size of the gap G no matter how large the specific magnetic permeability of the insulating magnetic member 31c or the core body 32a.

Therefore, the insulating magnetic member 31c or core body 32a is formed of nylon, polypropylene (PP), polyphenylene sulfide (PPS), ABS resin, or another thermoplastic synthetic resin having an electrical insulation property into which is mixed a soft magnetic material powder comprised of an Ni—Zn or Mn—Zn based ferrite in a content of the soft magnetic material of 10 to 70 vol %.

Due to this, the rotation sensor 30 of the present invention has an effective magnetic permeability of the magnetic circuit CMG somewhat smaller than a conventional soft magnetic material using ferrite, but the vibration resistance is improved, manufacture is easy, the cost can be reduced, the suitability to mass production is good, and there are other large merits.

Further, an eddy current having an effect on the impedance of the excitation coil 32b does not occur from the inside of the core material which is also an insulating material and occurs only from the conductor layers, that is, the copper foils 31d, so the rotation sensor 30 is given more linear characteristics of the detection sensitivity and detection output.

Figure 17:
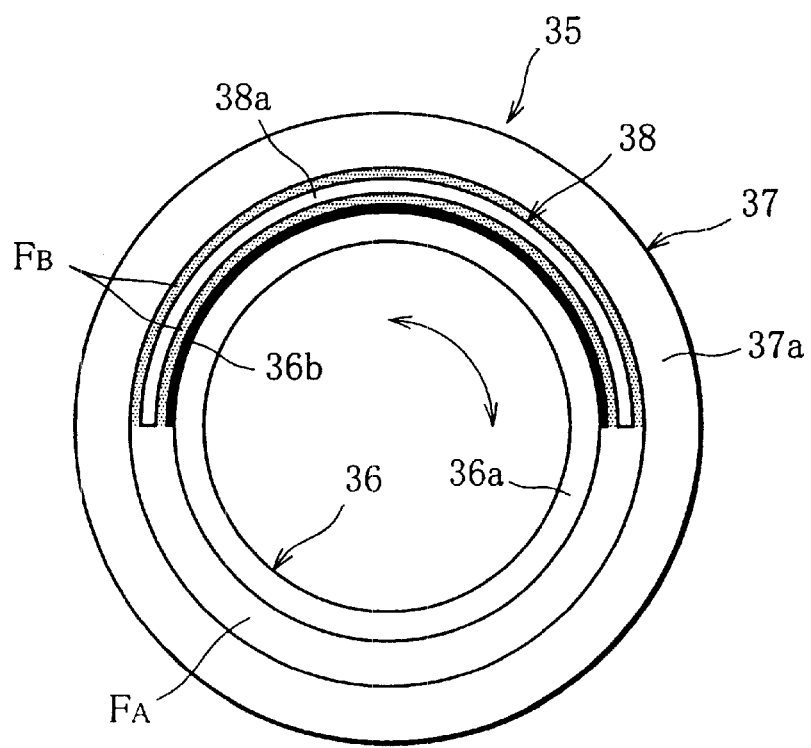
FIG. 17 is a plan view of a second embodiment of the rotation sensor according to the second aspect.
Figure 18:
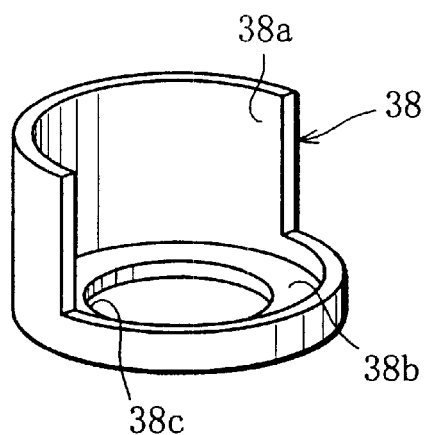
FIG. 18 is a perspective view of second rotor used in the rotation sensor of FIG. 17.

Next, an explanation is given of a second embodiment according to the rotation sensor of the present invention based on FIG. 17 and FIG. 18.

The rotation sensor 35, as shown in FIG. 17, is provided with a first rotor 36, a stationary core 37, and a second rotor 38. These are comprised of the same materials as those of the first embodiment and, like the first embodiment, are attached to the first shaft SF1 etc. The first rotor 36 is comprised of a cylindrical member 36a comprised of an insulating magnetic material on half of the surface of which in the circumferential direction is adhered a copper foil 36b.

The stationary core 37, in the same way as the stationary core 32 of the first embodiment, has a core body 37a comprised of an insulating magnetic material and an excitation coil (not shown).

The second rotor 38, as shown in FIG. 18, is comprised of a cylinder, half of which is cut away in the circumferential direction to form a half-circumference conductor tooth 38a. At the center of the flange 38b formed by making the bottom project inward in the radial direction is formed an opening 38c for attachment of a second shaft (not shown).

In the rotation sensor 35, by adopting this configuration, if an AC current is passed to the excitation coil, in the gap formed between the first rotor 36 and the stationary core 37, as shown in FIG. 17, an area FB in which the copper foil 36b is present and the magnetic flux density is small and an area FA in which the copper foil 36b is not present and the magnetic flux density is large are formed half each in the circumferential direction. As a result, in the rotation sensor 35, an irregular magnetic field having a central angle of 180 degrees in the circumferential direction is formed in the gap between the first rotor 36 and the stationary core 37 and an angle of rotation of 180 degrees can be detected. If for example using an absolute position sensor etc. to detect the absolute position of 0 degree of the rotor, it is possible to detect 360 degrees, that is, the angle of rotation of up to one turn.

Figure 19:
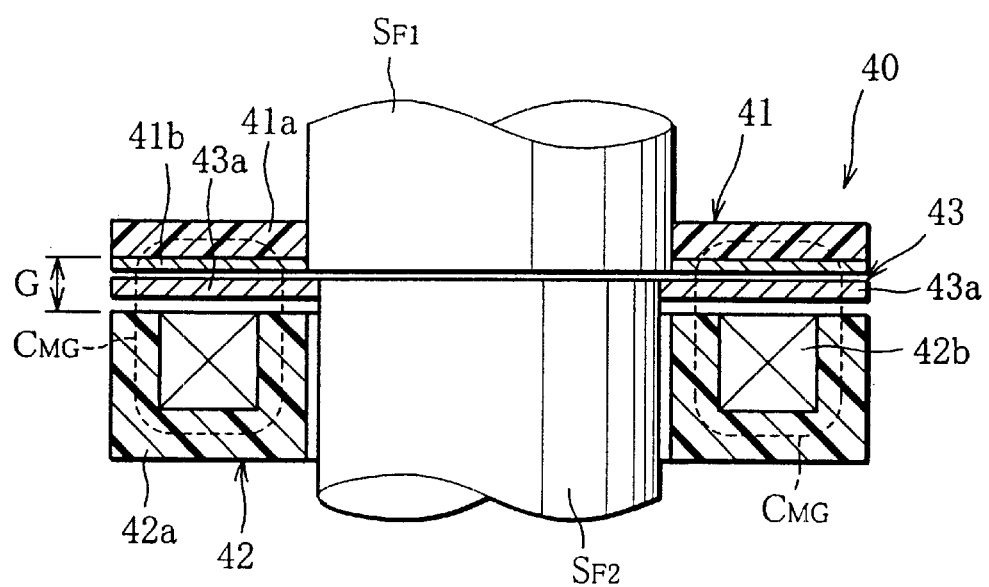
FIG. 19 is a sectional view corresponding to FIG. 14 showing a third embodiment of the rotation sensor according to the second aspect.

Next, a third embodiment according to a rotation sensor of the present invention will be explained based on FIG. 19. The rotation sensor 40 is provided with a first rotor 41, a stationary core 42, and a second rotor 43 and detects the angle of relative rotation of the relatively rotating first shaft SFI and second shaft SF2.

The first rotor 41 is comprised of a disk 41a made of an insulating magnetic material on which a plurality of fan-shaped copper foil having a predetermined central angle are adhered at predetermined intervals. The first rotor 41, as illustrated, is attached to the first shaft SFI. The stationary core 42 is fixed to a fixing member (not shown) positioned near the steering wheel shaft in a gap G in the axial direction of the first shaft SFI. As illustrated, it has a core body 42a comprised of an insulating magnetic 34 material and an excitation coil 42b forming a magnetic circuit CMG working with the first rotor 41.

The second rotor 43 is comprised of a metal disk of for example copper, a copper alloy, aluminum, an aluminum alloy, iron, an iron alloy, or silver from which a plurality of fan shapes with predetermined central angles are cut and formed with a plurality of conductor teeth 43a corresponding to the plurality of bodies 41a of the first rotor 41 in a radial form. Further, the following configuration may also be adopted. That is, it is comprised of a disk made of a synthetic resin having an insulation property on which fan-shaped metal foils having same number of the copper foils and a predetermined central angle according to the copper foils are adhered at predetermined intervals. The second rotor 43 adjoins the first rotor 41 and is attached to the second shaft SF2 rotating relative to the first shaft SF1. The plurality of conductor teeth 43a, as illustrated are arranged between the first rotor 41 and the stationary core 42.

Therefore, in the rotation sensor 40 of the present embodiment, an irregular magnetic field is formed in the circumferential direction in the gap G between the first rotor 41 and the stationary core 42. An eddy current is generated by the plurality of conductor teeth 43a of the second rotor 43 cutting across the irregular magnetic field. In the same way as the first embodiment, the rotation sensor 40 can measure the impedance of the excitation coil 42b accompanying a change of this eddy current and thereby simply detect the angle of relative rotation between the first rotor 41 and second rotor 43.

Further, the rotation sensor of the present invention is comprised of the first rotor 41, stationary core 42, and second rotor 43 overlaid in the axial direction of the first shaft SF1, so is effective when reducing the size in the radial direction.

Here, in the above embodiments, the first rotors 31, 36, and 41 were attached to the shaft SFI and the second rotors 33, 38, and 43 were attached to the second shaft SF2. In the rotation sensor of the present invention, however, if the second rotor is arranged between the first rotor and stationary core, the first rotors 31, 36, and 41 of course may also be attached to the second shaft SF2 and the second rotors 33, 38, and 43 to the first shaft SFI.

The rotation sensor of the present invention explained above, for example by configuring it in the following way, may be applied as a sensor unit provided with a rotation angle sensor for detecting the rotational torque of the steering wheel shaft of an automobile and a steering angle sensor for detecting the angle of rotation.

Figure 20:
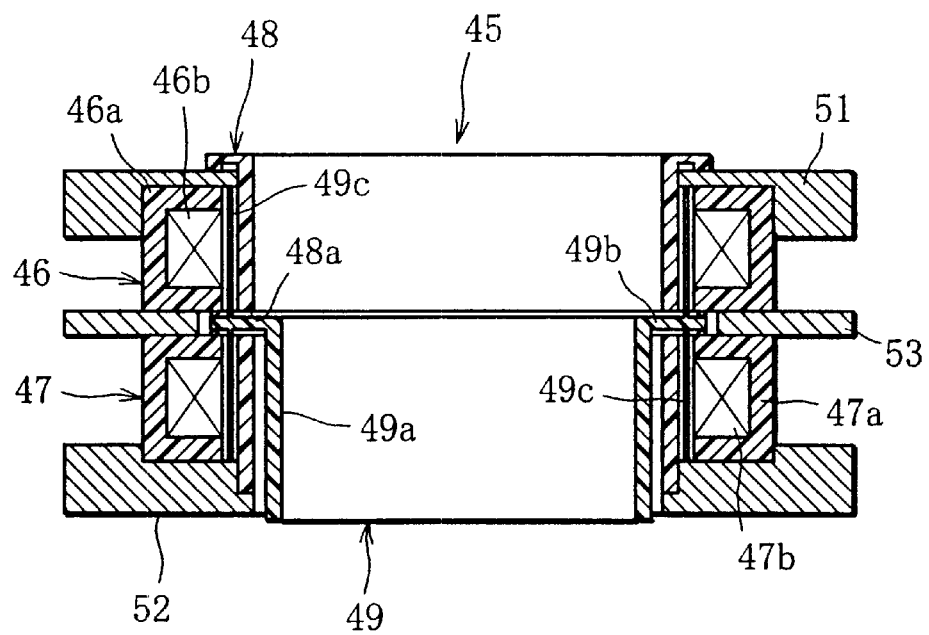
FIG. 20 is a sectional view showing a first example of application of the rotation sensor according to the second aspect cutting a sensor unit along its diameter.

That is, the sensor unit 45 shown in FIG. 20 is provided with a torque detection core 46, steering angle detection core 47, magnetic material rotor 48, and metal rotor 49. The torque detection core 46 and the steering angle detection core 47 are overlaid in the vertical direction (axial direction of steering wheel shaft).

The torque detection core 46 and the steering angle detection core 47 respectively have core bodies 46a and 47a comprised of insulating magnetic materials and excitation coils 46b and 47b forming magnetic circuits working with the magnetic material rotor 48. Further, the torque detection core 46 is fixed to a fixing fitting 51, while the steering angle detection core 47 is fixed to a fixing fitting 52. A metal spacer 53 is arranged between the two cores 46 and 47. Here, the fixing fittings 51 and 52 are arranged near the steering wheel shaft in an automobile.

The magnetic material rotor 48 is formed in a cylindrical shape. A slit 48a is formed in5 the circumferential direction at the center in the center axis direction.

The metal rotor 49 has a flange 49b extending outward in the radial direction from the top part of a body 49a with an inside diameter smaller than the magnetic material rotor 48. A plurality of conductor teeth 49c are formed at the front end of the flange 48b extending in both the upper and lower directions and arranged between the magnetic material rotor 48 and torque detection core 46 or the steering wheel 10 detection core 47.

Figure 21:
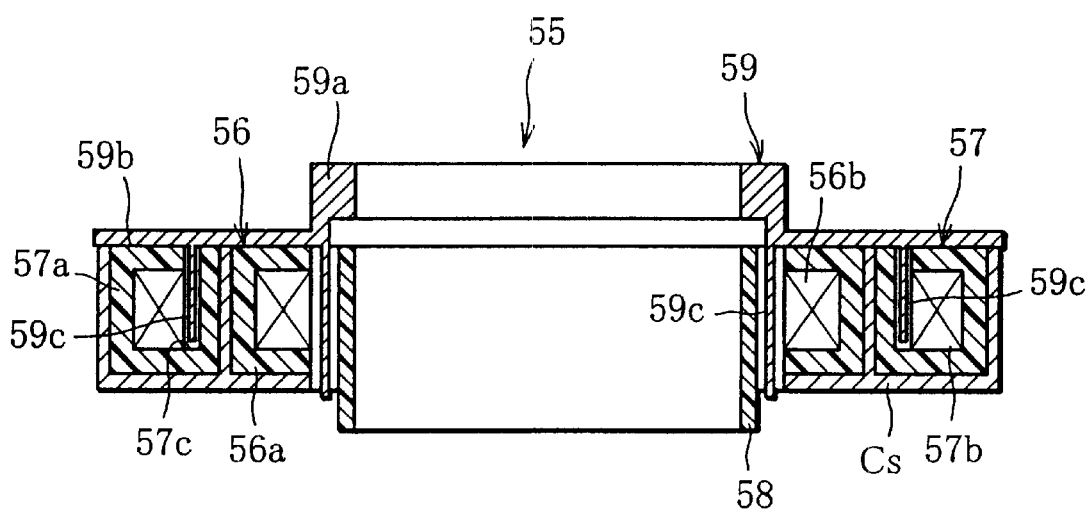
FIG. 21 is a sectional view showing a second example of application of the rotation sensor according to the second aspect cutting a sensor unit along its diameter.

On the other hand, the sensor unit 55 shown in FIG. 21 is provided with a torque detection core 56, steering angle detection core 57, magnetic material rotor 58, and metal rotor 59. The torque detection core 56 and the steering angle 15 detection core 57 are arranged concentrically in the radial direction.

The torque detection core 56 and the steering angle detection core 57 have respectively core bodies 56a and 57a comprised of insulating magnetic materials and excitation coils 56a and 57b forming magnetic circuits working with the magnetic material rotor 58. The torque detection core 56 forms a predetermined gap with the magnetic material rotor 58. The steering angle detection core 57 has at the core body 57a a groove 57c for arranging the later mentioned conductor teeth 59c of the metal rotor 59 in the circumferential direction. Further, the torque detection core 56 and the steering angle detection core 57 are housed in the metal shielding case CS.

The magnetic material roto 58 is formed in a cylindrical shape.

The metal rotor 59 has a flange 59b extending outward in the radial direction from the body 59a. A plurality of conductor teeth 59c extending down from the flange 59b and arranged between the magnetic material rotor 58 and the 37 torque detection core 56 or steering angle detection core 57 are formed in the circumferential direction.

Therefore, by suitably selecting the sensor unit 45 or the sensor unit 55 in accordance with the installation space, it is possible to simultaneously detect the rotational torque and the angle of rotation of the steering wheel shaft of an automobile.

Next, an explanation will be given of an embodiment relating to a measurement circuit of a rotation sensor according to a third aspect of the present invention achieving the first and third objects based on FIG. 22 to FIG. 28.

Figure 22:
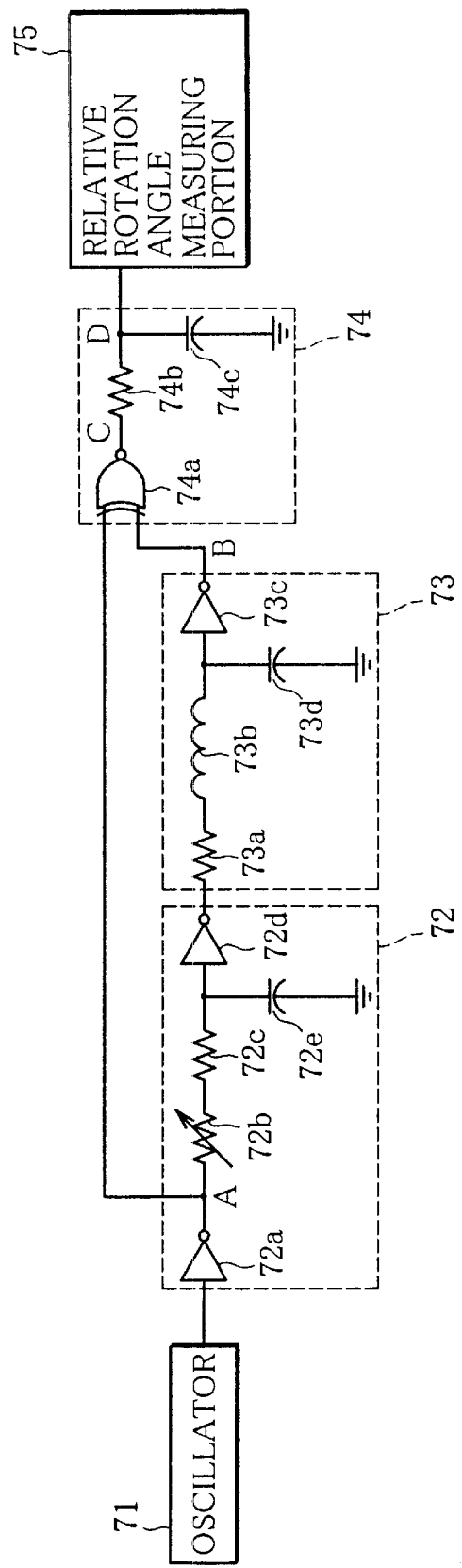
FIG. 22 is a circuit diagram of a first embodiment of a measurement circuit of a rotation sensor according to a third aspect of the present invention.
Figure 23:
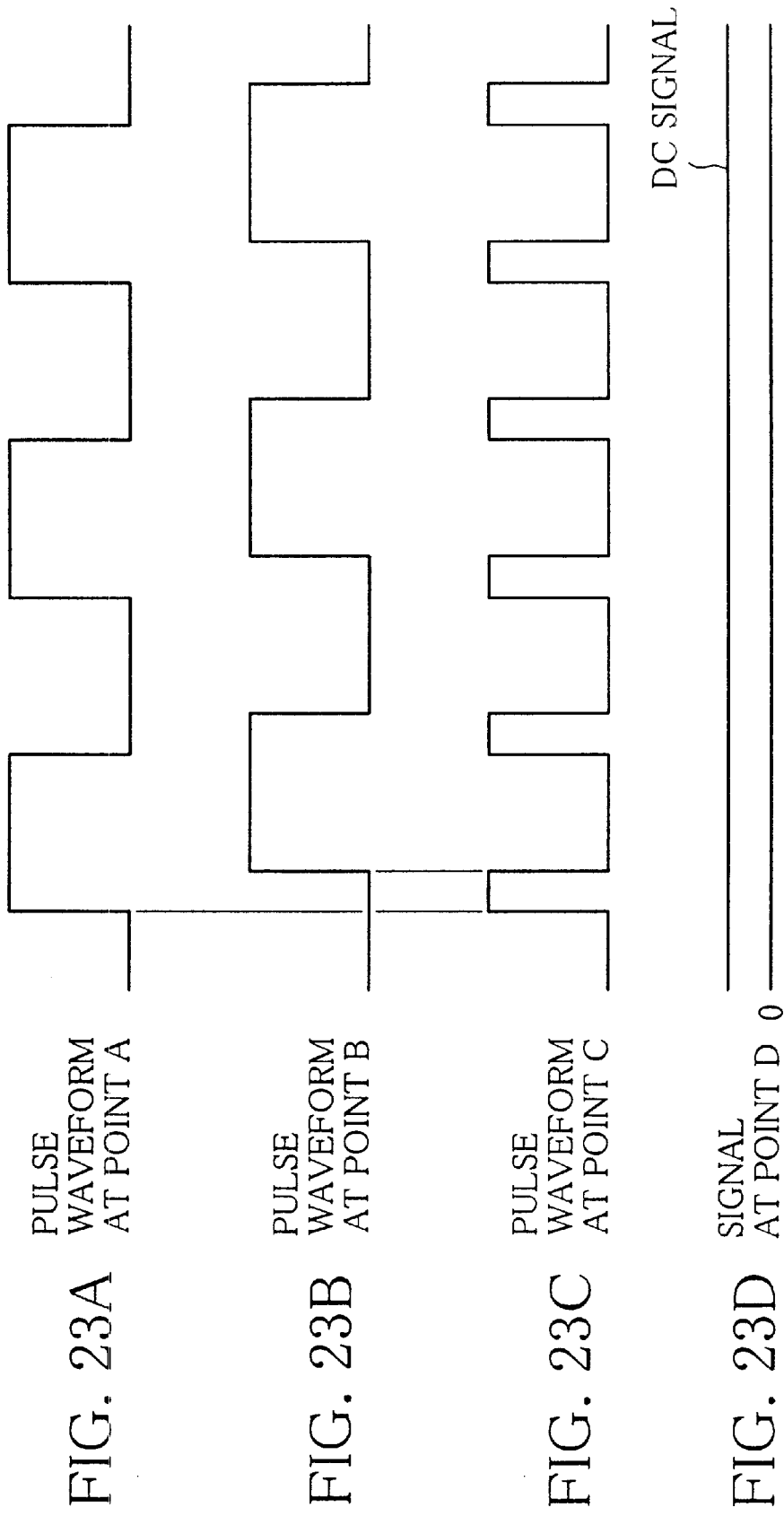
FIG. 23A to FIG. 23D are waveform diagrams of the pulse waveforms at different parts shown in FIG. 22.

FIG. 22 is a circuit diagram of an embodiment of a measurement circuit of the present invention. The measurement circuit has an oscillator 71 comprising the oscillating means of the present invention and generating a pulse signal as the oscillation signal of a specific frequency, a level adjusting portion 72 adjusting the shift level of the pulse signal, a phase shifting portion 73 comprising the phase shifting means of the present invention and shifting the phase of the pulse signal in accordance with the magnitude of the eddy current generated at the later mentioned second rotor, a shift detecting portion 74 for detecting the amount of phase shift of the shifted pulse signal, and a relative rotation angle measuring portion 75 for measuring the angle of relative rotation based on the detected amount of phase shift.

The oscillator 71 outputs a pulse signal of a specific frequency of the wavelength shown in FIG. 23A to the level adjusting portion 72 and shift detecting portion 74 through the inverter 72a.

The level adjusting portion 72 is comprised of two inverters 72a and 72d, a variable resistor 72b and a resistor 72c connected in series between them, and a capacitor 72e with one end connected between the resistor 72c and inverter 72d and with the other end grounded. The variable resistor 72b, resistor 72c, and capacitor 72e form a phase shift circuit provided before the phase shifting portion 73. In the phase shift circuit, the amount of phase shift of the pulse signal is adjusted in advance by adjusting the variable resistor 72b. For example, in the present embodiment, this is provided to enable measurement of −8 degrees to +8 degrees of the relative rotation of the two rotors. It is necessary to adjust the output signal in the case of a relative rotation of 0 degree to a certain level. The level adjusting portion 72 is provided for this purpose.

The phase shifting portion 73 has the serially connected resistor 73a and excitation coil 73b and inverter 73c of the present invention and a capacitor 73d with one end connected 15 between the excitation coil 73b and the inverter 73c and with the other end grounded. The excitation coil 73b is wound around the later mentioned stationary core, carries an AC current, and forms a magnetic circuit working with the first rotor.

The phase shifting portion 73 shifts the phase of the pulse signal input from the level adjusting portion 72 in accordance with the magnitude of the eddy current generated at the second rotor. That is, if the electrical resistance of the resistor 73a is R, the inductance of the excitation coil 73b is L, the capacitance of the capacitor 73d is C, the eddy current is ie, the mutual impedance determined by the structure of the measurement circuit is M, and the input current to the phase shifting portion 73 is i, the input voltage Vin from the level adjusting portion 72 becomes $$Vin = i \cdot R + j \cdot j\omega L - ie \cdot j\omega M + i(1/j\omega C)$$

The phase shift angle of the input voltage Vin and the input current i changes by the change of the eddy current ie. That is, the phase offset of the output voltage Vout and the input current i from the phase shifting portion 73 is fixed at 90 degrees, so the phase shift angle of the input voltage Vin and the output voltage Vout change according to the change of the eddy current ie.

Therefore, by comparing the waveform of the output of the inverter 72a in the level adjusting portion 72, that is, the pulse signal at the point A, and the waveform of the output of the inverter 73c, that is, the pulse signal at the point B (see FIG. 23B), it is possible to detect the amount of phase shift of the pulse signal (shown by phase shift 10 angle in the present embodiment).

The shift detecting portion 74 has an exclusive OR circuit 74a with input terminals connected to the inverters 72a and 73c, a resistor 74b connected to the output terminal of the exclusive OR circuit 74a, and a capacitor 74c with one end connected between the resistor 74b and the relative rotation angle measuring portion 75 and with the other end grounded. The exclusive OR circuit 74a performs an exclusive OR operation on the pulse signal from the oscillator 71, that is, the input voltage Vin, and the pulse signal shifted by the phase shifting portion 73, that is, the output voltage Vout, to find the phase shift angle. The phase shift angle found, as shown in FIG. 23C, is detected as the width of the pulse signal at the point C. That is, the pulse signal at the point C expresses the amount of phase shift of the pulse signal at the point A and point B. The resistor 74b and the capacitor 74c comprise a low pass filter. The pulse signal at the point C is converted to a DC signal proportional to the relative rotation of the two rotors (see FIG. 23D) and is input to the relative rotation angle measuring portion 75.

Figure 24:
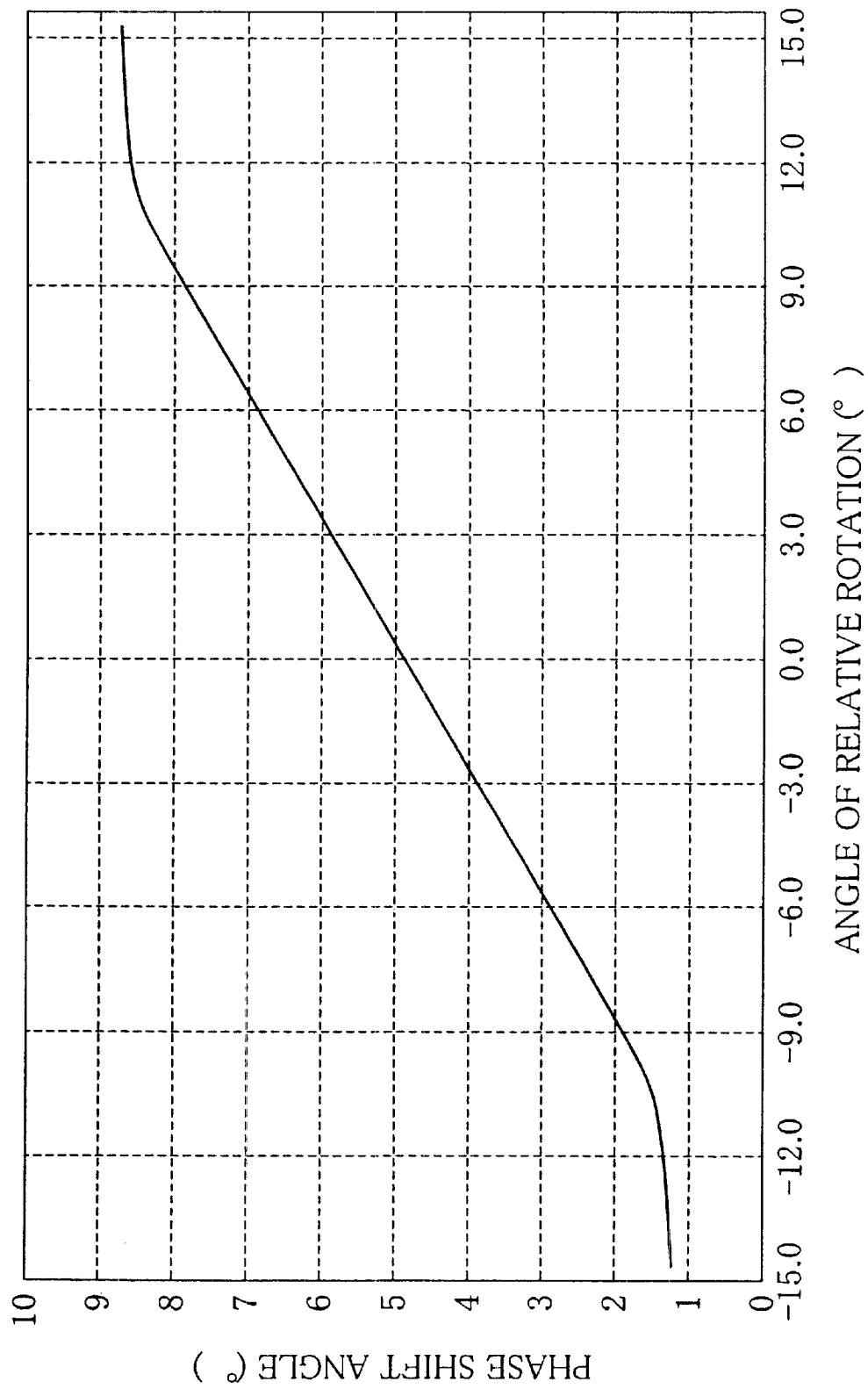
FIG. 24 is a view of the relationship between the angle of phase shift and the angle of relative rotation.

In the relative rotation angle measuring portion 75, as shown in for example FIG. 24, the relationship between the phase shift angle and the angle of relative rotation of the two rotors is preset. It is possible to find the angle of relative rotation from the phase shift angle input from the shift detecting portion 74.

Next, an explanation will be given of an embodiment of a rotation sensor using the measurement circuit shown in FIG. 22.

Figure 25:
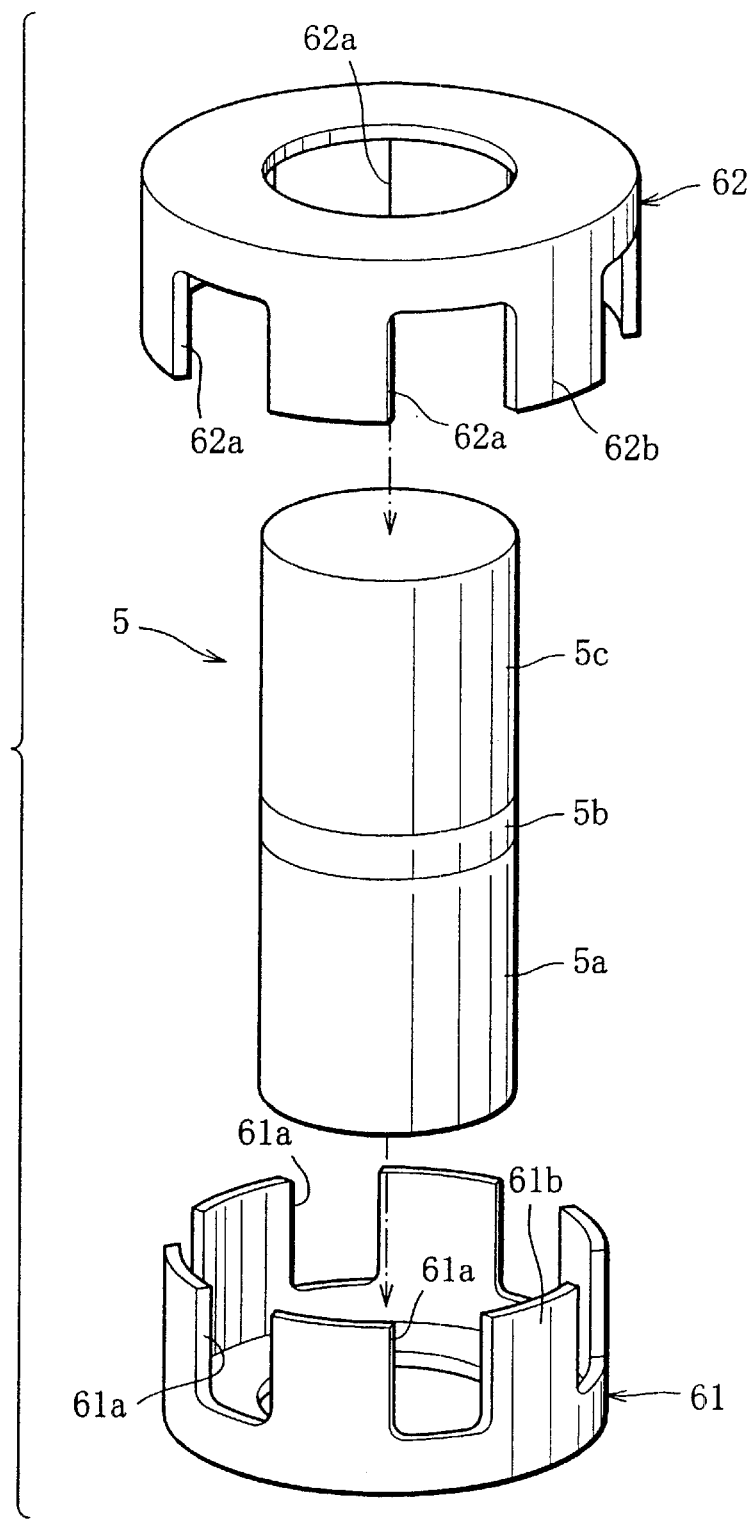
FIG. 25 is a perspective view of the state of attachment 15 of an embodiment of a rotation sensor using a measurement circuit shown in FIG. 22 to a shaft leaving aside the stationary core.
Figure 26:
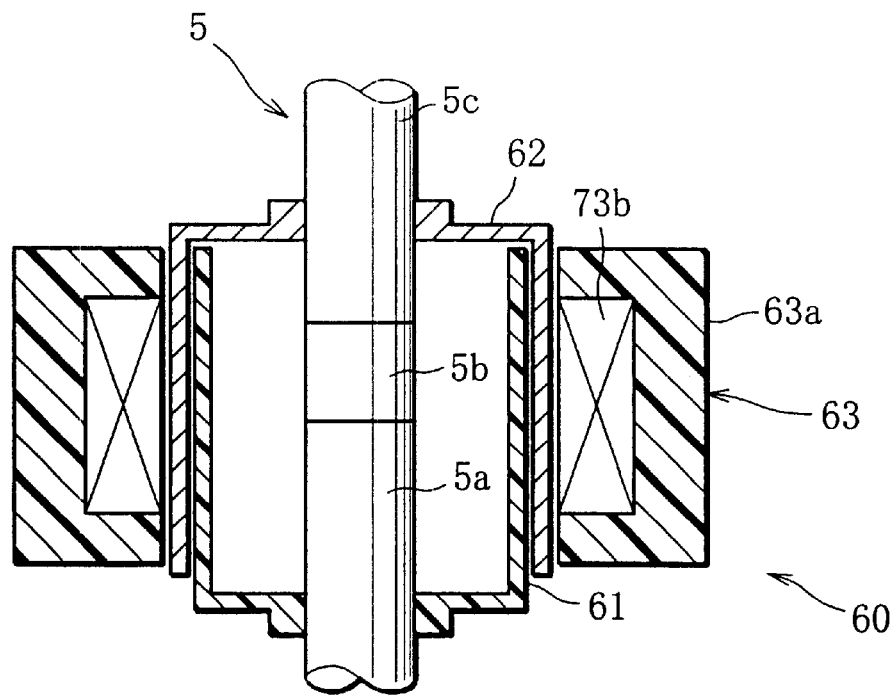
FIG. 26 is a sectional view of a rotation sensor of FIG. 25.
Figure 27:
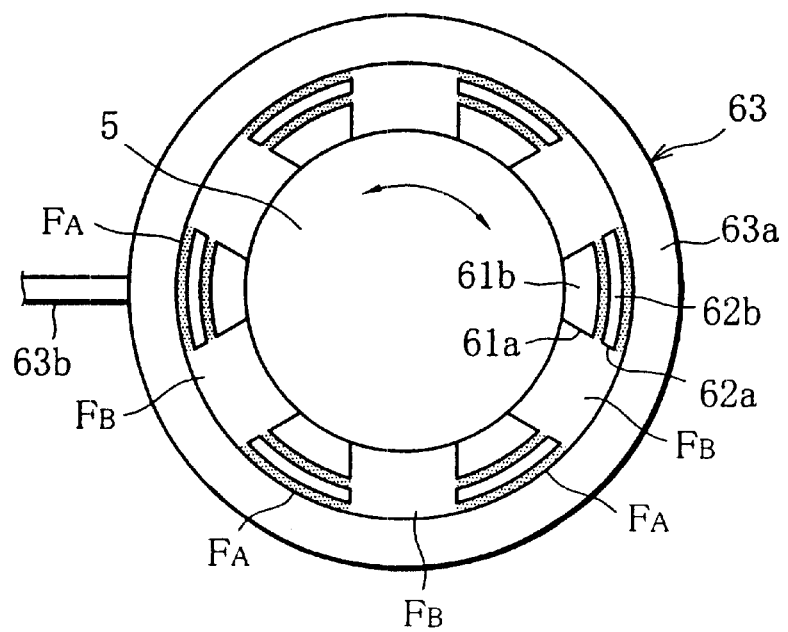
FIG. 27 is a plan view of an assembled rotation sensor.

The rotation sensor 60, as shown in FIG. 25 and FIG. 26, is provided with a first rotor 61, a second rotor 62, and a stationary core 63 and detects the angle of relative rotation of the relatively rotating drive shaft 5a and the second shaft 5c. The rotation sensor 60 is used when detecting the rotational torque of the steering wheel shaft of an automobile by the transmission of the rotational torque from the drive shaft 5a to the driven shaft 5c by the torsion joint 5b. The angle of relative rotation of the drive shaft 5a and the driven shaft 5c changes in the range of ±8 degrees.

The first rotor 61 is formed into a cylindrical shape with a closed bottom except for the portion where the drive shaft 5a passes and is attached at a predetermined position in the axial direction of the rotating drive shaft 5a. The first rotor 61 is comprised of an insulating magnetic member. Six notches 61a are formed at equal intervals in the circumferential direction at the outer circumference as clear from FIG. 25, while six teeth 61b are formed at equal intervals between the notches.

The second rotor 62 is formed into a cylindrical shape having a closed bottom except for the portion where the driven shaft 5c passes and is attached at a predetermined position in the axial direction of the driven shaft 5c. The second rotor 62 is comprised of a conductive member and forms a conductor overall. At the outer circumference, as clear from FIG. 25, six notches 62a are formed at equal intervals in the same way as the first rotor 61. Six teeth 62b are formed at equal intervals between the notches.

The second rotor 62 adjoins the first rotor 61 and is attached to the second shaft 5c rotating relative to the first shaft 5a. A plurality of teeth 62b are arranged between the first rotor 61 and the stationary core 63 as shown in FIG.

Figure 28:
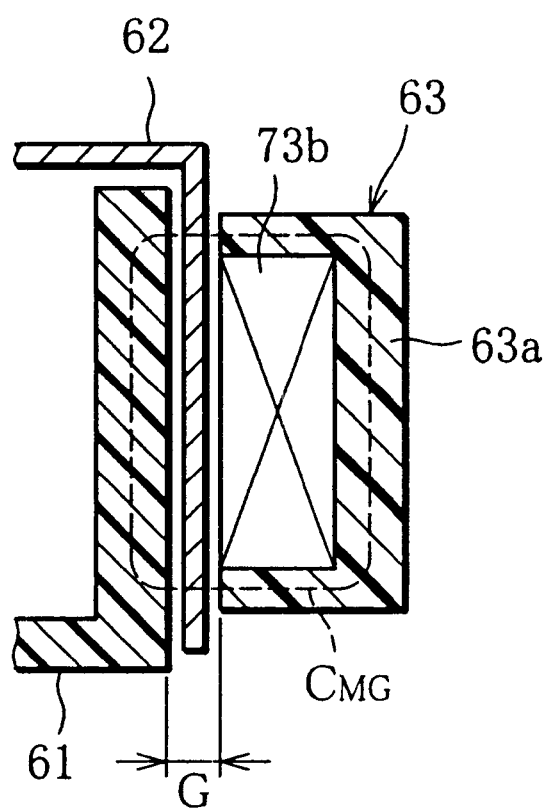
FIG. 28 is a sectional view of the schematic configuration of the rotation sensor of FIG. 26 enlarging the right half.

The stationary core 63, as shown in FIG. 28, is fixed to a fixing member (not shown) positioned near the steering wheel shaft at a gap G from the first rotor 61 in the radial direction and has a core body 63a comprised of an insulating magnetic material and an excitation coil 73b (see FIG. 22) forming a magnetic circuit working with the first rotor 61. The excitation coil 73b is supplied with an AC current from an external current supplying means by a cable 63b (see FIG. 27) extending outside.

The rotation sensor 60 configured in this way is assembled by attaching the first rotor 61 to the drive shaft 5a and the second rotor 62 to the driven shaft 5c and fixing the stationary core 63 to the fixing member.

In the thus assembled rotation sensor 60, the magnetic flux resulting from the AC current flowing through the excitation coil 73b flows along the magnetic circuit CMG shown in FIG. 28. Since the gap between the teeth 61b of the first rotor 61 and the stationary core 63 becomes small, the magnetic resistance there becomes smaller and the areas FA with the large magnetic flux density are formed. Conversely, the gap between the notches 61a of the first rotor 61 and the stationary core 63 becomes large, the magnetic resistance there becomes larger, and the areas FB with the small magnetic flux density are formed (see FIG. 27).

Therefore, in the rotation sensor 60, areas FA with large magnetic flux densities and areas FB with small magnetic flux densities are alternately formed in the circumferential direction in the gap G formed between the first rotor 61 and the stationary core 63. As a result, the rotation sensor 60 is formed with an irregular magnetic field with intervals of a central angle of 60 degrees in the circumferential direction in the gap G between the first rotor 61 and the stationary core 63.

Therefore, if the first rotor 61 relatively rotates with respect to the stationary core 63 along with the drive shaft 5a, the irregular magnetic field also rotates along the circumferential direction along with the first rotor. Therefore, in the gap G, the teeth 62b of the second rotor formed at intervals of a central angle of 60 degrees in the circumferential direction cut across this irregular magnetic field. At this time, due to the relative rotation of the first rotor 61 and the second rotor 62, the ratio of the area of the teeth 62b positioned in areas FE with small magnetic flux densities and the area of them positioned in areas FA with large magnetic flux densities changes and the amount of magnetic flux of the rotor cutting across the field changes, so the magnitude of the eddy current generated in the second rotor 62 changes.

Therefore, the measurement circuit supplies a pulse signal from the oscillator 71 to the excitation coil 73b forming the magnetic circuit and shifts the phase of the pulse signal by the phase shifting portion 73 in accordance with the magnitude of the eddy current generated at the second rotor 62.

Further, it can detect the amount of phase shift by the phase shift detecting portion 74 and measure the angle of relative rotation of the first rotor 61 and second rotor 62 from the relationship between the detected amount of phase shift and the angle of relative rotation (see FIG. 24) by the relative rotation angle measuring unit 75.

Note that the relationship between the detected amount of phase shift and the angle of relative rotation in FIG. 24 is obtained at settings of a resistor 73a in the phase shifting portion 73 of 51Ω, a capacitor 73d of 470 PF, a resistor 74b in the shift detecting portion 74 of 510Ω, and a capacitor 74c of 0.1 μF.

Therefore, the present embodiment shifts the phase of the pulse signal in accordance with the magnitude of the eddy current generated at the second rotor and accurately measures the angle of relative rotation from the relationship between the amount of phase shift and the angle of relative rotation. Further, since the time for detection of the amount of phase shift is determined by the resistance in the shift detecting portion and the time constant of the capacitor, that is, 510×0.1=51 μs, the measurement time becomes short, the resolution of measurement of the angle of relative rotation is high compared with the prior art, and the response can be remarkably improved.

Next, an explanation will be given of a rotation sensor according to a fourth aspect of the present invention for achieving the second and sixth objects using FIG. 29 to FIG. 39.

The rotation sensor 80, as shown in FIG. 29 to FIGS. 32 and FIG. 34, is provided with a first rotor 81, a second rotor 82, a stationary case 83, a displacement sensor 85, an oscillation circuit 87 comprising the oscillating means of the present invention, a signal processing and amplification circuit 91 comprising the first signal processing means according to the present invention, a relative rotation angle measuring portion 98 comprising the means for measuring the angle of relative rotation of the present invention, signal processing and amplification circuits 92 to 94 comprising the second signal processing means according to the present invention, and a rotation angle measuring portion 99 comprising the means for measuring the angle of rotation according to the present invention. The rotation sensor 80 detects the angle of rotation and the rotational torque at a rotary shaft, for example, a steering wheel shaft of an automobile comprised of a drive shaft and driven shaft coupled through a torsion joint.

Figure 29:
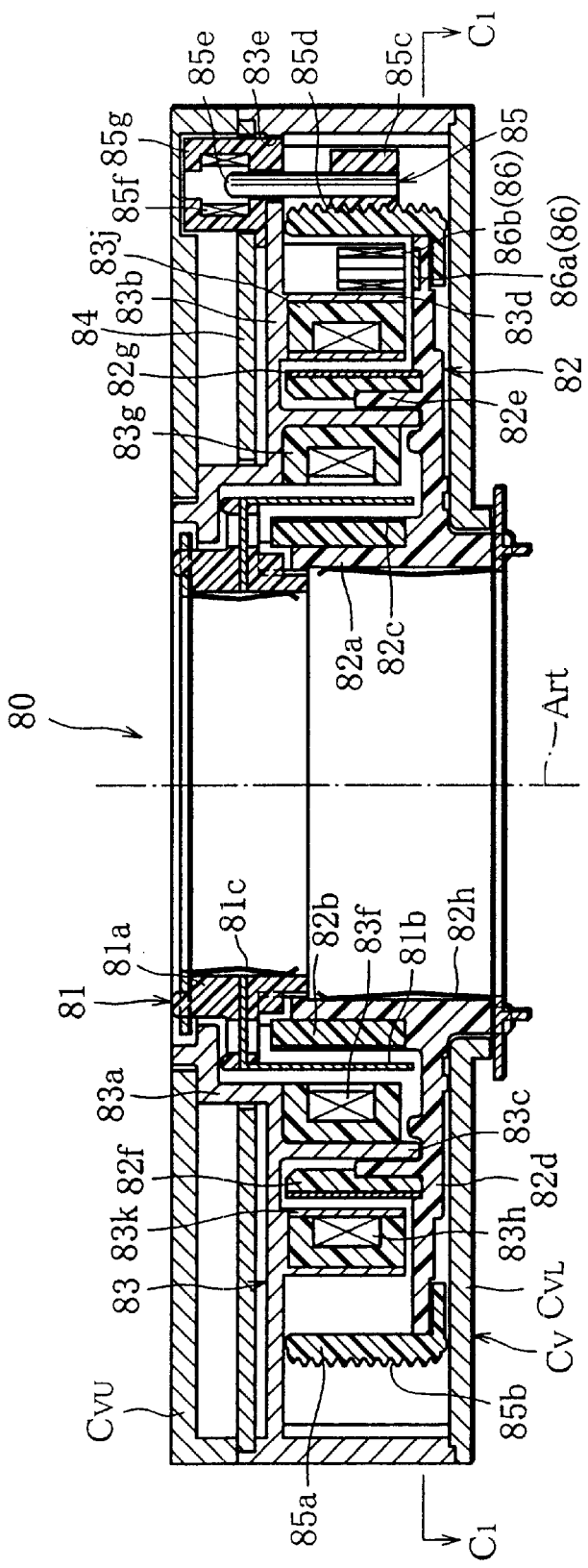
FIG. 29 is a sectional front view of an embodiment of a rotation sensor according to a fourth aspect of the present invention.

Here, the first rotor 81 and the second rotor 82 rotate integrally with respect to the axis of rotation Art shown in FIG. 29 and rotate relatively within a predetermined angle corresponding to the relative rotation of the drive shaft with respect to the driven shaft. The two rotors 81 and 82 rotate relatively in the range of ±8 degrees when for example the drive shaft rotates relatively in the range of ±8 degrees with respect to the driven shaft.

Figure 32:
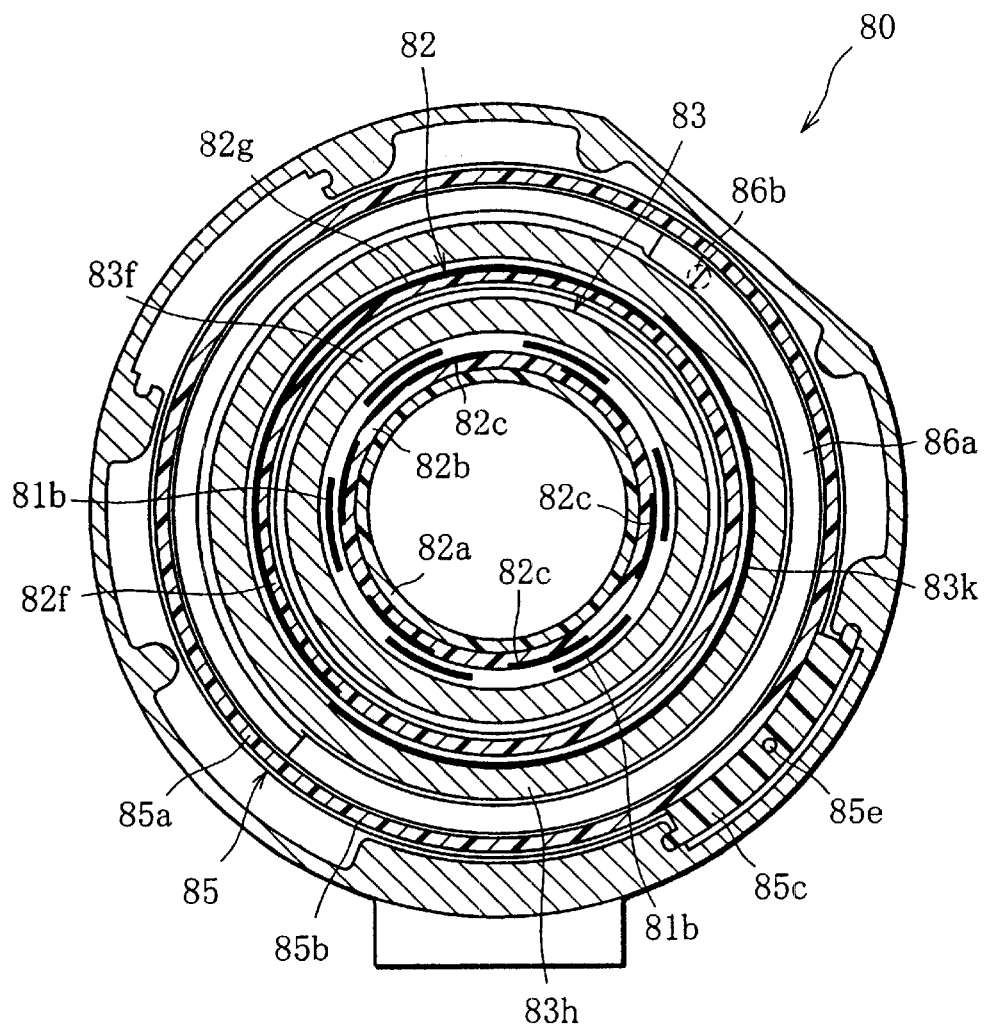
FIG. 32 is a sectional plan view showing the relative positions of the main members comprising the rotation sensor of FIG. 29 drawn omitting some constituent members.
Figure 33:
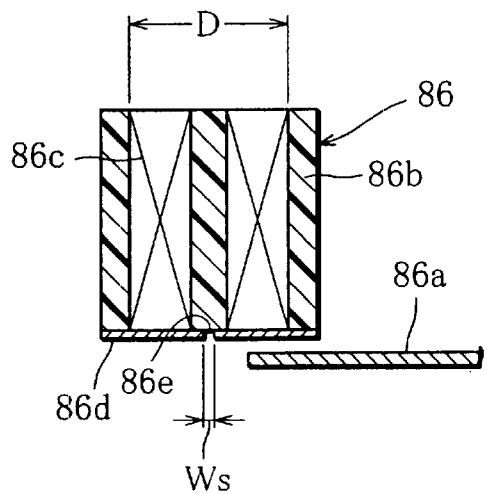
FIG. 33 is a sectional front view of the arrangement of a pitch sensor and copper foil shown omitting other constituent members.

Further, FIG. 32 is drawn omitting some of the constituent members so as to show the relative positions of the main members making up the rotation sensor 80.

Figure 30:
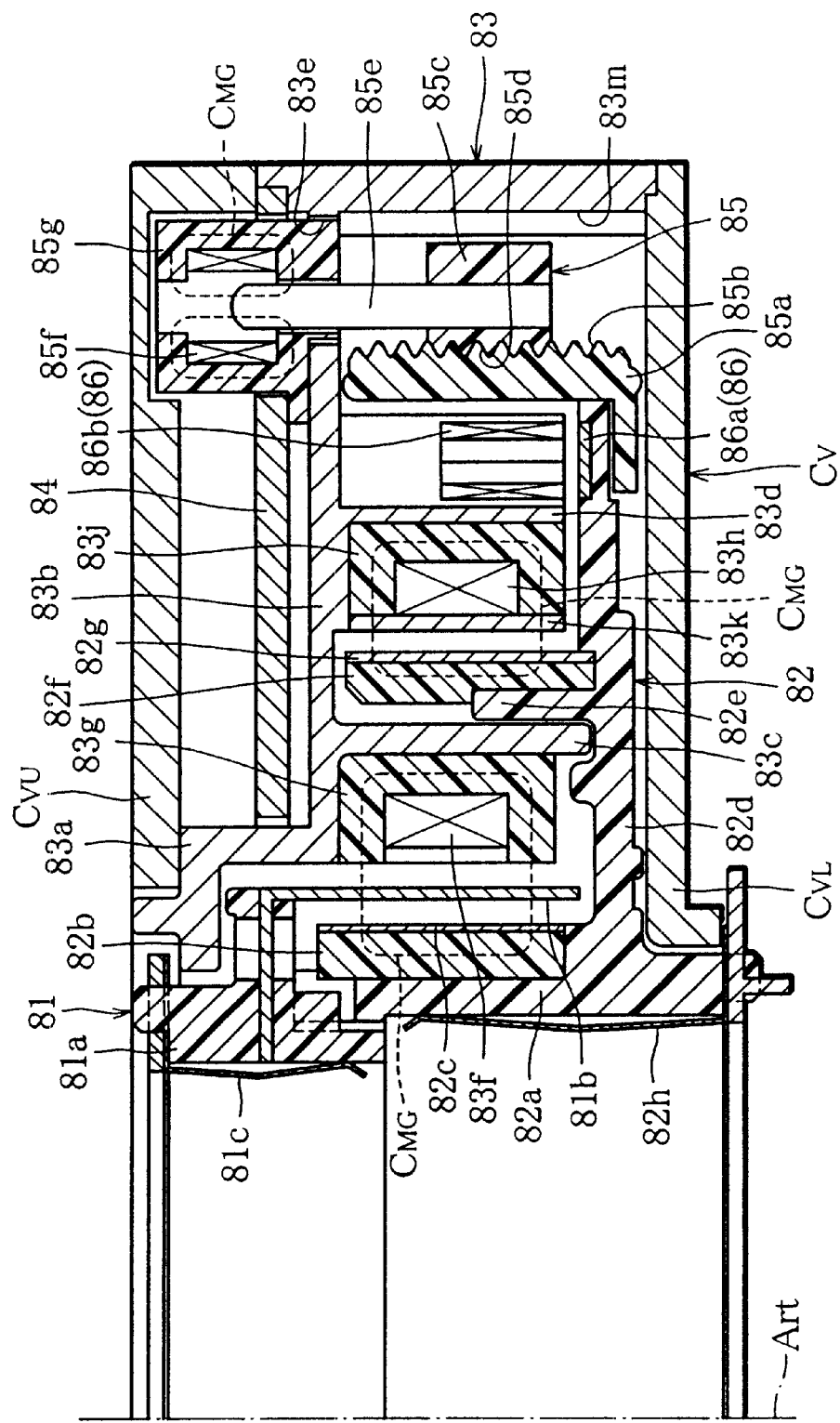
FIG. 30 is a sectional front view of the rotation sensor of FIG. 29 enlarging the right half.

The first rotor 81 has an inside cylinder 81a formed from an electrically insulating synthetic resin superior in moldability and a plurality of, six in the present embodiment, copper pieces 81b extending from the inside cylinder 81a as shown in FIG. 29 and FIG. 30. The top of an engagement piece 81c for stopping rotation with the drive shaft is fixed to the inside cylinder 81a. The plurality of copper pieces 81b form the first conductor layers and extend in the rotation axis Art direction at intervals of a central angle of 30 degrees in the circumferential direction of the inside cylinder 81a. The copper pieces 81*b* may be made of any material so long as it is a conductor such as aluminum, silver, iron, or another material. If shielding a high frequency magnetic field, considering the magnetic resistance based on the gap in the radial direction between the first rotor 81 and the stationary case 83, a thickness of 0.1 to 0.5 rom is preferable. Further, in theory, the number of the copper pieces 81*b* used as the conductor layers becomes greater the smaller the central angle and the smaller the interval of arrangement, the amount of change of the total eddy current induced (proportional to the number of conductor layers) becomes larger, and the detection sensitivity of the angle of relative rotation becomes higher, but the range of angle of relative rotation which can be measured becomes smaller.

The second rotor 82 is formed from an electrically insulating synthetic resin superior in moldability and, as shown in FIG. 29 and FIG. 30, has an inside cylinder 82*a,* a flange 82*d,* a support 82*e,* and an engagement piece 82*h.* The inside cylinder 82*a* has copper foil 82*c* provided at pitches 10 corresponding to the plurality of copper pieces 81*b* at the outer circumference of the first insulating magnetic material layer 82*b.* The copper foil 82*c* form second conductor layers together with the later mentioned copper foil 82*g.* The flange 82*d* extends in the horizontal direction from the inside cylinder 82*a,* the support 82*e* rising from the middle in the radial direction is formed as a cylinder, and copper foil 86*a* of the pitch sensor 86, mentioned later, are provided in a range of a central angle of 180 degrees in the circumferential direction on the top surface near the outer circumference. Further, the flange 82*d* is linked with a screw member 85*a* of the displacement sensor 85, described later, at the bottom of the outer circumference. The support 82*e* is a portion supporting the second insulating magnetic material layer 82*f.* Copper foil 82*g* is provided in a range of a central angle of 180 degrees in the circumferential direction at the outer circumference of the second insulating magnetic material layer 82*f.* The engagement piece 82*h* stops rotation of the driven shaft and is attached at the bottom to the bottom part of the inside cylinder 82*a.*

Here, the material of the first insulating magnetic I material layer 82*b* and the second insulating magnetic material layer 82*f* is nylon, polypropylene (PP), polyphenylene sulfide (PPS), an ABS resin, or other thermoplastic synthetic resin having an electrical insulation property into which a soft magnetic material powder comprised of an Ni—Zn or Mn—Zn based ferrite is mixed at a rate of 10 to 70 vol %.

The stationary case 83 is a fixing member formed by 5 aluminum, copper, or another nonferrous metal having the property of shielding an AC magnetic field. As shown in FIG. 29 and FIG. 30, it has an inner cylinder 83*a,* an upper flange 83*b,* a first support 83*c,* and a second support 83*d.* The inside cylinder 83*a* is a portion for positioning the inner cylinder 81*a* and arranging the first rotor 81 rotatably. The upper flange 83*b* has a circuit board 84 attached to its top part. The first support 83*c* and the second support 83*d* are formed at concentric positions of different radii on the bottom surface. The upper flange 83*b* has an opening 83*e* provided near the outer circumference. The first support 83*c,* as shown in FIG. 29 and FIG. 30, is positioned at the inside from the support 82*e* of the second rotor 82 in the radial direction. A core 83*g* holding the relative rotation angle coil 83*f,* that is, the excitation coil for detection of the rotational torque, is provided at the inside circumference of the first support 83*c.* The second support 83*d,* as illustrated, is positioned at the outside from the support 82*e* of the second rotor 82 in the radial direction. In the second support 83*d,* a core 83*j* holding the rotation angle coil 83*h,* 25 that is, the excitation coil for detection of the rotational torque, is provided at the inner circumference of the first support 83*c.* Copper foil 83*k* is provided in a range of a central angle of 180 degrees to the circumferential direction on the surfaces of the rotation angle coil 83*h* and the core 83*j* facing the copper foil 82*g.* Here, the relative rotation angle coil 83*f* and the rotation angle coil 83*h* are connected to the oscillation circuit 87 by cables (not shown) extending from the stationary case 83 to the outside together with the coil 85*f* of the later explained displacement sensor 85 and the coil 86*c* of the pitch sensor 86. An AC current flows from the oscillation circuit 87. Due to this, in the rotation sensor 80, a magnetic circuit CMG shown by the dotted line in FIG. 30 is formed among the core 83*g,* the first insulating magnetic material layer 82*b,* the core 83*j,* and the second insulating magnetic material layer 82*f.*

Further, the stationary case 83, as shown in FIG. 29 and FIG. 30, has a cover CV having an upper cover CVU and a lower cover CVL at its top and bottom parts.

Figure 31:
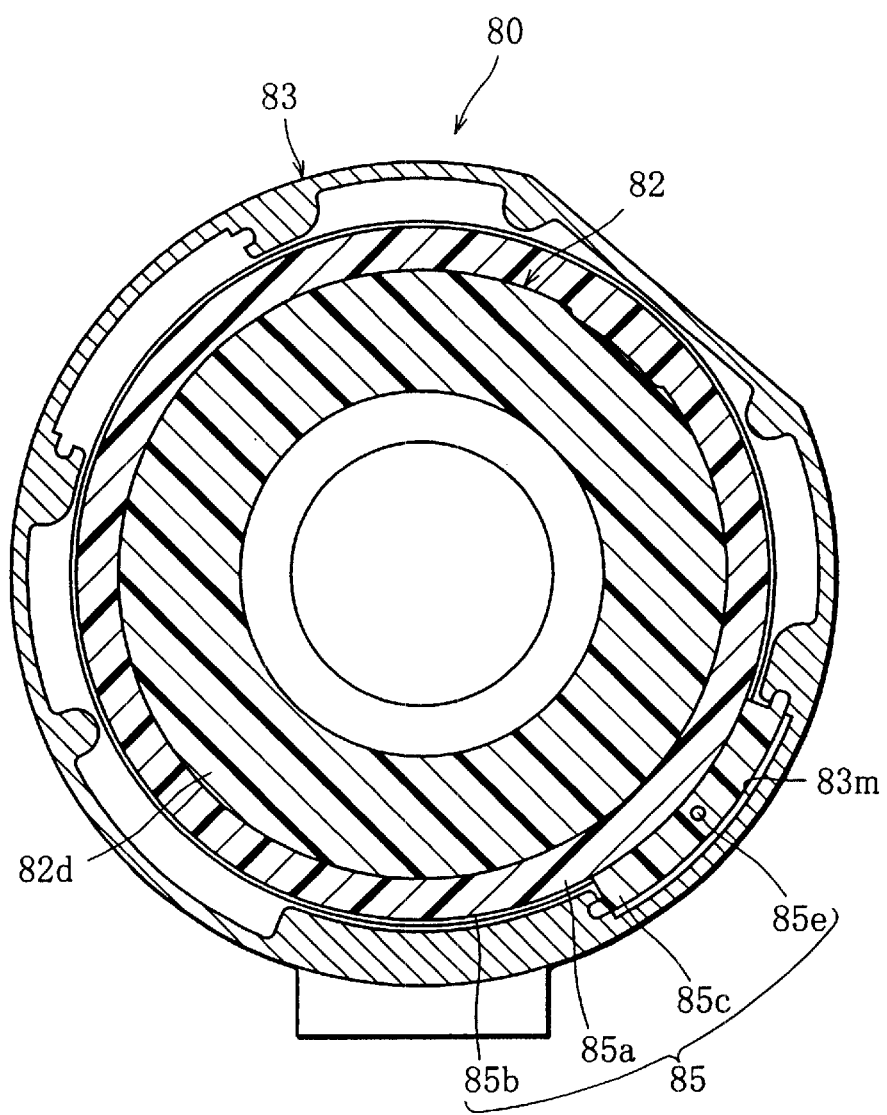
FIG. 31 is a sectional plan view of the rotation sensor of FIG. 29 along the line Cl—Cl.

The displacement sensor 85 is a sensor detecting changes in the coil inductance based on movement of the slider core 85*e* in the rotation axis direction and, as shown in FIG. 29 to FIG. 31, has a screw member 85*a,* a slider 85*c,* a slider core 85*e,* and a coil 85*f.* The screw member 85*a* is a ring-shaped member connected with the bottom of the outer circumference of the second rotor 82 at its bottom and is formed with a thread portion 85*b* at its outer circumference. The slider 85*c,* as shown in FIG. 29 to FIG. 32, is a member extending in the circumferential direction and is arranged in a holder 83*m* formed in the circumferential direction at the outer circumference of the stationary case 83. A thread portion 85*d* engaging with the thread portion 85*b* is formed at the inside in the radial direction. The slider 85*c* moves up and down in the holder 83*m* by the screw member 85*a* rotating together with the second rotor 82. The position shown in FIG. 29 and FIG. 30 is an intermediate position. The slider core 85*e* is a pin-shaped member formed from an insulating magnetic material and is attached in the vertical direction to the slider 85*c.*

The coil 85*f* forms a magnetic circuit working with the slider core 85*e* and is held in the core 85*g.* The core 85*g* is formed from the same material as the first and second insulating magnetic material layers 82*b* and 82*f* and the slider core 85*e* and is attached at an opening 83*e* provided in the stationary case 83. Therefore, in the displacement sensor 85, a magnetic circuit CMG shown by the dotted line in FIG. 30 is formed at the core 85*g* by the coil 8Sf. When the slider core 85*e* leaves or enters the coil 85*f* by the upward or downward movement of the slider 85*c* along with rotation of the second rotor 82, the inductance of the coil 8Sf changes. Here, the circuit board 84, while not shown in FIG. 29 and FIG. 30, has arranged on it an oscillating means, a first signal processing means for processing an output signal from the relative rotation angle coil 83*f,* a means for measuring the angle of relative rotation, a second signal processing means for processing output signals from the rotation angle coil 83*h* and displacement sensors 85, and means for measuring the angle of rotation and forms electrical circuits for these.

Further, the pitch sensor 86 detects at which rotational position in a range of 180 degrees in the left direction or a range of 180 degrees in the right direction from a reference position the first and second rotors 81 and 82 are located. The pitch sensor 86 has copper foil 86*a* provided at the second rotor 82 and forming one part and a core 86*b,* coil 86*c,* and copper foil 86*d* shown in FIG. 33 arranged at the outside of the second support 83*d* in the radial direction as shown in FIG. 30 and forming another part of the pitch sensor 86. A slit 86*e* is formed in the copper foil 86*d* as illustrated.

Here, the pitch sensor 86 sets the ratio of the width Ws to the diameter (=Ws/D) to the following range when the diameter of the coil 86*c* is D and the width of the slit 86*e* is Ws in order to secure a predetermined precision in practice:

$$1/50 \leq Ws/D \leq 1/3$$

Preferably, the ratio to the diameter (=Ws/D) is at least 1/10.

Next, an explanation will be made of measurement of the angle of relative rotation and angle of rotation by the rotation sensor according to the first embodiment using FIG. 34 and FIG. 35.

Figure 34:
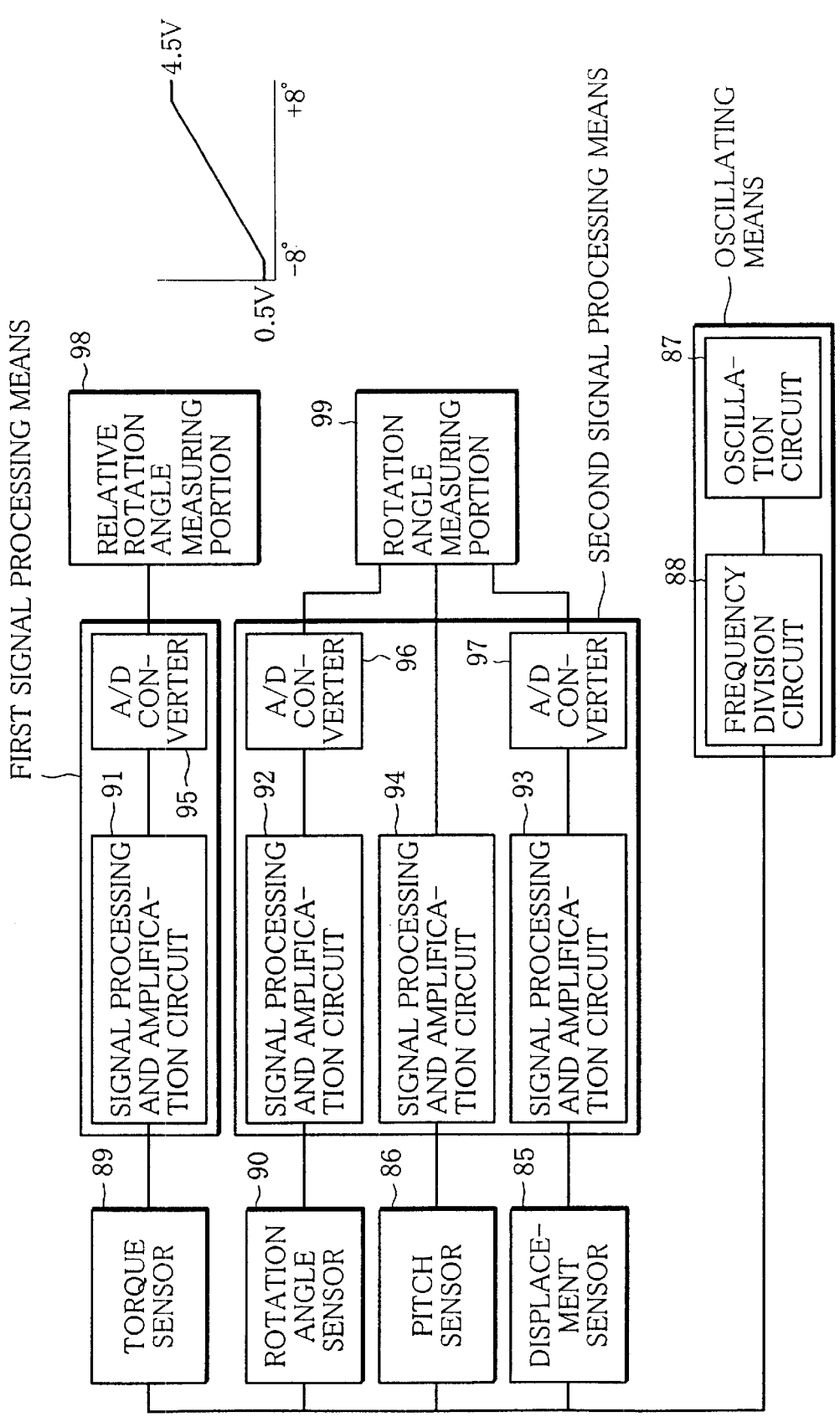
FIG. 34 is a block diagram of an example of the configuration of an rotation angle measurement device in the rotation sensor.
Figure 35:
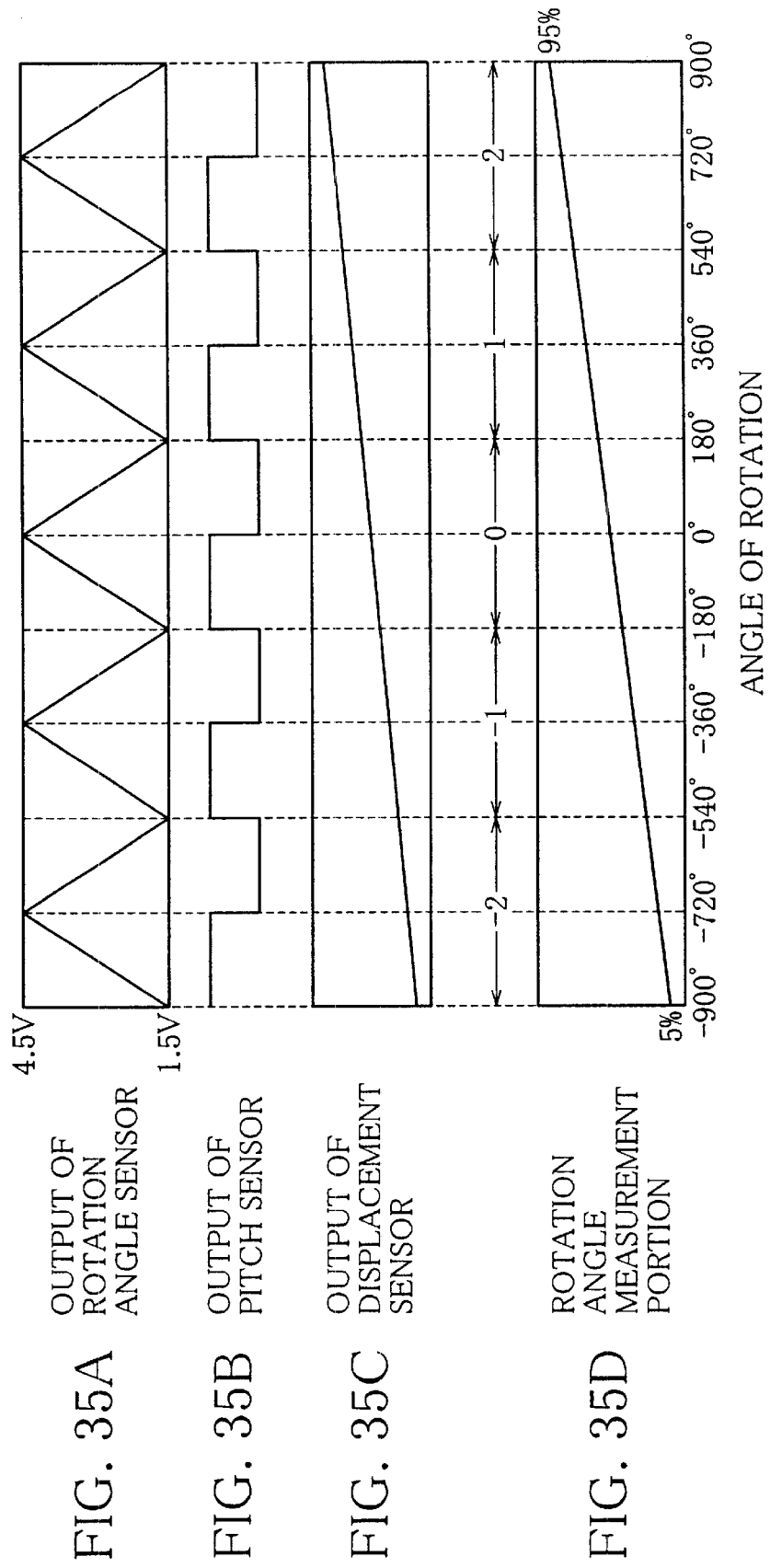
FIG. 35A to FIG. 35D are waveform diagrams of the waveforms of outputs of the sensors and rotation angle measuring portion shown in FIG. 34.

FIG. 34 is a block diagram of an example of a rotation angle measurement device of a rotation sensor. In the figure, the measurement device is comprised of an oscillation circuit 87 for generating an oscillation signal, a frequency division circuit 88 for dividing the oscillation signal by frequency and outputting a pulse signal of a specific frequency, a torque sensor 89 having the above plurality of copper pieces 81*b*, a first insulating magnetic material layer 82*b*, copper foil 82*c*, a relative rotation angle coil 83*f*, and a core 83*g*, a rotation angle sensor 90 having the above second insulating magnetic material layer 82*f*, copper foil 82*g*, a rotation angle coil 83*h*, a core 83*j*, and copper foil 83*k*, a signal processing and amplification circuit 91 for processing the signals from the displacement sensor 85, pitch sensor 86, and torque sensor 89, signal processing and amplification circuits 92 to 94 for processing signals from the rotation angle sensor 90, displacement sensor 85, and pitch sensor 86, A/D converters 95 to 97 for converting signals from the signal processing and amplification circuits 91 to 93 from an analog to digital format, a relative rotation angle measuring portion 98 for measuring the angle of relative rotation based on the digital signal from the A/D converter 95, and a rotation angle measuring portion 99 for measuring the angle of rotation based on the digital signals from the signal processing and amplification circuit 94 and the A/D converters 96 and 97.

The rotation sensor 80 configured in this way is used as follows when for example detecting the angle of rotation, rotation number, and rotational torque in a steering wheel shaft of an automobile comprised of a drive shaft and driven shaft coupled by a torsion joint. First, in the measurement device, the oscillation circuit 87 outputs a pulse signal of a specific frequency through the frequency division circuit 88 to the sensors 85, 86, 89, and 90.

The relative rotation angle coil 83*f* carries an AC current and forms a magnetic circuit working with the first insulating magnetic material layer 82*b* of the second rotor. The torque sensor 89 detects an amount of phase shift of the pulse signal input from the frequency division circuit 88 connected to the relative rotation angle coil 83*f* in accordance with the magnitude of the eddy current generated at the rotor. That is, the torque sensor 89 detects the amount of phase offset of the pulse signal at the two ends of the relative rotation angle coil 83*f*.

The signal processing and amplification circuit 91 processes the detected amount of phase shift to a signal of a corresponding voltage value and outputs the signal through an A/D converter 95 to the relative rotation angle measuring portion 98.

The relative rotation angle measuring portion 98, as shown in FIG. 34 however, can measure the angle of relative rotation of the two rotors in a range of −8 degrees to +8 degrees based on the voltage value 0.5V to 4.5V of the converted signal.

Figure 36:
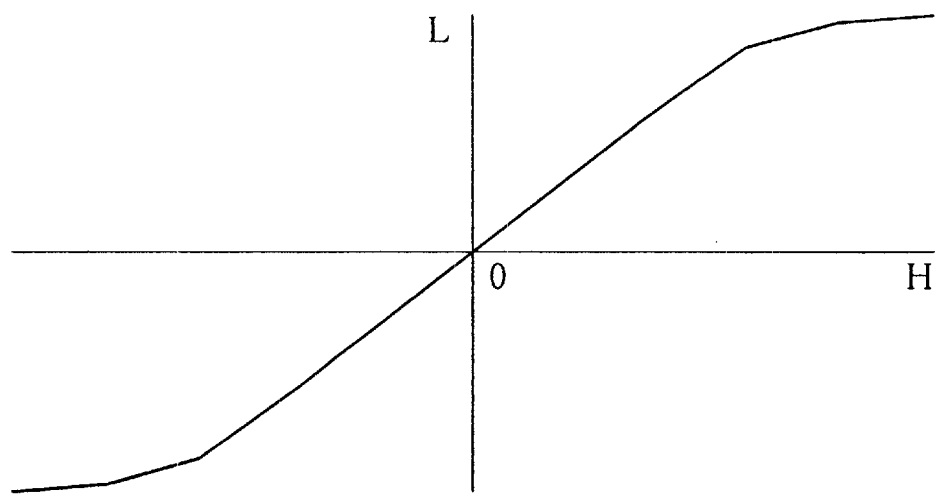
FIG. 36 is a graph of the relationship between the amount of movement of a slider core in a displacement sensor and a coil inductance.
Figure 37:
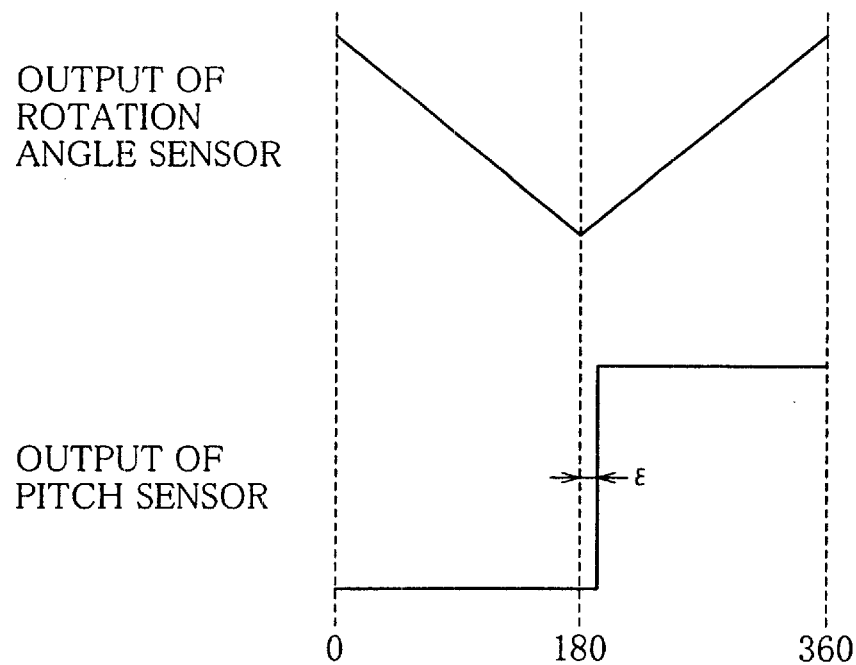
FIG. 37 is a partial waveform diagram for explaining the relationship of the outputs of the rotation angle sensor and pitch sensor.

The rotation angle coil 83*h* carries an AC current and forms a magnetic circuit working with the second insulating magnetic material layer 82*f* of the second rotor. The rotation angle sensor 90 detects an amount of phase shift of the pulse signal input from the frequency division circuit 88 connected to the rotation angle coil 83*h* in accordance with the magnitude of the eddy current generated at the rotor. That is, the rotation angle sensor 90 detects the amount of phase offset of the pulse signal at the two ends of the rotation angle coil 83*h*. At the time of rotation, the amount of overlap of the copper foil 82*g* of the second insulating magnetic material layer 82*f* and the copper foil 83*k* of the core 83*j* in the circumferential direction changes. The sensor detects an angle of rotation within 180 degrees to the left and right as shown in FIG. 35A by the change of the magnetic flux between the coil 83*h* and the core 83*j* along with this. The signal processing and amplification circuit 92 processes the detected amount of phase shift to a signal of a corresponding voltage value and outputs the signal through an A/D converter 96 to the rotation angle measuring portion 99. The displacement sensor 85 detects the change in the inductance of the coil 85*f* by the upward and downward movement of the slider core 85*e* based on movement in the rotation axis direction of the slider 85*c* accompanying rotation of the screw member 85*a*. That is, as shown in FIG. 36, if the amount of movement of the slider core 85*e* is H and the coil inductance is L, the relationship of the amount of movement H and the coil inductance L becomes a substantially linear relationship in the coil 85*f* along with the rotation 20 of the screw member 85*a* and can serve as a component for detection of the angle of rotation.

Note that FIG. 35C shows an example of the case of using the output of the displacement sensor 85 for detection of an angle of rotation of 900 degrees to −900 degrees of limited rotation in the case of an intermediate position of the slider 85*c* shown in FIG. 29 and FIG. 30 of 0 degree. FIG. 35C and FIG. 36 show the same outputs.

The signal processing and amplification circuit 93 processes and converts the amount of change of the detected coil inductance to a signal of a corresponding voltage value and outputs the signal through the A/D converter 97 to the rotation angle measuring portion 99. The pitch sensor 86 detects the change of the inductance of the coil 86*b* based on the rotation of the second rotor 82.

That is, it detects the digital signal of "1" or "0" such as shown in FIG. 35B every 180 degrees by the change in the magnetic flux between the coil 86*c* and the core 86*d* due to the relative positional relationship of copper foil 86*a* and 5 slit 86*e* in the pitch sensor 86 (relation of whether overlapping or not overlapping). In the same way as U.S. Pat. No. 2,599,438, a sharp magnetic field is formed by the slits.

The signal processing and amplification circuit 94 processes the amount of change of the detected relative positional relationship to a digital signal of the corresponding voltage value and outputs the signal to the rotation angle measuring portion 99.

The rotation angle measuring portion 99 measures for example the angle of rotation at a steering wheel shaft of an automobile comprised of a drive shaft and a driven shaft coupled by a torsion joint by a combination of the signals input from the displacement sensor 85, pitch sensor 86, and rotation angle sensor 90. That is, in the present embodiment, due to the relationship between the outputs of the rotation angle sensor 90 and the pitch sensor 86, which changes from the intermediate position of 0 degree of the slider 85c, a change in a range of either −180 degrees to 0 degree and 0 degree to 180 degrees can be differentiated. Further, the actual angle of rotation is measured by the relationship with the output of the displacement sensor 85 at that time. FIG. 35D shows a waveform expressing the relationship of the signals from the displacement sensor 85, pitch sensor 86, and rotation angle sensor 90 within a range of a limited angle of rotation of 900 degrees to −900 degrees. The angle of rotation is measured by this.

In this way, the rotation sensor of the present embodiment can find the rotational torque acting on the drive shaft and the driven shaft from the amount of phase shift of the pulse signal detected by the rotation angle sensor. Further, it can accurately measure the angle of rotation in these shafts from the relationship of the outputs of the displacement sensor, pitch sensor, and rotation angle sensor.

When actually attaching the sensors to the rotation sensor, the position where the signal of the pitch sensor 86 switches and the position where the output of the rotation angle sensor 90 (angular signal) becomes for example 0 degree, 180 degrees, 360 degrees, . . . are made to match as much as possible, but in reality some error ends up occurring due to the difference in the attachment precision. That is, as shown by the relationship of the waveforms of the outputs of the rotation angle sensor and the pitch sensor of FIG. 37, for example, when there is an offset of £ between the position where the output of the pitch sensor switches from "0" to "I" and the 180 degree position of the rotation angle sensor, it is possible to accurately output the actual angle of rotation up to 180 degrees, but from 180 degrees to 180 degrees+£, the result is 180 degrees—(8–180 degrees). Here, 8 is the angle of rotation 8 found based on the angular signal.

That is, there was the problem of a loss of continuity of the actual angular signal where an angular signal smaller than 180 degrees was conversely output despite 180 degrees being exceeded and, when over 180 degrees+£, the actual angular signal was output and therefore there were angles which could not be detected at an angle of rotation near 180 degrees.

The smaller this ε, the higher the attachment precision, but if the sensor is attached at a high precision for this, the cost of manufacture of the sensor ends up becoming higher.

Therefore, when obtaining a signal from the rotation angle sensor 90, the signal processing and amplification circuit 92 in the present embodiment determines if the angle of rotation S found based on the signal is in a range of for example 179.5 degree≦S≦180.5 degrees. If in this range, it makes the angle of rotation found 180 degrees and outputs a signal of the corresponding voltage value. If outside of this range, it obtains a signal from the pitch sensor 86 and determines if the signal is "1" or not. If "1", it outputs a signal of a voltage value corresponding to an angle of rotation of (360-S), while if not "1", it outputs a signal of a voltage value corresponding to an angle of rotation S. Note that the above signal processing is similarly performed near the angles of rotation shown as the upper limit point and lower limit point of the angle signal comprised of the triangular waveform output from the rotation angle sensor, that is, −720 degrees, −540 degrees, −360 degrees, −180 degrees, 0 degree, 180 degrees, 360 degrees, 540 degrees, and 720 degrees.

Due to this, in the present embodiment, the position of switching of the signal of the pitch sensor near the angle of rotation of the upper limit point and lower limit point of the triangular waveform and the position of the signal of the rotation angle sensor match, the attachment precision is improved, and detection of the angle of rotation with continuity becomes possible.

Note that the present invention is not limited to the above embodiment. Various modifications are possible. For example, the rotation sensor 80 of the present embodiment detected the rotational torque based on the angle of relative rotation of the rotors 81 and 82 and found the angle of rotation and rotation number of the rotors 81 and 82 with respect to the stationary case 83 at a high precision. If the detection precision is not an issue in practice, however, it is possible to omit the pitch sensor 86 as shown in the circuit diagram showing an example of the rotation angle measurement device of the rotation sensor of FIG. 38.

Figure 39:
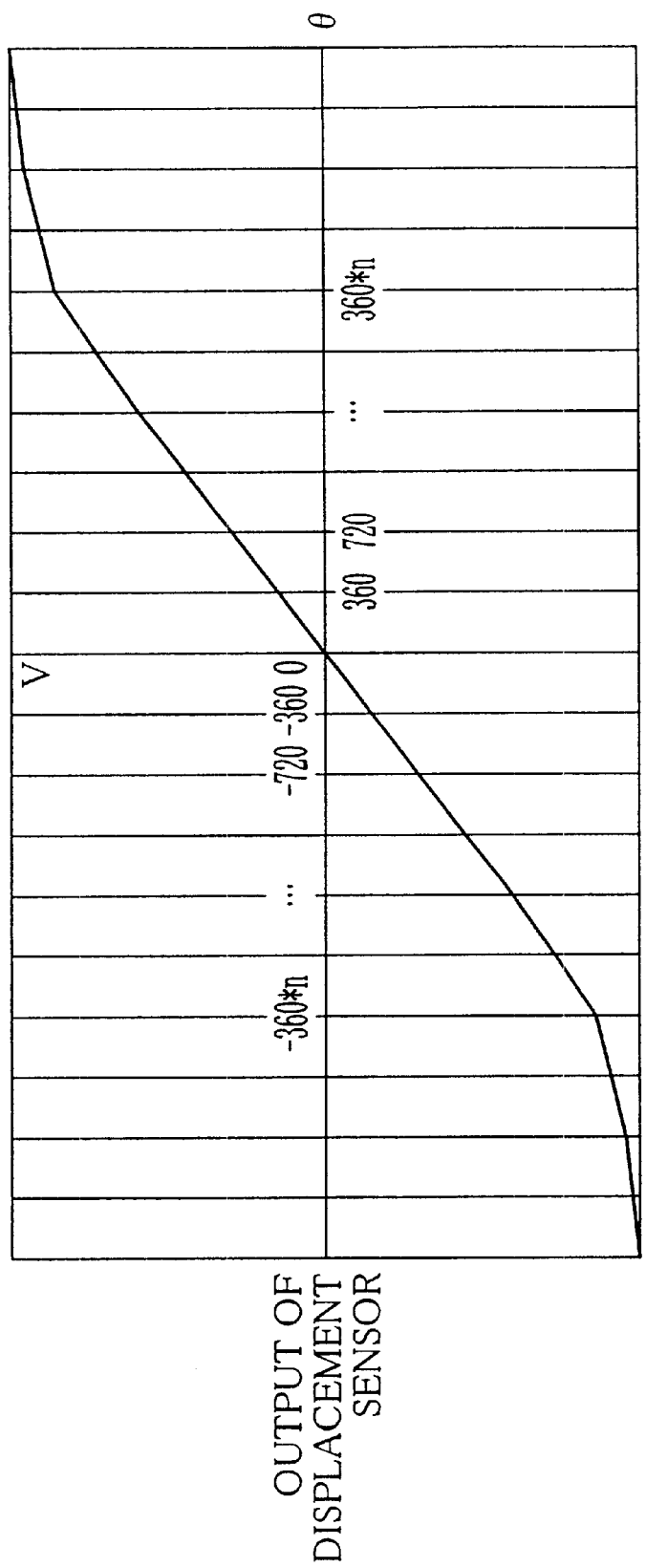
FIG. 39 is a graph of the output simply expressing the output of the displacement sensor and angle of rotation.

In this case, as shown in FIG. 39, it is possible to set the output signal of the displacement sensor corresponding to the angle of rotation in advance by not that high a detection precision and detect the angle of rotation simply by this relationship.

Further, if the detection precision is not an issue in practice, it is possible to omit the rotation angle sensor and detect the angle of rotation (rotation number) by a combination of the displacement sensor and the output of at least one pitch sensor.

On the other hand, the rotation sensor 80 may be configured to detect one of the rotational torque or angle of rotation and omit the other as desired.

Next, another embodiment of a rotation sensor for finding the rotation number of the rotor using a gear will be explained using FIG. 40 to FIG. 47.

Here, the rotation sensor 100 explained below uses components the same as the rotation sensor 80 such as the pitch sensor, oscillation circuit, signal processing and amplification circuit comprising the first signal processing means, relative rotation angle measuring portion comprising the means for measuring the angle of relative rotation, signal processing and amplification circuit comprising the second signal processing means, and rotation angle measuring portion comprising the means for measuring the angle of rotation. Therefore, in the following explanation, use is made of FIGS. 34, 37, and 38 used for the rotation sensor 80, the same reference numerals are used for the same components, and overlapping explanations are omitted.

The rotation sensor 100, as shown in FIG. 40 to FIGS. 42A and 42B and FIG. 34, is provided with a first rotor 102, a second rotor 103, a stationary case 104, a displacement sensor 106, an oscillation circuit 87 comprising the oscillating means, a signal processing and amplification circuit 91 comprising the first signal processing means according to the present invention, a relative rotation angle measuring portion 98 comprising the means for measuring the angle of relative rotation according to the present invention, signal processing and amplification circuits 92 to 94 comprising the second signal processing means according to the present invention, and a rotation angle measuring portion 99 comprising the means for measuring the angle of rotation according to the present invention. The rotation sensor 100 detects the angle of rotation and rotational torque of a shaft, for example, a steering wheel shaft of an automobile comprised of a drive shaft and driven shaft coupled by a torsion bar.

Figure 40:
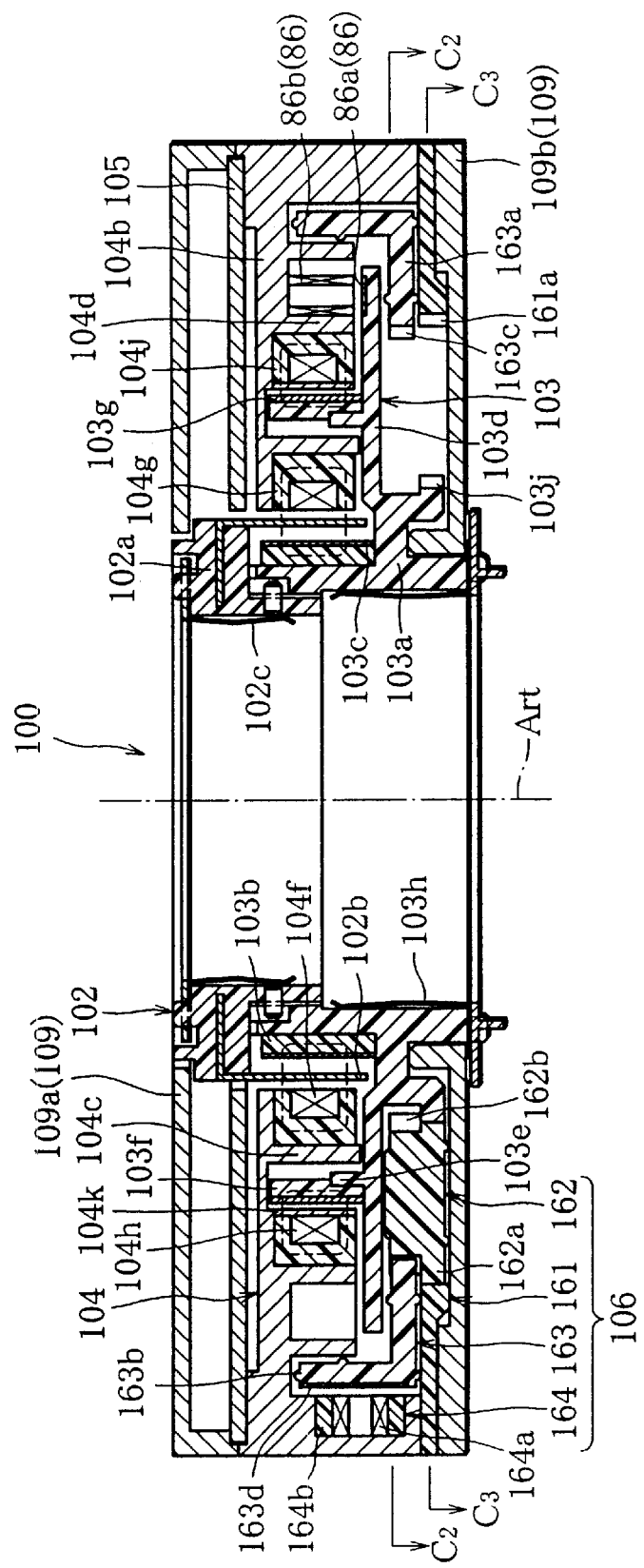
FIG. 40 is a sectional front view of another rotation sensor according to a fourth aspect of the present invention.

Here, the first rotor 102 and the second rotor 103 rotate integrally with the axis of rotation Art shown in FIG. 40 and rotate relatively within a predetermined angle corresponding to the relative rotation of the drive shaft with the driven shaft. The two rotors 102 and 103 similarly rotate relatively within a range of ±8 degrees when for example the drive shaft rotates relatively within a similar range of ±8 degrees with respect to the driven shaft.

Figure 43:
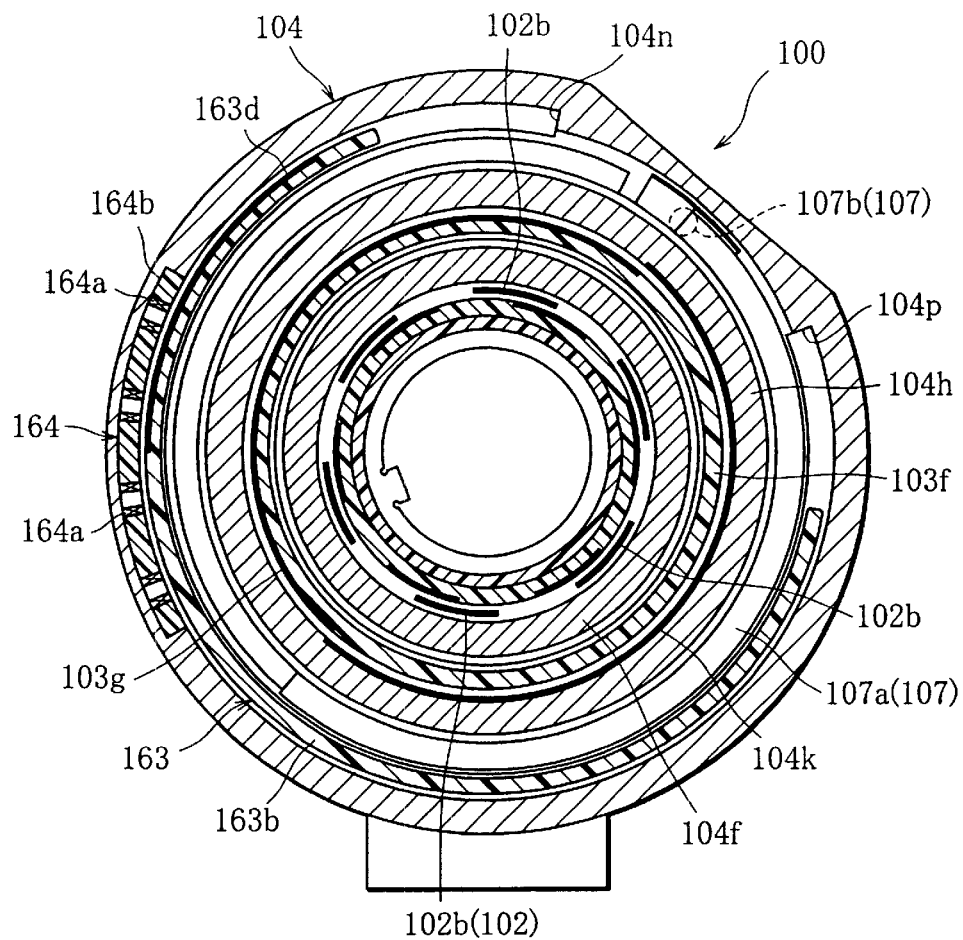
FIG. 43 is a sectional plan view showing the relative positions of the main members comprising the rotation sensor of FIG. 40 drawn omitting some constituent members.

Further, FIG. 43 is drawn omitting some components so as to show the relative position of the main members comprising the rotation sensor 100.

Figure 41:
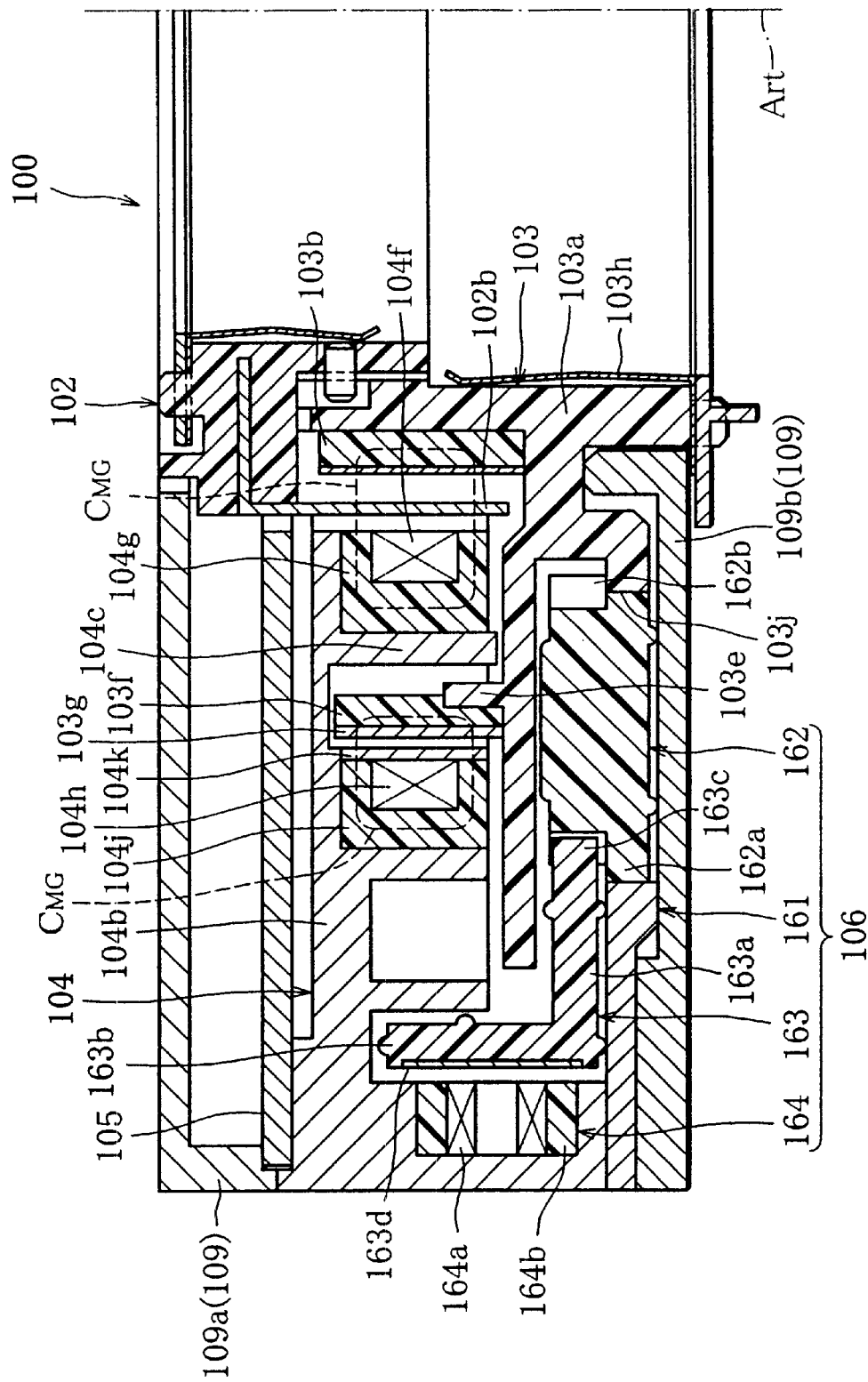
FIG. 41 is a sectional front view of the rotation sensor of FIG. 40 enlarging the left side.

The first rotor 102 has an inside cylinder 102a formed from an electrically insulating synthetic resin superior in moldability and a plurality of, in the present embodiment, six, copper pieces 102b as shown in FIG. 40 and FIG. 41. The top of an engagement piece 102c for stopping rotation of the drive shaft is fixed to the inside cylinder 102a.

The plurality of copper pieces 102b form first conductor layers and extend in the rotation axis Art direction at intervals of a central angle of 30 degrees along the circumferential direction of the inside cylinder 102a. The copper pieces 102b may be made of any material so long as it is a conductor such as aluminum, silver, or another material.

If shielding a high frequency magnetic field, considering the magnetic resistance based on the gap in the radial direction between the first rotor 102 and the stationary case 104, a thickness of 0.1 to 0.5 rom is preferable. Further, in theory, the number of the copper pieces 102b used as the conductor layers becomes greater the smaller the central angle and the smaller the interval of arrangement, the amount of change of the total eddy current induced (proportional to the number of conductor layers) becomes larger, and the detection sensitivity of the angle of relative rotation becomes higher, but the range of angle of relative rotation which can be measured becomes smaller.

The second rotor 103 is formed from an electrically insulating synthetic resin superior in moldability and, as shown in FIG. 40 and FIG. 41, has an inside cylinder 103a, flange 103d, support 103e, and engagement piece 103h.

The inside cylinder 103a is provided at the outside circumference of the first insulating magnetic material layer 103b with a plurality of copper foil 103c at a pitch corresponding to the copper pieces 102b. The copper foil 103c form the second conductor layers along with the later explained copper foil 103g. The flange 103d extends from the inside cylinder 103a in the horizontal direction. The support 103e rising from the middle of the radial direction is formed in a cylindrical shape. Copper foil 86a of the pitch sensor 86 are provided on the top surface near the outer circumference in a range of a central angle of 180 degrees in the circumferential direction. Further, the flange 103d is provided at its bottom with a gear part 103j meshing with the first gear part 162a formed at the planetary gear 162 of the displacement sensor 106 mentioned later and serving as the third gear part. The support 103e is a portion for supporting the second insulating magnetic material layer 103f. Copper foil 103g is provided at the outer circumference of the second insulating magnetic material layer 103f in a range of a central angle of 180 degrees in the circumferential direction. The engagement piece 103h stops the rotation of the driven shaft and is attached at its 5 bottom to the bottom of the inside cylinder 103a.

Here, the material of the first insulating magnetic material layer 103b and the second insulating magnetic material layer 103f is nylon, polypropylene (PP), polyphenylene sulfide (PPS), an ABS resin, or other thermoplastic synthetic resin having an electrical insulation property into which a soft magnetic material powder comprised of an Ni—Zn or Mn—Zn-based ferrite is mixed at a rate of 10 to 70 vol %.

The stationary case 104 is fixing member formed by a metal having a property of shielding an AC magnetic field such as aluminum, copper, and iron and, as shown in FIG. 40 and FIG. 41, has an upper flange 104b, a first support 104c, and second support 104d.

The upper flange 104b has a circuit board 105 on the top 20 and is provided with a first support 104c and second support 104d at concentric positions of different radii at the bottom surface. The upper flange 104b has an opening 104e provided near the outer circumference. The first support 104c, as shown in FIG. 40 and FIG. 41, is positioned at the inside from the support 103e of the second rotor 103 in the radial direction and is provided at its inside circumference with a core 104g holding an excitation coil for detection of the rotational torque, that is, the relative rotation angle coil 104f. The second support 104d, as illustrated, is positioned the outside from the support 103e of the second rotor 103 in the radial direction and is provided at its inside circumference with a core 104j holding an excitation coil for detection of the rotational torque, that is, the rotation angle coil 104h. Copper foil 104k is provided in a range of a central angle of 180 degrees in the circumferential direction on the surfaces of the rotation angle coil 104h and core 104j facing the copper foil 103g.

Here, the relative rotation angle coil 104f and rotation 5 angle coil 104h are connected to the oscillation circuit 87 and frequency division circuit 88 together with the later explained plurality of coils 164a of the displacement sensor 106 and coil 86c of the pitch sensor 86 by cables (not shown) extending from the stationary case 104 to the outside and carry the AC current from the oscillation circuit 87 and the frequency division circuit 88. In the present embodiment, the coils are connected to the same oscillation circuit 87 and frequency division circuit 88 and the same signal frequency is used, but it is also possible to use different signal 15 frequencies. That is, the coils may also be connected to an oscillation circuit 87 and frequency division circuit 88 with different signal frequencies. Due to this, in the rotation sensor 100, a magnetic circuit CMG shown by the dotted line in FIG. 41 is formed among the core 104g and first insulating magnetic material layer 103b and the core 104j and second insulating magnetic material layer 103f.

Further, the stationary case 104, as shown in FIG. 40 and FIG. 41, is provided with a cover 109 having an upper cover 109a and a lower cover 109b at its top and bottom.

The displacement sensor 106 is a sensor for detecting the change of the coil inductance between the later mentioned copper foil layer 163d and the plurality of coils 164a based on the rotation of the first and second rotors 102 and 103 and, as shown in FIG. 40, FIG. 41, FIG. 42A, and FIG. 42B, is provided with the first gear member 161, planetary gear 162, slider 163, and coil member 164.

The first gear member 161 is a ring-shaped member fixed to the stationary case 104 by the lower cover 109b and formed from a synthetic resin and is provided at its inside circumference with an inner gear 161a serving as a third gear part.

The planetary gear 162 is a second gear member decelerating and transmitting the rotation of the second rotor 103 to the slider 163 and is formed at its top and bottom stages with a first gear part 162a and second gear part 162b with different number of teeth. The first gear part 162a meshes with the gear part 103j and the inner gear 161a formed at the second rotor 103 and the first gear member 161. The gear part 103j and the inner gear 161a serve as a third gear part.

Figure 42A:
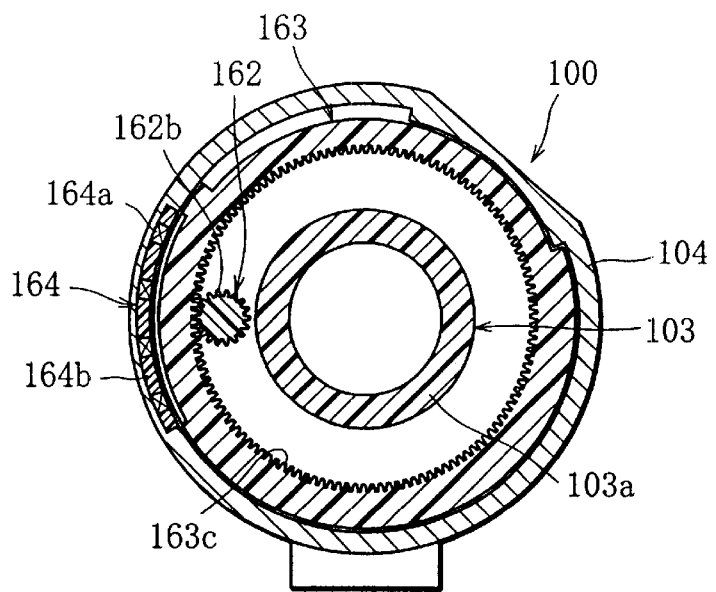
FIG. 42A is a sectional plan view along the line C2—C2 of FIG. 40.
Figure 42B:
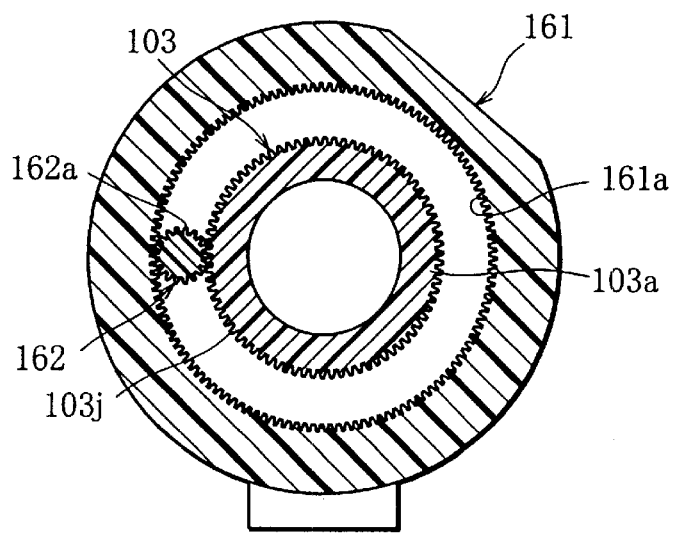
FIG. 42B is a sectional plan view along the line C3—C3 of FIG. 40.

The slider 163 is comprised of a ring-shaped body 163a formed from the same magnetic material as the insulating magnetic material layers 103b and 103f which is provided at its circumferential direction with a limiting wall 163b over a desired range of a central angle, for example, a range of a central angle of 300 degrees and moves in the direction of rotation of the second rotor 103. The slider 163 is provided with a gear part 163c serving as a fourth gear part meshing with the second gear part 162b at the body 163a and with a copper foil layer 163d serving as a third conductor layer at the limiting wall 163b. The copper foil layer 163d, as shown in FIG. 42A and FIG. 43, is provided arranged facing the later explained plurality of coils 164a along the circumferential direction of the limiting wall 163b. The third conductor layer may be made of a nonferrous metal. Aluminum may also be used.

The slider 163 is limited in rotation to the left and right directions to within a predetermined angle due to the rotation of the second rotor 103 being transmitted decelerated by the planetary gear 162 and the limiting wall 163b abutting against the engagement walls 104n and 104p shown in FIG. 43 formed in the stationary case 104. For example, in the rotation sensor 100 of the present embodiment, the deceleration ratio between the second rotor 103 and the slider 163 due to the planetary gear 162 is set to 1:30. The slider 163 is designed to rotate 12 degrees when the second rotor 103 rotates one turn.

The coil member 164, as shown in FIG. 40, FIG. 41, FIG. 42A, and FIG. 43, is provided in the circumferential direction at the inside of the outer circumference of the stationary case 104. Four coils 164a connected with the oscillation circuit 87 are provided serially connected to the holding member 164b comprised of a synthetic resin.

Figure 44:
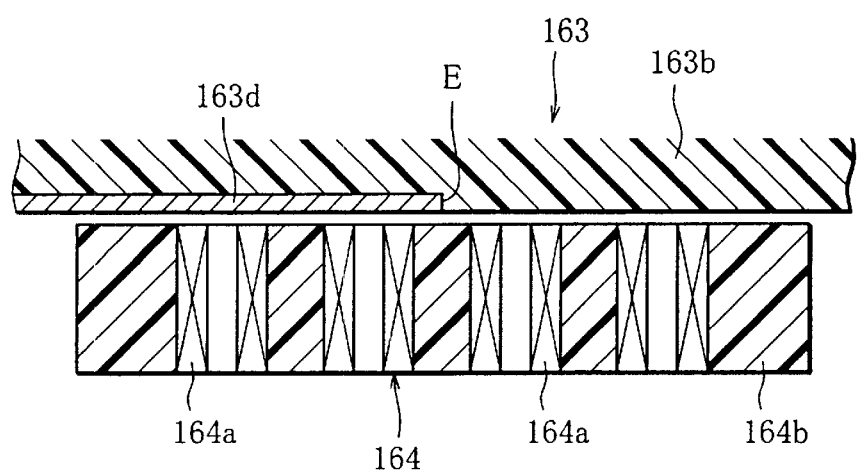
FIG. 44 is a plan view of a limiting wall of a slider and a coil member opened up.
Figure 45:
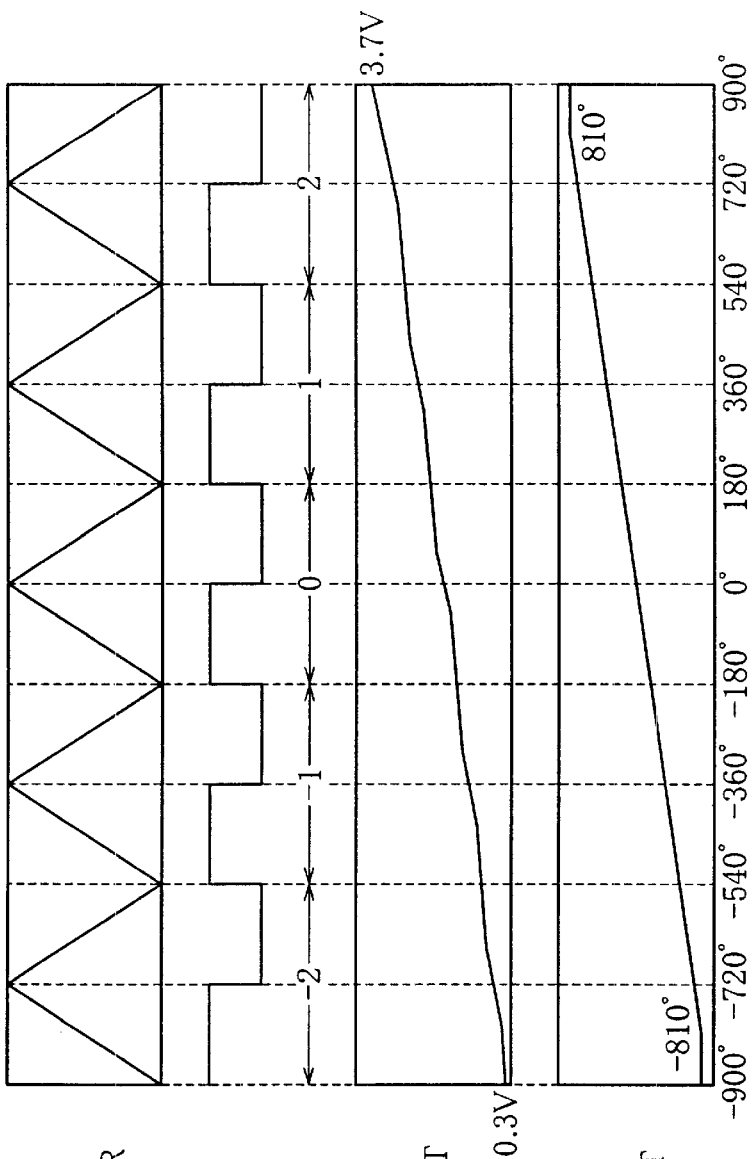
FIG. 45A to FIG. 45D are waveform diagrams of the waveforms of outputs of the sensors and rotation angle measuring portion.

Here, the slider 163 is provided with a limiting wall 163b and a coil member 164 and is assembled in the rotation sensor 100 using the time when one end E of the copper foil layer 163d is positioned at the center of the coil member 164 as the initial position in the left and right directions (angle of rotation to left and right directions of 0 degree) when viewing this in the circumferential direction as shown in FIG. 44. At this time, the positions of the copper foil layer 163d and the coil member 164 shown in FIG. 44 correspond to the positions shown in FIG. 43.

Therefore, in the displacement sensor 106, when the slider 163 moves along with the rotation of the second rotor 103 and the end E passes the portions of the holding members 164b between the coils 164a, the four coils 164a are connected in series, so the total inductance of the four coils 164a combined changes.

Here, the circuit board 1OS, while not shown in FIG. 40 and FIG. 41, is provided with the later explained oscillating means, the first signal processing means processing the output signal from the relative rotation angle coil 104f, the means for measuring the angle of relative rotation, the second signal processing means processing the output signals from the rotation angle coil 104h and the displacement sensor 106, and a means for measuring the angle of rotation and forms electrical circuits for the same.

The rotation sensor 100 configured in this way is used as follows when detecting the angle of rotation, rotation number, and rotational torque in for example a steering wheel shaft of an automobile comprised of a drive shaft and driven shaft coupled by a torsion bar. That is, in the rotation sensor 100, when the first rotor 102 rotates together with the second rotor 103 along with rotation of the steering wheel shaft, the rotation of the second rotor 103 is decelerated by the planetary gear 162 and is transmitted to the slider 163. Due to this, the slider 163 moves in the direction of rotation of the second rotor 103 while rotating 12 degrees for every turn of the second rotor 103.

At this time, in the rotation angle measurement device of the rotation sensor shown in FIG. 34, the oscillation circuit 87 outputs a pulse signal of a specific frequency to the sensors 106, 86, 89, and 90 through the frequency division circuit 88.

The relative rotation angle coil 104f carries an AC current and forms a magnetic circuit working with the first insulating magnetic material layer 103b of the second rotor. In the torque sensor 89, the inductance of the coil changes in accordance with the magnitude of the eddy current generated at the rotor. The first signal processing means detects the amount of phase offset of the pulse signal input from the frequency division circuit 88 connected to the relative rotation angle coil 104f.

The signal processing and amplification circuit 91 detects the amount of change of the inductance of the coil 104f, processes it to a signal of a corresponding voltage value, and outputs the signal through an AID converter 95 to the relative rotation angle measuring portion 98.

The relative rotation angle measuring portion 98, as shown for example in FIG. 34, can measure the angle of relative rotation of the two rotors in a range of −8 degrees to +8 degrees based on the voltage value 0.5V to 4.5V of the 5 converted signal.

The rotation angle coil 104h carries an AC current and forms a magnetic circuit working with the second insulating magnetic material layer 103f of the second rotor 103. The rotation angle sensor 90, together with the signal processing and amplification circuit 92, detects an amount of phase shift of the pulse signal input from the frequency division circuit 88 connected to the rotation angle coil 104h in accordance with the magnitude of the eddy current generated at the rotor. That is, the rotation angle sensor 90 detects the amount of phase offset of the pulse signal at the two ends of the rotation angle coil 104h. At the time of rotation, the amount of overlap of the copper foil 104k of the second insulating magnetic material layer 103f and the copper foil 103g of the core 104j in the circumferential direction changes. The sensor detects an angle of rotation within 180 degrees to the left and right as shown in FIG. 45A by the change of the magnetic flux between the coil 104h and the core 104j along with this.

The signal processing and amplification circuit 92 processes the detected amount of phase shift to a signal of a corresponding voltage value and outputs the signal through an AID converter 96 to the rotation angle measuring portion 99.

The displacement sensor 106 detects the change in the total inductance of the four coils 164a when the slider 163 moves along with the rotation of the second rotor 103 and the end E passes the portions of the coils 164a.

Figure 46:
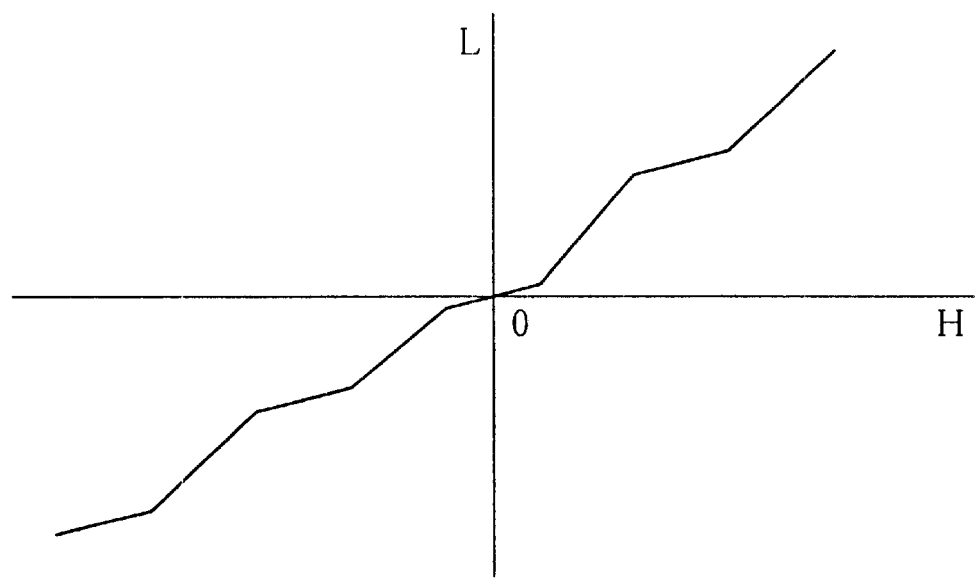
FIG. 46 is a view of the relationship between the amount of movement of a slider in a displacement sensor and the coil inductance.

That is, if the amount of movement of the slider 163 is H and the coil inductance is L, the relationship of the amount of movement H and the coil inductance L becomes substantially linear when the end E of the copper foil layer 163d passes portions of the coils 164a as shown in FIG. 46 and therefore is a component for the detection of the angle of rotation. Further, when the end E passes portions of the holding member 164b between the coils 164a, the coil inductance L does not change and remains constant.

Figure 47:
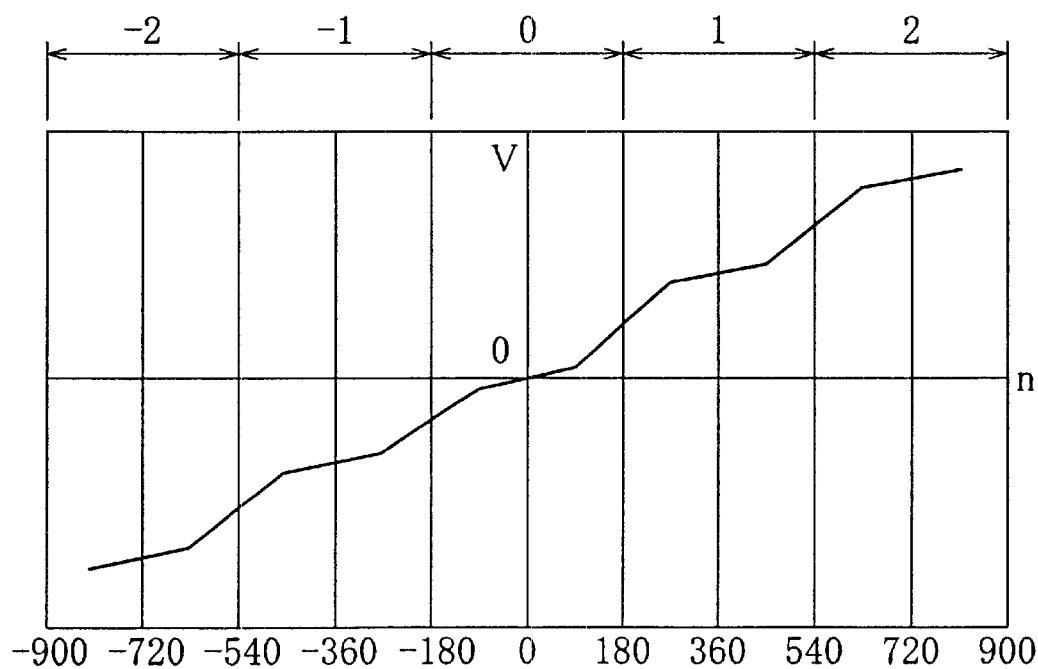
FIG. 47 is a graph of the output simply expressing the output of the displacement sensor and rotation number.

At this time, the output voltage (V) from the coil member 164 accompanying a change in the rotation number (n) and the total inductance of the four coils 164a changes as shown in FIG. 47 due to the relative positions of the slider 163 and the copper foil layer 163d. Note that the output of the displacement sensor 106 shown in FIG. 45C shows an example of the case of use for detection of an angle of rotation of 900 degrees to −900 degrees of limited rotation when the intermediate position of the copper foil layer 163d of the slider 163 shown in FIG. 44 is 0 degree.

The signal processing and amplification circuit 93 processes and converts the amount of change of the detected coil inductance to a signal of a corresponding voltage value and outputs the signal through the AID converter 97 to the rotation angle measuring portion 99.

The pitch sensor 86 detects the change of the inductance of the coil 86b based on the rotation of the second rotor 103. That is, it detects the digital signal of "1" or "0" such as shown in FIG. 45B every 180 degrees by the change in the magnetic flux between the coil 86c and the core 86d due to the relative positional relationship of copper foil 86a and slit 86e of the second rotor 103 in the pitch sensor 86 (relation of whether overlapping or not overlapping).

The signal processing and amplification circuit 94 processes the amount of change of the detected relative positional relationship to a digital signal of the corresponding voltage value and outputs the signal to the rotation angle measuring portion 99.

The rotation angle measuring portion 99 measures for example the angle of rotation at a steering wheel shaft of an automobile comprised of a drive shaft and a driven shaft coupled by a torsion bar by a combination of the signals input from the displacement sensor 106, pitch sensor 86, and rotation angle sensor 90. That is, in the present embodiment, due to the relationship between the outputs of the rotation angle sensor 90 and the pitch sensor 86, which changes from the intermediate position of 0 degree of the slider 163, a change in a range of either −180 degrees to 0 degree and 0 degree to 180 degrees can be differentiated. Further, the actual angle of rotation is measured by the relationship with the output of the displacement sensor 106 at that time. FIG. 45D shows a waveform expressing the relationship of the signals from the displacement sensor 106, pitch sensor 86, and rotation angle sensor 90 within a range of a limited angle of rotation of 900 degrees to −900 degrees. The angle 20 of rotation is measured by this.

In this way, the rotation sensor of the present embodiment can find the rotational torque acting on the drive shaft and the driven shaft from the amount of phase shift of the pulse signal detected by the rotation angle sensor.

Further, it can accurately measure the angle of rotation in these shafts from the relationship of the outputs of the displacement sensor, pitch sensor, and rotation angle sensor. When actually attaching the sensors to the rotation sensor, the position where the signal of the pitch sensor 86 switches and the position where the output of the rotation angle sensor 90 (angle signal) becomes for example 0 degree, 180 degrees, 360 degrees, . . . are made to match as much as possible, but in reality some error ends up occurring due to the difference in the attachment precision. That is, as shown by the relationship of the waveforms of the outputs of the rotation angle sensor and the pitch sensor of FIG. 37, for example, when there is an offset of ε between the position where the output of the pitch sensor switches from "0" to "1" and the 180 degree position of the rotation angle sensor, it is possible to accurately output the actual angle of rotation up to 180 degrees, but from 180 degrees to 180 degrees+ε, the result is 180 degrees—(S−180 degrees). Here, S is the angle of rotation S found based on the angle signal.

That is, there was the problem of a loss of continuity of the actual angle signal where an angular signal smaller than 180 degrees was conversely output despite 180 degrees being exceeded and, when over 180 degrees+ε, the actual angular signal was output and therefore there were angles which could not be detected at an angle of rotation near 180 degrees.

The smaller this ε, the higher the attachment precision, but if the sensor is attached at a high precision for this, the cost of manufacture of the sensor ends up becoming higher.

Therefore, when obtaining a signal from the rotation angle sensor 90, the signal processing and amplification circuit 92 in the present embodiment determines if the angle of rotation S found based on the signal is in a range of for example 179.5 degrees≦S≦180.5 degrees. If in this range, it makes the angle of rotation found 180 degrees and outputs a signal of the corresponding voltage value. If outside of this range, it obtains a signal from the pitch sensor 86 and determines if the signal is "1" or not. If "1", it outputs a signal of a voltage value corresponding to an angle of rotation of (360-S), while if not "1", it outputs a signal of a voltage value corresponding to an angle of rotation S. Note that the above signal processing is similarly performed near the angles of rotation shown as the upper limit point and lower limit point of the angle signal comprised of the triangular waveform output from the rotation angle sensor, that is, −720 degrees, −540 degrees, −360 degrees, −180 degrees, 0 degree, 180 degrees, 360 degrees, 540 degrees, and 720 degrees.

Due to this, in the present embodiment, the position of switching of the signal of the pitch sensor near the angle of rotation of the upper limit point and lower limit point of the triangular waveform and the position of the signal of the rotation angle sensor match, the attachment precision is improved, and detection of the angle of rotation with continuity becomes possible.

In this way, in the rotation sensor of the above embodiment, the explanation was made based on the case of detecting the amount of phase shift so as to detect fluctuation of the impedance of the coil due to rotation. The rotation sensor of the present invention, however, does not have to detect fluctuation of the impedance of the coil due to rotation by detecting the signal frequency or signal amplitude.

Note that the present invention is not limited to the above embodiment. Various modifications are possible. For example, the rotation sensor 100 of the present embodiment detected the rotational torque based on the angle of relative rotation of the rotors 102 and 103 and found the angle of rotation and rotation number of the rotors 102 and 103 with respect to the stationary case 104 at a high precision. If there is no problem in the detection precision in practice, however, it is possible to omit the pitch sensor 86 as shown in the circuit diagram showing an example of the rotation angle measurement device of the rotation sensor of FIG. 47.

Figure 38:
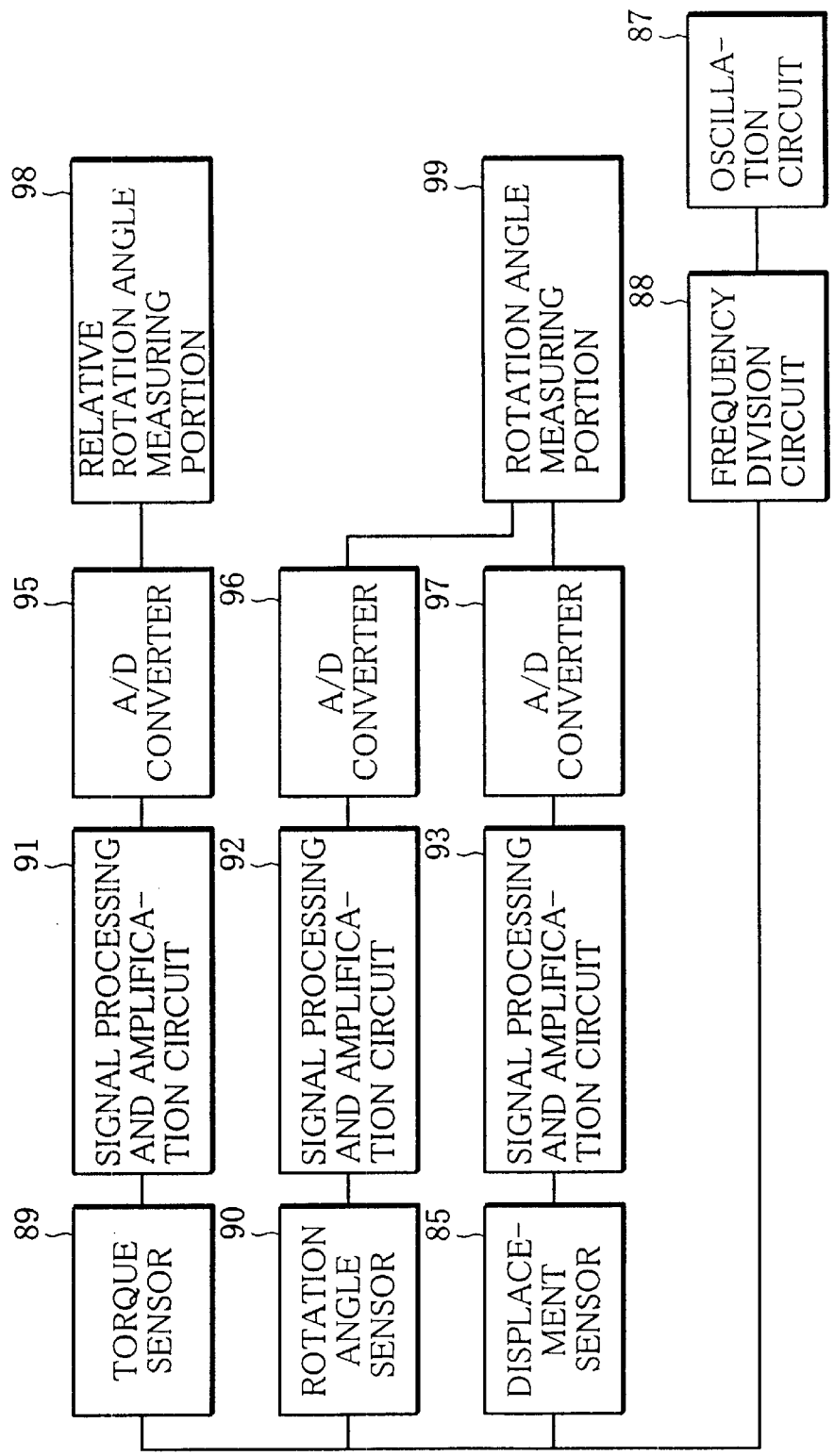
FIG. 38 is block diagram of another example of the configuration of a rotation angle measurement device in the rotation sensor.

In this case, as shown in FIG. 38, it is possible to set the output signal of the displacement sensor 6 corresponding to the angle of rotation (rotation number) in advance by not that high a detection precision and detect the rotation number simply by this relationship. Further, it is possible to configure the rotation sensor 100 by detecting one of the rotational torque or angle of rotation and omit the other as desired.

Further, if the detection precision is not an issue in practice, it is possible to omit the rotation angle sensor and detect the angle of rotation (rotation number) by a combination of the displacement sensor and the output of at least one pitch sensor.

On the other hand, the rotation sensor 100 may be configured to detect one of the rotational torque or angle of rotation and omit the other as desired.

Figure 48:
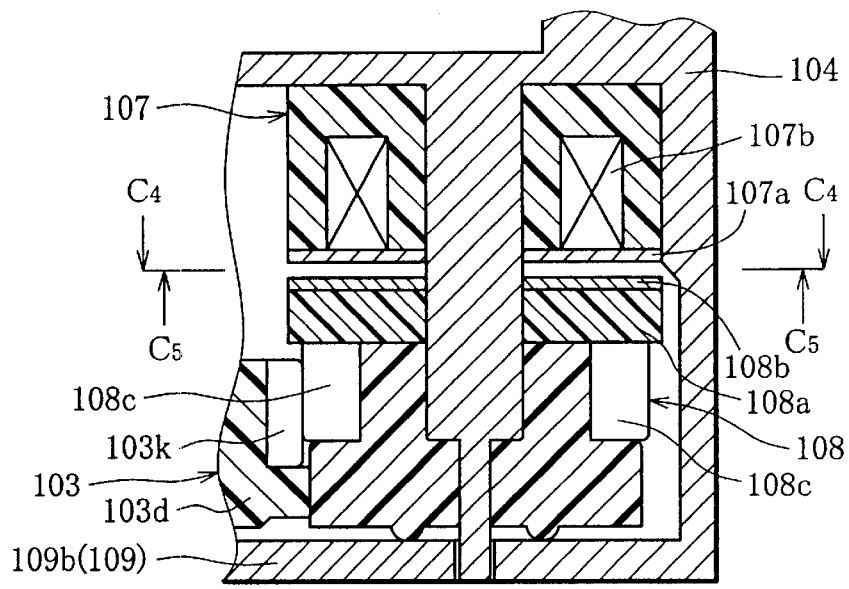
FIG. 48 is a sectional front view of main parts of the rotation sensor of FIG. 40 shown cut away.
Figure 49:
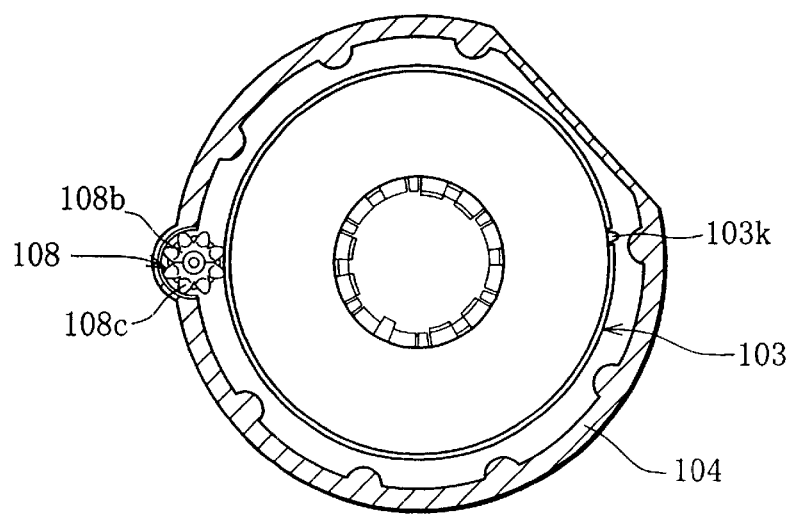
FIG. 49 is a sectional view of the rotation sensor of FIG. 48 along the line C4—C4.
Figure 50:
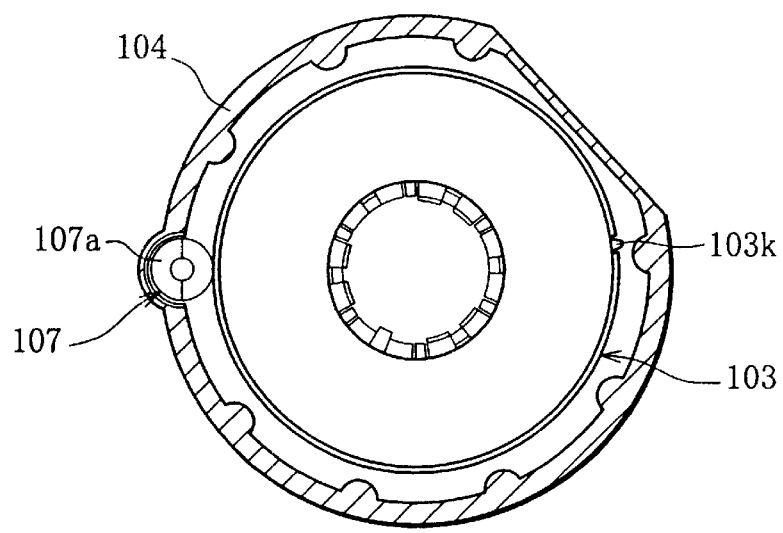
FIG. 50 is a sectional view of the rotation sensor of FIG. 48 along the line C5—C5.

Here, the rotation sensor 100 can also find the rotation number of the second rotor 103 by providing the stationary core 107 at the top of the outer circumference of the inside of the case 104 and an intermittent gear 108 at the bottom of the outer circumference facing it as shown in FIG. 48 to FIG. 50 instead of the planetary gear 162.

At this time, the stationary core 107 has a semicircular copper plate 107 and a signal coil 107b. The copper plate 107a covers the bottom side of the signal coil 107b. Further, the intermittent gear 108 is provided on its top surface with a disk shaped core 108a. The core 108a has a semicircular copper plate 108b facing the copper plate 107a on its top surface at the signal coil 107b side. The intermittent gear 108 has a gear part 108c provided at its outer circumference with teeth projecting out radially from the axis at intervals of a central angle of 45 degrees. The gear part 108c is configured to engage with a projection 103k provided at the outer circumference of the flange 103d of the second rotor 103.

Figure 52A:
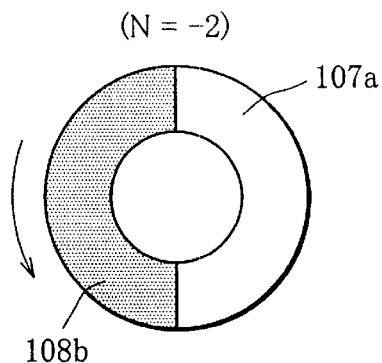
FIG. 52A to FIG. 52E are schematic views of a change shown by each rotation number in the state of overlap of copper plates of both the stationary coil and intermittent gear when the intermittent gear rotates.
Figure 52B:
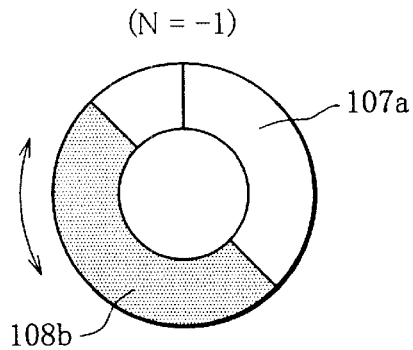
Figure 52C:
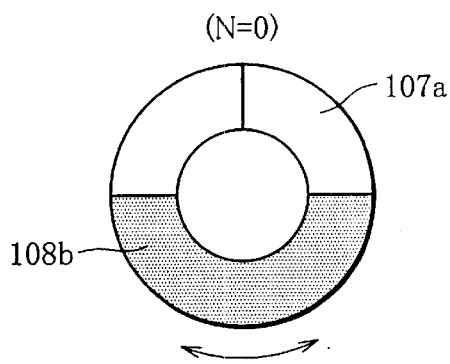
Figure 52D:
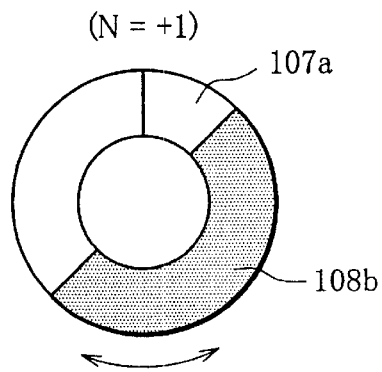
Figure 52E:
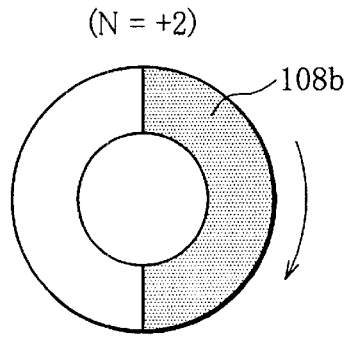
Figure 53:
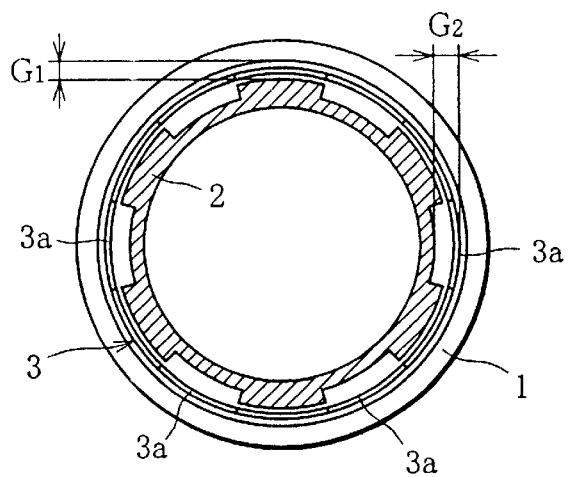
FIG. 53 is a plan view of a conventional rotation sensor.
Figure 54:
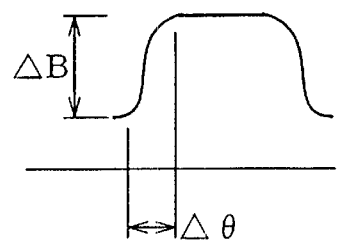
FIG. 54 is a graph of the fluctuation of the magnetic flux density showing a boundary area $\Delta\theta$ of intensity in the distribution of the magnetic field generated.

Accordingly, the intermittent gear 108 rotates intermittently 45 degrees at a time by the projection 103k engaging with the gear part 108c every time the second rotor 103 rotates by one turn. Along with this, every time the second rotor 103 rotates one turn, the copper plate 108b rotates by 45 degrees and the portions where the semicircular copper plates 107a and 108b overlap change every 45 degrees as shown in FIG. 52A to FIG. 52E. Here, FIG. 52A to FIG. 52E show states based on the rotation of the second rotor 103, that is, FIG. 52A shows two turns in the left direction (N=−2), FIG. 52B one turn in the left direction (N=−1), FIG. 52C the case of no rotation in the left or right direction (N=0), FIG. 52D one turn in the right direction (N=+1), and FIG. 52E two turns in the right direction (N=+2).

Here, in the signal coil 107b, while not shown, the oscillating means and the second signal processing means shown in FIG. 34 are connected and an AC magnetic field is formed at a magnetic circuit comprised of the stationary core 107 and core 108a due to the AC current of a certain frequency flowing from the oscillating means. Therefore, in the rotation sensor 100, an eddy current is generated by the semicircular copper plate 107a and copper plate 108b provided facing the stationary core 107 and intermittent gear 108 cutting across the AC magnetic field.

Therefore, the amount of the eddy current generated becomes larger the smaller the area where the copper plate 107a and the copper plate 108b overlap. Due to this fluctuation in the amount of the eddy current, the impedance of the signal coil 107b fluctuates at the rotation sensor 100. Accordingly, in the rotation sensor 100, when the gear part 108c of the intermittent gear 108 and the projection 103k of the second rotor 103 engage and the gear rotates, the impedance of the coil 107b fluctuates by a large extent, while when the gear part 108c and the projection 103k do not engage and the intermittent gear 108 does not rotate, the impedance of the coil 107b does not change.

Figure 51:
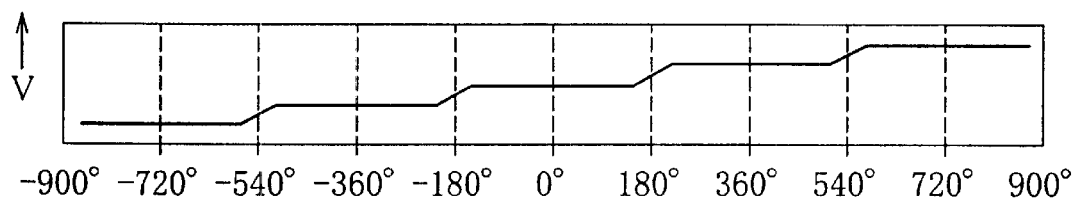
FIG. 51 is a waveform diagram of the output of the coil combined with an intermittent gear.

In this way, in the rotation sensor 100, the impedance of the coil 107b fluctuates intermittently for every turn of the second rotor 103. Due to this, the output level of the second signal processing means fluctuates by the amount of intermittent change of the impedance of the coil 107b. FIG. 51 shows the output signal level (V) at this time with respect to the angles of rotation in the left and right directions.

Therefore, the rotation sensor 100 can accurately detect 10 the rotation number of the second rotor 103 by monitoring the output signal level (V).

Capability of Utilization in Industry

As explained above, the rotation sensor according to the first aspect of the present invention detects the difference in the angle of relative rotation based on the change in the area where the conductor of the second rotor cuts across the magnetic circuit formed by the first rotor and the magnetic material core arranged around it in accordance with the difference in angle of relative rotation caused between the shaft position where the first rotor is fixed and the shaft position where the second rotor is fixed. Therefore, in the rotation sensor, strict precision of the position of attachment of the first rotor and the second rotor in the axial direction of the shaft is not required and the angle of relative rotation of the shaft can be detected by a non-contact method.

Further, since the first rotor is formed by a magnetic material comprised of an insulator, no eddy current is generated at the first rotor. Therefore, in the rotation sensor, the difference in the angle of relative rotation of the shaft and the magnitude of the eddy current generated by the conductor of the second rotor cutting across the areas of different intensities of the irregular magnetic field are proportional and the linearity of the detection output is excellent. Accordingly, with the rotation sensor, it is not necessary to strictly control the gap between the first rotor and the second rotor in the radial direction and the ability to assemble the rotation sensor to the shaft is improved. According to the second aspect of the present invention, it is possible to provide a rotation sensor which is small in size, has a detection output with a linear characteristic, and is high in detection sensitivity.

According to the third aspect of the present invention, it is possible to provide a measurement circuit of a rotation sensor shifting the phase of the oscillation signal from the oscillating means in accordance with the magnitude of the eddy current generated at the second rotor, detecting the amount of shift, and measuring the angle of relative rotation based on the detected amount of phase shift, so the resolution of the measurement of the angle of relative rotation is small and the response is improved.

According to the fourth aspect of the present invention, it is possible to provide a rotation sensor able to differentiate if the direction of rotation is left or right, able to measure even an angle of rotation exceeding 180 degrees, and able to measure the angle of rotation and/or rotational torque.

What is claimed is:

1. A rotation sensor comprising:
   a first rotor and a second rotor, each rotor comprising:
      a cylindrical body,
      an electrical conductor spanning substantially half of the circumference of the cylindrical body, and
      wherein a cross-section of the cylindrical body is annular; wherein the cylindrical body of the first rotor is formed of at least an insulating magnetic material;
   wherein the first rotor and the second rotor are aligned coaxially and the electrical conductor of the first rotor is radially proximate to the electrical conductor of the second rotor; and
   the second rotor is disposed between the first rotor and an excitation coil.

2. The rotation sensor of claim 1, wherein the first rotor is attached to a first position of a shaft, and wherein the second rotor is attached to a second position of the shaft.

3. The rotation sensor of claim 1, wherein the first rotor is attached to a first shaft and the second rotor is attached to a second shaft.

4. The rotation sensor of claim 1, wherein the excitation coil is housed within a stationary core.

5. The rotation sensor of claim 1, further comprising oscillating means connected to the excitation coil for producing an oscillating signal in accordance with a magnitude of an eddy current generated at the second rotor.

6. The rotation sensor of claim 5, further comprising a phase shift detecting means for detecting a phase shift of the oscillating signal.

7. The rotation sensor of claim 6, further comprising a measuring means for measuring an angle of relative rotation between the first rotor and the second rotor based on the detected phase shift.

8. A relative rotation measurement apparatus comprising:
   a first rotor formed of at least an insulating magnetic material;

a stationary core having a core body and an excitation coil, carrying an AC current, that in conjunction with the first rotor creates a magnetic circuit;

a second rotor positioned between the first rotor and the stationary core oscillating means connected to the excitation coil for generating an oscillation signal;

phase shifting means for shifting a phase of the oscillation signal in accordance with a magnitude of an eddy current generated at the second rotor;

phase shift detecting means for detecting a phase shift of the oscillation signal; and measuring means for measuring an angle of relative rotation between the first rotor and the second rotor based on the detected phase shift.

9. The apparatus of claim 8, wherein:

the first rotor and the second rotor each comprises:
- a cylindrical body formed of at least an insulating magnetic material,
- an electrical conductor spanning about half of the circumference of the cylindrical body, and
- wherein a cross-section of the cylindrical body is annular; and wherein the first rotor and the second rotor are aligned coaxially and the electrical conductor of the first rotor is radially proximate to the electrical conductor of the second rotor.

10. The rotation sensor of claim 9, wherein the first rotor is attached to a first position of a shaft, and wherein the second rotor is attached to a second position of the shaft.

11. The rotation sensor of claim 9, wherein the first rotor is attached to a first shaft and the second rotor is attached to a second shaft.

12. A method comprising:

attaching a first rotor formed of at least an insulating magnetic material to a first position of a shaft;

providing a stationary body having an excitation coil, carrying an AC current, that in conjunction with the first rotor creates a magnetic circuit;

attaching a second rotor to a second position of the shaft; and positioning the second rotor between the first rotor and the stationary body.

13. The method of claim 12, further comprising generating an oscillation signal.

14. The method of claim 13, further comprising shifting a phase of the oscillation signal in accordance with a magnitude of an eddy current generated at the second rotor, and detecting a phase shift of the oscillation signal.

15. The method of claim 14, further comprising measuring an angle of relative rotation between the first rotor and the second rotor based on the detected phase shift.

16. A method of measuring relative rotation, comprising:

attaching a first rotor formed of at least an insulating magnetic material to a first shaft;

providing a stationary body having an excitation coil, carrying an AC current, that in conjunction with the first rotor creates a magnetic circuit;

attaching a second rotor to a second shaft;

positioning the second rotor between the first rotor and the stationary body;

generating an oscillation signal;

shifting a phase of the oscillation signal in accordance with a magnitude of an eddy current generated at the second rotor;

detecting a phase shift of the oscillation signal; and measuring, based on the detected phase shift, an angle of relative rotation between the first rotor and the second rotor.

17. The method of claim 16, wherein the first rotor comprises:

a cylindrical body formed of at least an insulating magnetic material;

an electrical conductor spanning about half of the circumference of the cylindrical body, and wherein a cross-section of the cylindrical body is annular.

18. The method of claim 17, wherein the second rotor comprises:

a cylindrical body formed of at least an insulating magnetic material, an electrical conductor spanning about half of the circumference of the cylindrical body, and wherein a cross-section of the cylindrical body is annular.

19. The method of claim 18, wherein the first rotor and the second rotor are aligned coaxially and the electrical conductor of the first rotor is radially proximate to the electrical conductor of the second rotor.

* * * * *